United States Patent
Fujimura et al.

(10) Patent No.: US 7,262,903 B2
(45) Date of Patent: Aug. 28, 2007

(54) METHOD AND APPARATUS FOR CONTROLLING MULTIPLE-WAVELENGTH-PUMPED RAMAN AMPLIFIER AND COMPUTER PRODUCT

(75) Inventors: Koji Fujimura, Tokyo (JP); Misao Sakano, Tokyo (JP); Takeshi Nakajima, Tokyo (JP); Shu Namiki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/212,903

(22) Filed: Aug. 29, 2005

(65) Prior Publication Data

US 2006/0001950 A1 Jan. 5, 2006

Related U.S. Application Data

(63) Continuation of application No. PCT/JP2004/002341, filed on Feb. 27, 2004.

(60) Provisional application No. 60/464,854, filed on Apr. 24, 2003, provisional application No. 60/449,830, filed on Feb. 27, 2003.

(51) Int. Cl.
*H01S 3/00* (2006.01)

(52) U.S. Cl. ............... 359/334; 359/341.41; 359/337.4

(58) Field of Classification Search ................ 359/334, 359/341.41, 337.4
See application file for complete search history.

(56) References Cited

U.S. PATENT DOCUMENTS

| | | | |
|---|---|---|---|
| 6,115,174 A | 9/2000 | Grubb et al. | |
| 6,292,288 B1 | 9/2001 | Akasaka et al. | |
| 6,859,306 B2 * | 2/2005 | Fishman et al. | ............ 359/334 |
| 2001/0050802 A1 | 12/2001 | Namiki et al. | |
| 2002/0186456 A1 | 12/2002 | Inoue et al. | |
| 2003/0099030 A1 * | 5/2003 | Kumasako et al. | ......... 359/334 |

FOREIGN PATENT DOCUMENTS

| | | |
|---|---|---|
| JP | 2002-303896 | 10/2002 |
| JP | 2003-57692 | 2/2003 |

OTHER PUBLICATIONS

Victor E. Perlin et al., "Efficient design method for multi-pump flat-gain fiber Raman amplifiers," OFC 2002, TuJ1, pp. 57-59.
Koji Fujimura et al., "The method of highly accurate prediction of output signal powers in WDM-pumped Raman amplifiers having only the same number of monitor channels as pump wavelength channels," The Institute of Electronics, Information and Communication Engineers, vol. 103, No. 474, Nov. 21, 2003, pp. 13-17 (w/English translation).
Koji Fujimura et al., "Applying a Numerical Simulation Technique to the Design of WDM-Pumped Raman Amplifiers, and Methods for the Automatic Determination of Pump Powers," Furkawa Review No. 25, Furukawa Electric Co., Ltd., Jan. 2004, pp. 1-7.

(Continued)

*Primary Examiner*—Mark Hellner
(74) *Attorney, Agent, or Firm*—Oblon, Spivak, McClelland, Maier & Neustadt, P.C.

(57) ABSTRACT

A multiple-wavelength-pumped Raman amplifier includes a control unit that controls, based on a relational expression associating an amount of fluctuation in a current signal light power at a signal input end, an amount of fluctuation in a current pumping light power at a pumping light input end, an amount of fluctuation in the current signal power at a signal output end, and an amount of fluctuation in the current pumping light power at a pumping light output end, two fluctuation amounts by determining other two fluctuation amounts in advance, to determine pumping light powers satisfying the relational expression.

84 Claims, 45 Drawing Sheets

OTHER PUBLICATIONS

Xiang Zhou et al., "A Simplified Model and Optimal Design of a Multiwavelength Backward-Pumped Fiber Raman Amplifier," IEEE Photonics Technology, vol. 13, No. 9, Sep. 2001, pp. 945-947.

M. Karásek et al., "Design of wideband hybrid amplifiers for local area networks," IEE Proc. Optelectron, vol. 48, No. 3, Jun. 2001, pp. 150-155.

Shu Namiki et al., "Ultrabroad-Band Raman Amplifiers Pumped and Gain-Equalized by Wavelength-Division-Multiplexed High-Power Laser Diodes," IEEE Journal on Selected Topics in Quantum Electronics, vol. 17, No. 1, Jan./Feb. 2001, pp. 3-16.

U.S. Appl. No. 11/096,092, filed Apr. 1, 2005, Fujimura et al.

U.S. Appl. No. 11/212,903, filed Aug. 29, 2005, Fujimura et al.

\* cited by examiner

FIG.2
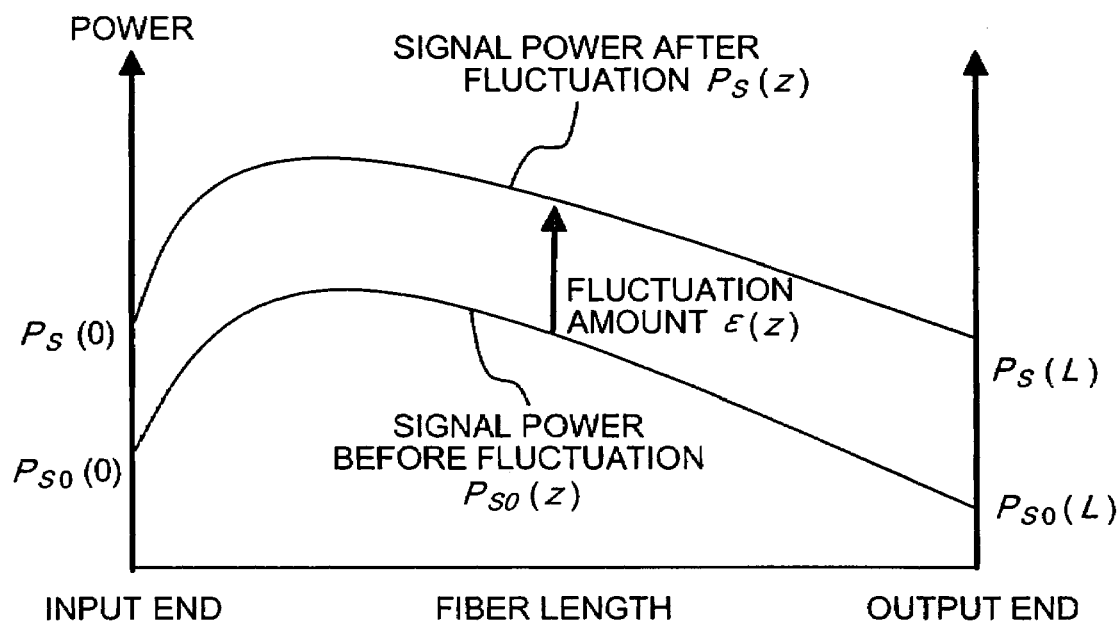
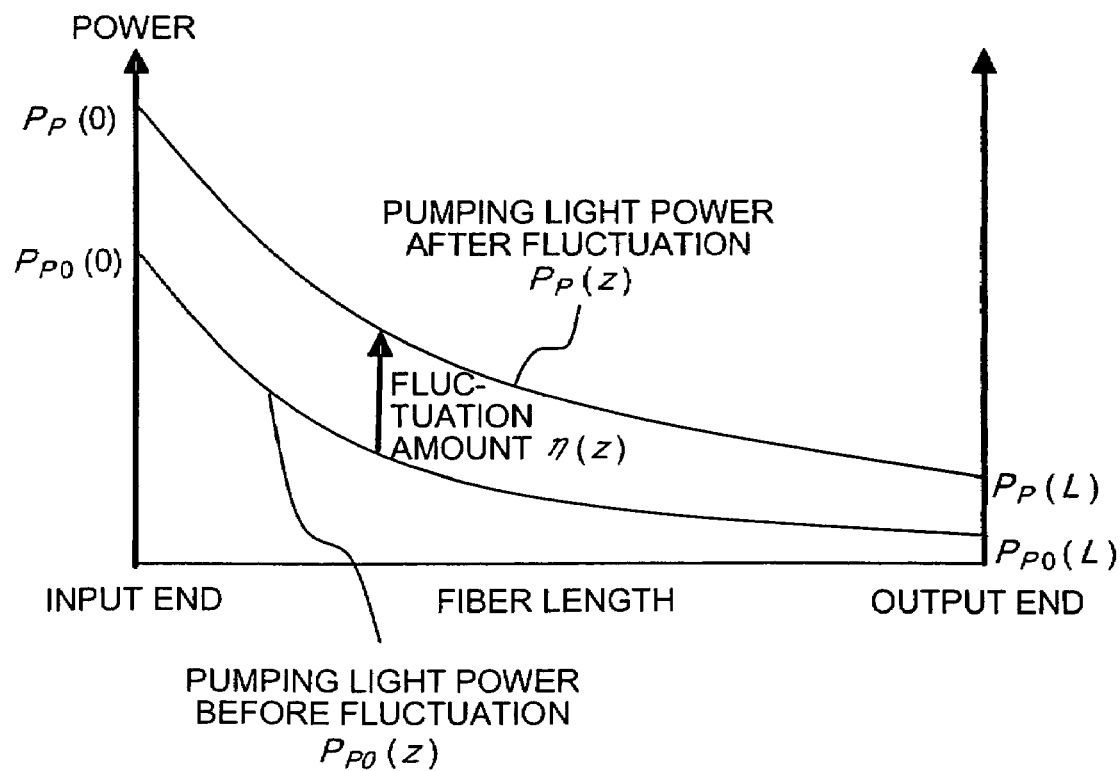

TO CONTROL APPARATUS 14

FIG.27
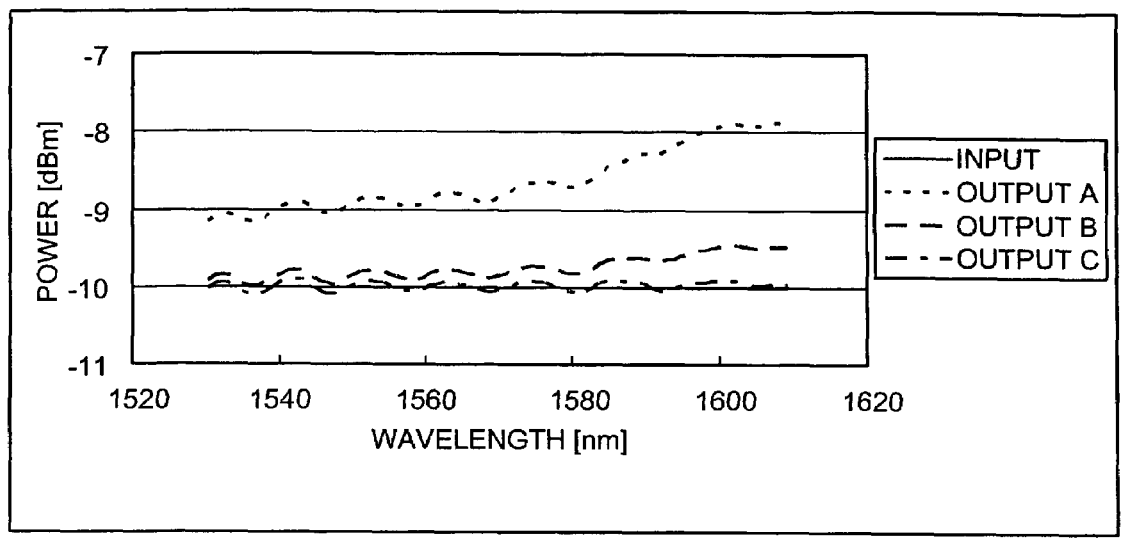
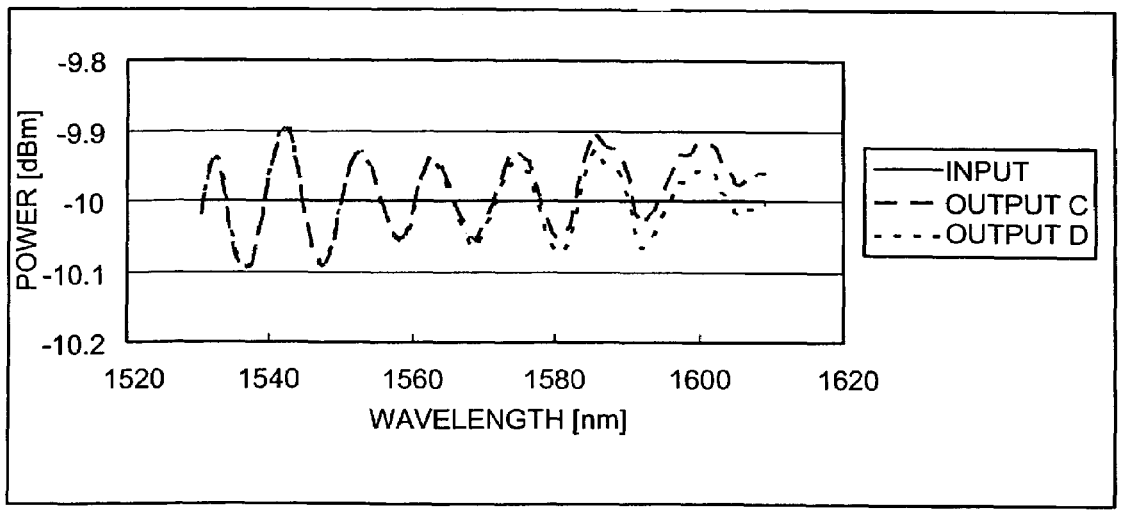

FIG.28
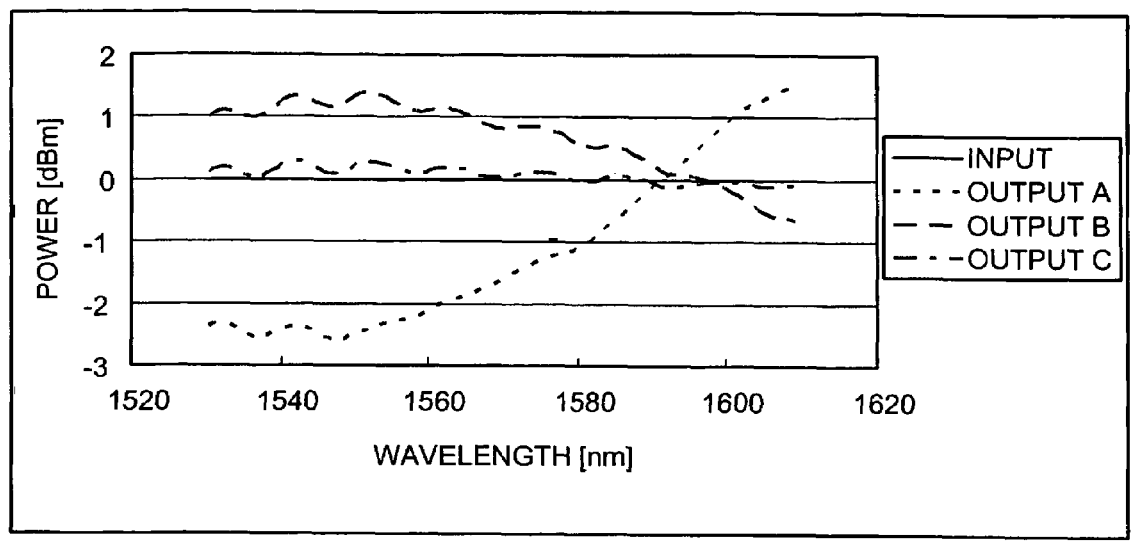
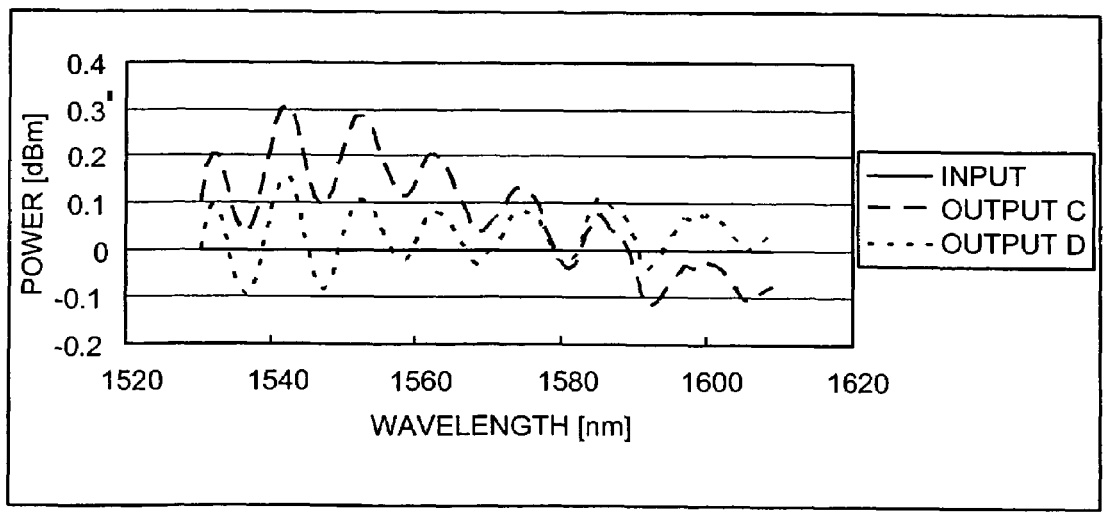

FIG.29
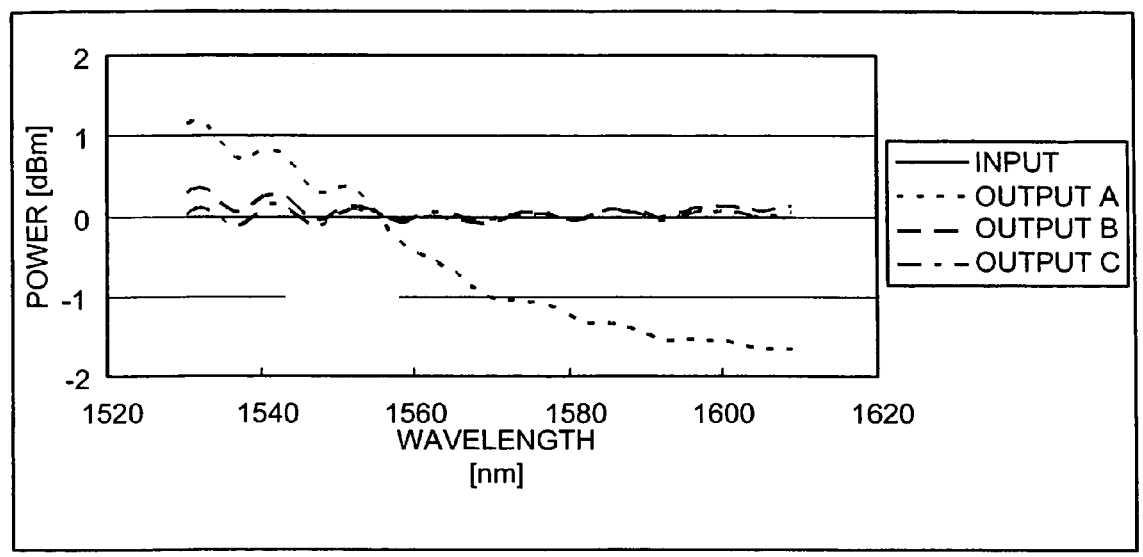
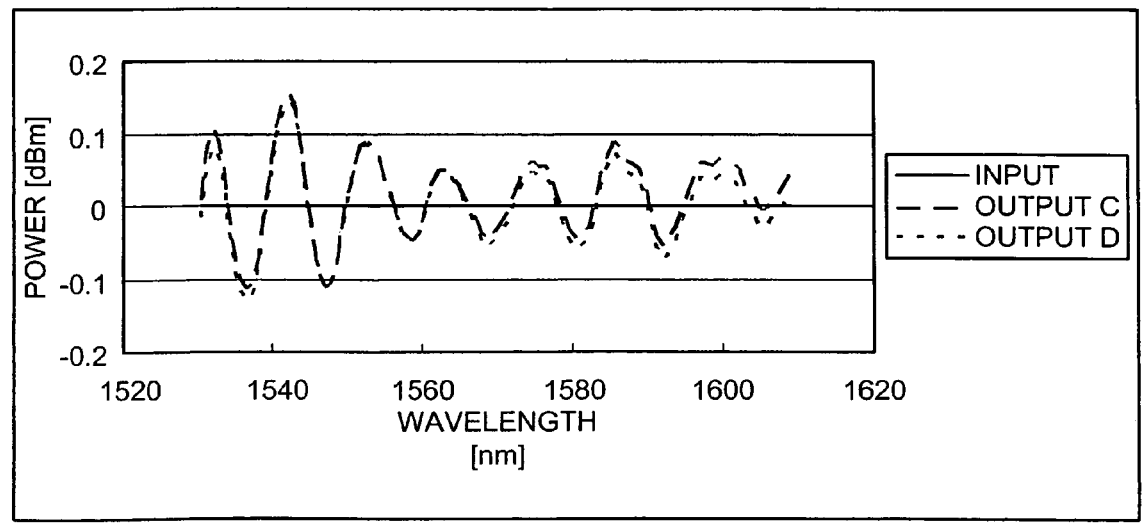

FIG.30
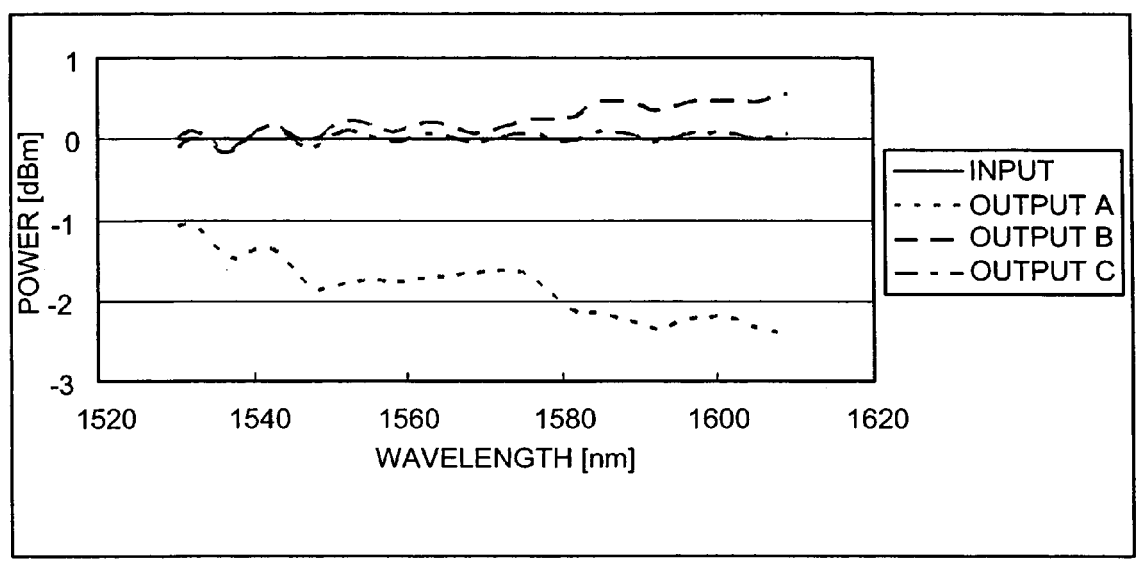
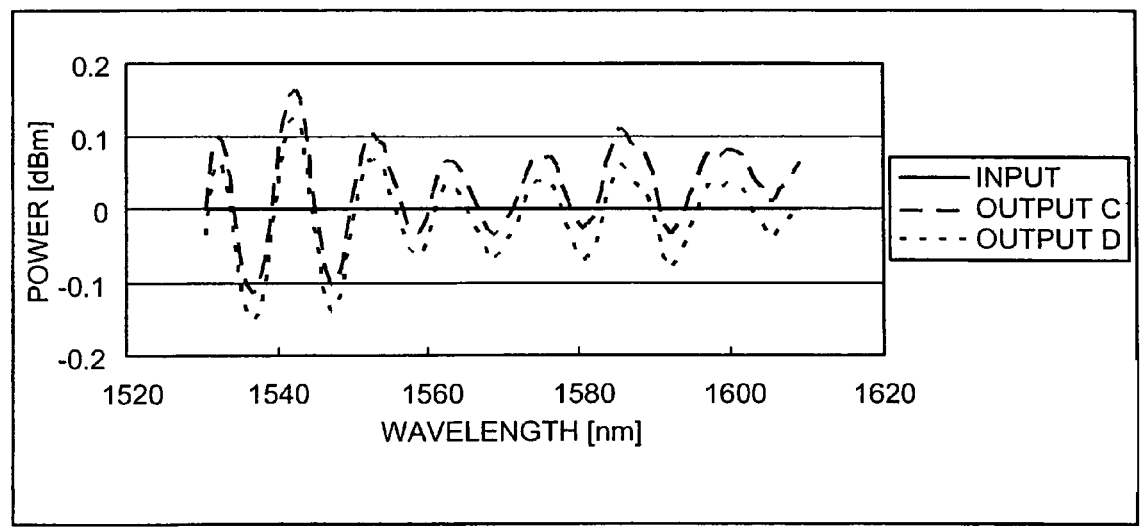

| WAVELENGTH [nm] | 1422.2 | 1430.3 | 1437.9 | 1444.8 | 1451.8 | 1458.8 | 1466.7 | 1473.2 | 1481.2 | 1503.5 |
|---|---|---|---|---|---|---|---|---|---|---|
| POWER [mW] | 10 | 10 | 10 | 10 | 10 | 10 | 10 | 10 | 10 | 10 |

FIG.36

| WAVE-LENGTH [nm] | 1422.2 | 1430.3 | 1437.9 | 1444.8 | 1451.8 | 1458.8 | 1466.7 | 1473.2 | 1481.2 | 1503.5 |
|---|---|---|---|---|---|---|---|---|---|---|
| BEFORE DESIGNING [mW] | 10 | 10 | 10 | 10 | 10 | 10 | 10 | 10 | 10 | 10 |
| FOR LINEAR ONLY [mW] | 334.26 | 218.04 | 179.77 | 89.36 | 97.43 | 52.18 | 55.43 | 40.22 | 30.48 | 51.59 |
| NONLINEAR [mW] | 327.64 | 211.93 | 175.9 | 86.34 | 95.36 | 51.91 | 53.26 | 39.01 | 29.69 | 50.23 |

FIG.37

| WAVE-LENGTH [nm] | 1424 | 1431 | 1438 | 1445 | 1452 | 1459 | 1466 | 1473 | 1495 | TOTAL |
|---|---|---|---|---|---|---|---|---|---|---|
| BEFORE DESIGNING [mW] | 42 | 42 | 42 | 42 | 42 | 42 | 42 | 42 | 42 | 378 |

FIG.39
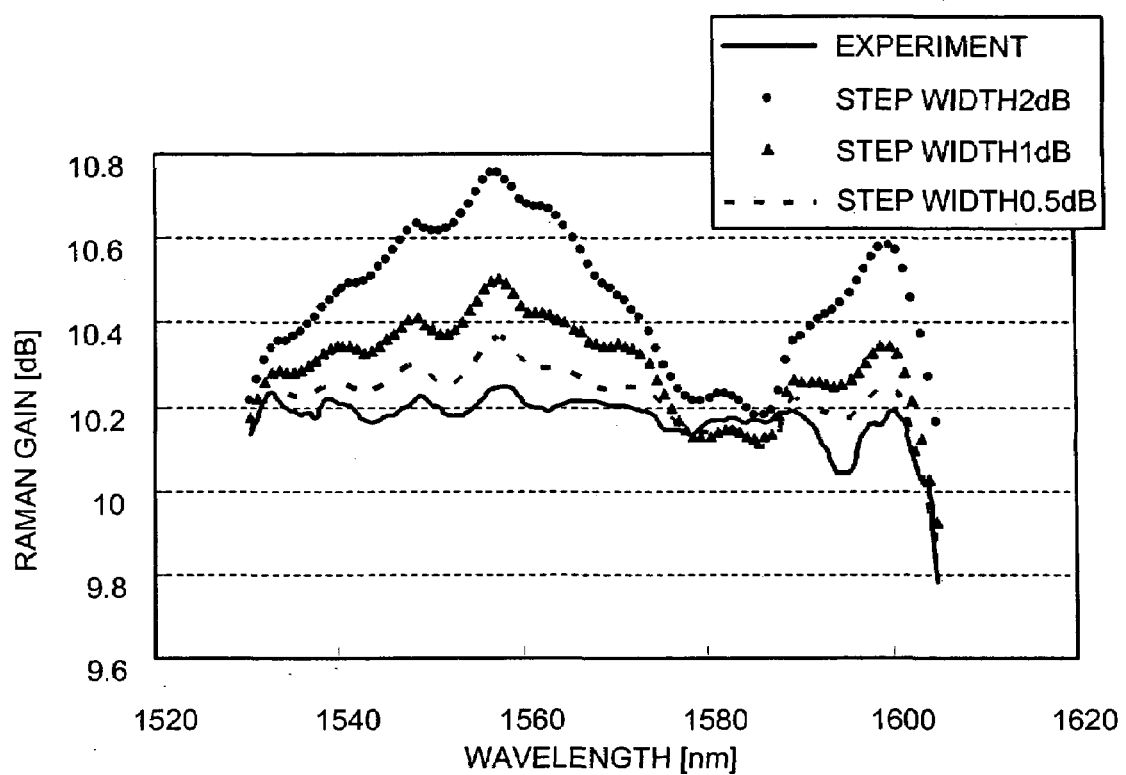
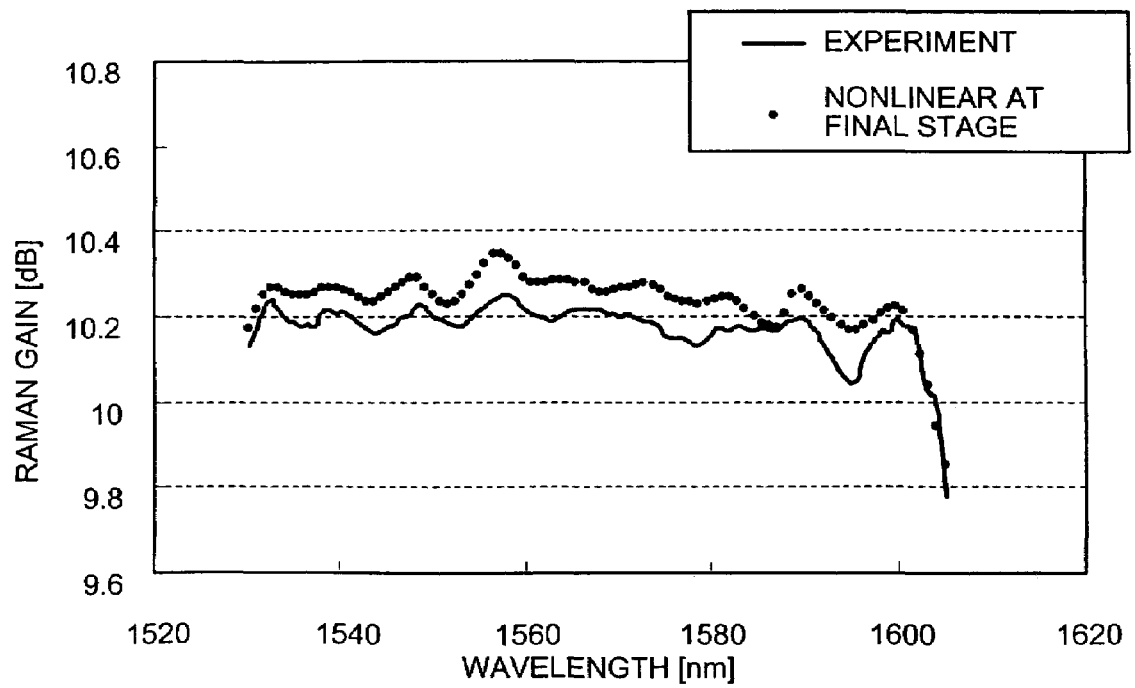

| WAVE-LENGTH [nm] | 1424 | 1431 | 1438 | 1445 | 1452 | 1459 | 1466 | 1473 | 1495 | TOTAL |
|---|---|---|---|---|---|---|---|---|---|---|
| 2dB STEP [mW] | 63 | 45 | 45 | 38 | 35 | 40 | 23 | 6 | 98 | 393 |
| 1dB STEP [mW] | 65 | 48 | 47 | 37 | 27 | 39 | 19 | 13 | 94 | 389 |
| 0.5dB STEP [mW] | 67 | 47 | 49 | 36 | 26 | 33 | 22 | 14 | 93 | 387 |
| NONLINEAR [mW] | 68 | 48 | 50 | 36 | 25 | 29 | 24 | 16 | 92 | 388 |
| EXPERIMENT [mW] | 72 | 47 | 56 | 30 | 26 | 26 | 21 | 20 | 92 | 390 |

FIG.43
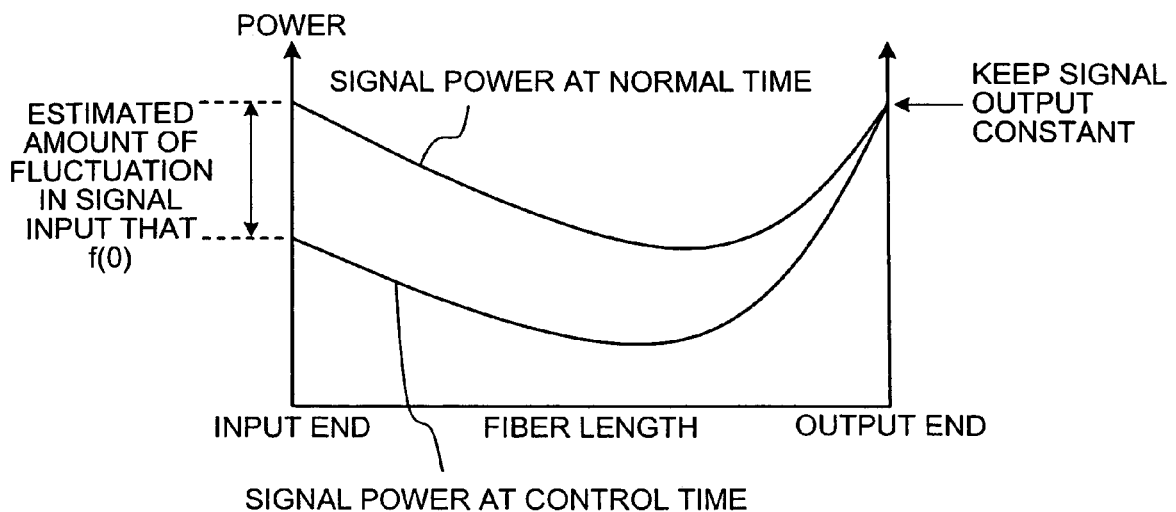
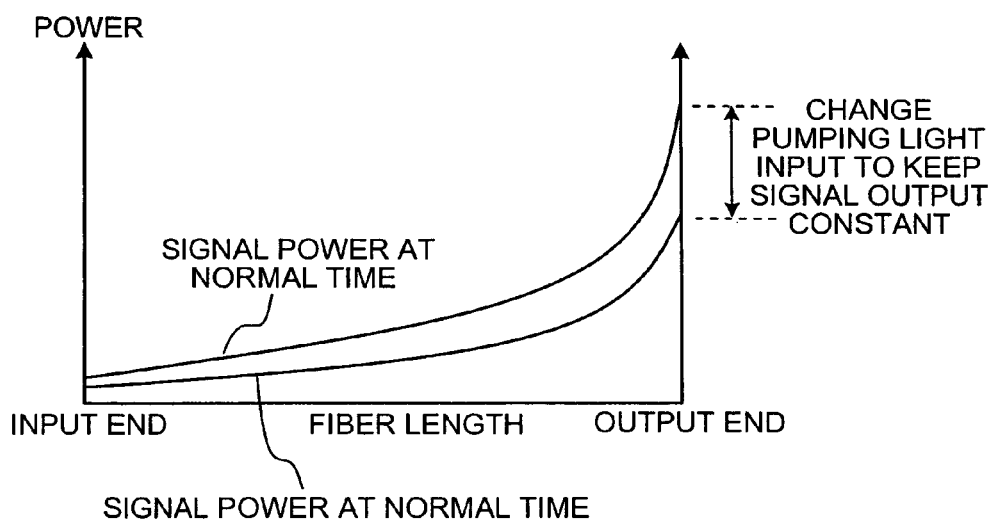

FIG.44

| WAVE-LENGTH [nm] | 1422.2 | 1430.3 | 1437.9 | 1444.8 | 1451.8 | 1458.8 | 1466.7 | 1473.2 | 1481.2 | 1503.5 |
|---|---|---|---|---|---|---|---|---|---|---|
| POWER [mW] | 519 | 301 | 227 | 90 | 96 | 48 | 47 | 31 | 20 | 25 |

| WAVE-LENGTH [nm] | 1422.2 | 1430.3 | 1437.9 | 1444.8 | 1451.8 | 1458.8 | 1466.7 | 1473.2 | 1481.2 | 1503.5 |
|---|---|---|---|---|---|---|---|---|---|---|
| BEFORE CONTROL [mW] | 519 | 301 | 227 | 90 | 96 | 48 | 47 | 31 | 20 | 25 |
| NO STEP [mW] | 480 | 292 | 225 | 90 | 174 | 50 | 46 | 33 | 20 | 28 |
| STEP WIDTH 1 dB [mW] | 472 | 281 | 221 | 90 | 197 | 49 | 46 | 33 | 19 | 28 |
| STEP WIDTH 0.5dB [mW] | 477 | 282 | 214 | 91 | 198 | 49 | 47 | 32 | 20 | 28 |

| WAVE-LENGTH [nm] | 1423.5 | 1433 | 1441.5 | 1451 | 1461 | 1470.5 | 1480.5 | 1503.5 |
|---|---|---|---|---|---|---|---|---|
| POWER [mW] | 227 | 168 | 120 | 94 | 57 | 62 | 46 | 110 |

| WAVELENGTH [nm] | 1423.5 | 1433 | 1441.5 | 1451 | 1461 | 1470.5 | 1480.5 | 1503.5 |
|---|---|---|---|---|---|---|---|---|
| BEFORE ADJUSTMENT [mW] | 227 | 168 | 120 | 94 | 57 | 62 | 46 | 110 |
| AFTER ADJUSTMENT [mW] | 240 | 176 | 124 | 96 | 58 | 62 | 45 | 104 |

US 7,262,903 B2

METHOD AND APPARATUS FOR CONTROLLING MULTIPLE-WAVELENGTH-PUMPED RAMAN AMPLIFIER AND COMPUTER PRODUCT

CROSS-REFERENCE TO RELATED APPLICATIONS

This application is a continuation of PCT/JP2004/002341 filed on Feb. 27, 2004, the entire content of which are incorporated herein by reference.

BACKGROUND OF THE INVENTION

1. Field of the Invention

The present invention relates to a technology for determining an intensity of a pumping light having a plurality of wavelengths to realize a desired gain profile in a Raman amplifier capable of amplifying a broadband signal light.

2. Description of the Related Art

Optical amplifiers are indispensable for realizing a long-distance and large-capacity optical communication system. The optical amplifiers are also effective as a means for compensating for a decrease in light signal intensity in a metro/access system, and are widely used in various optical communication systems.

One of the representative optical amplifiers is a rare-earth-doped optical fiber amplifier such as an erbium-doped fiber amplifier (EDFA) that is mainly applied to a signal band of 1.55 micrometer that is an amplification band of the EDFA. However, in recent years, since a transmission capacity required of an optical communication system has been increasing rapidly, a significant increase in a signal band is required. Therefore, it is difficult to secure a sufficient signal band only with the rare-earth-doped optical fiber amplifier. An optical amplifier applicable to optical signals in a wider band is demanded.

A Raman amplifier makes use of stimulated Raman scattering that is caused by pumping light lead into a silica fiber. Therefore, it is possible to set an amplification wavelength freely by changing a pumping light wavelength and realize a desired gain wavelength characteristic by adjusting an output distribution of pumping light consisting of a plurality of wavelengths. These are characteristics advantageous for an optical amplifier used for broadband wavelength multiplexing transmission. The rare-earth-doped optical fiber amplifier does not have the characteristics.

Various technologies utilizing these characteristics of the Raman amplifier have been proposed. The technologies include a technology for adjusting a gain wavelength characteristic by changing a pumping light output consisting of a plurality of wavelengths arbitrarily (U.S. Pat. No. 6,115,174) and a technology for realizing a flat gain wavelength characteristic by setting a plurality of pumping wavelength intervals properly (U.S. Pat. No. 6,292,288).

On the other hand, to put the Raman amplifier into practice widely, it is necessary to obtain appropriate pumping light outputs automatically and promptly such that a desired gain wavelength characteristic is obtained. However, it is impossible to determine pumping light outputs for realizing a desired gain wavelength characteristic with the technologies described above. This is because an inverse problem has to be solved to determined pumping light power and, if a nonlinear optimization method is used to solve the inverse problem, convergence of solutions depends on initial values. A complicated optimization algorithm is required to cause solutions to converge on an optimum value with respect to initial values in a wider range.

As an example of such an algorithm, there is a technology that neglects inter-signal Raman and adopts an automatic determination method for pumping wavelength and power using a generic algorithm (Victor E. Perlin, et al., (2002), "Efficient design method for multi-pump flat-gain fiber Raman amplifiers", OFC2002, TuJ1, p. 57). Note that, as a technology for determining a pumping light output more easily, there is a technology for storing optical outputs of pumping wavelengths, which realize an expected gain wavelength profile, in a memory and extracting a condition close to a desired profile from the memory to perform control (U.S. Publication No. 2001/0050802 A1). There is also a literature that describes a control method for preventing fluctuation of a transitional pumping state due to an increase or a decrease of pumping light sources in expanding or reducing an amplification wavelength band (Japanese Patent Application No. 2001-109361).

SUMMARY OF THE INVENTION

It is an object of the present invention to at least solve the problems in the conventional technology.

A multiple-wavelength-pumped Raman amplifier according to one aspect of the present invention, which sets and controls arbitrary signal gain and output characteristics for a wavelength-multiplexed signal light, includes a control unit that controls, based on a relational expression associating a first fluctuation amount, a second fluctuation amount, a third fluctuation amount, and a fourth fluctuation amount, two fluctuation amounts from among the first to the fourth fluctuation amounts by determining other two fluctuation amounts in advance, to determine pumping light powers satisfying the relational expression. The first fluctuation amount is an amount of fluctuation in a current signal light power at a signal input end. The second fluctuation amount is an amount of fluctuation in a current pumping light power at a pumping light input end. The third fluctuation amount is an amount of fluctuation in the current signal power at a signal output end. The fourth fluctuation amount is an amount of fluctuation in the current pumping light power at a pumping light output end.

A method according to another aspect of the present invention, which is for controlling a multiple-wavelength-pumped Raman amplifier that sets and controls arbitrary signal gain and output characteristics for a wavelength-multiplexed signal light, includes controlling, based on a relational expression associating a first fluctuation amount, a second fluctuation amount, a third fluctuation amount, and a fourth fluctuation amount, two fluctuation amounts from among the first to the fourth fluctuation amounts by determining other two fluctuation amounts in advance, to determine pumping light powers satisfying the relational expression. The first fluctuation amount is an amount of fluctuation in a current signal light power at a signal input end. The second fluctuation amount is an amount of fluctuation in a current pumping light power at a pumping light input end. The third fluctuation amount is an amount of fluctuation in the current signal power at a signal output end. The fourth fluctuation amount is an amount of fluctuation in the current pumping light power at a pumping light output end.

A computer-readable recording medium according to still another aspect of the present invention stores a program for controlling a multiple-wavelength-pumped Raman amplifier that sets and controls arbitrary signal gain and output characteristics for a wavelength-multiplexed signal light.

The program causes a computer to execute controlling, based on a relational expression associating a first fluctuation amount, a second fluctuation amount, a third fluctuation amount, and a fourth fluctuation amount, two fluctuation amounts from among the first to the fourth fluctuation amounts by determining other two fluctuation amounts in advance, to determine pumping light powers satisfying the relational expression. The first fluctuation amount is an amount of fluctuation in a current signal light power at a signal input end. The second fluctuation amount is an amount of fluctuation in a current pumping light power at a pumping light input end. The third fluctuation amount is an amount of fluctuation in the current signal power at a signal output end. The fourth fluctuation amount is an amount of fluctuation in the current pumping light power at a pumping light output end.

An apparatus according to still another aspect of the present invention, which is for controlling pumping light powers for a multiple-wavelength-pumped Raman amplifier that is pumped by pumping lights from a plurality of pumping light sources, by measuring gain wavelength characteristic or signal-power wavelength characteristic of the multiple-wavelength-pumped Raman amplifier using a plurality of photodetectors having different wavelength-sensitivity characteristics, includes a determining unit that estimates a power of each of signal channels in a wavelength band for use based on values monitored by the photodetectors, and determines the pumping light powers using the power of each of the signal channels estimated.

A method according to still another aspect of the present invention, which is for controlling pumping light powers for a multiple-wavelength-pumped Raman amplifier that is pumped by pumping lights from a plurality of pumping light sources, by measuring gain wavelength characteristic or signal-power wavelength characteristic of the multiple-wavelength-pumped Raman amplifier using a plurality of photodetectors having different wavelength-sensitivity characteristics, includes estimating a power of each of signal channels in a wavelength band for use based on values monitored by the photodetectors; and determining the pumping light powers using the power of each of the signal channels estimated.

A method according to still another aspect of the present invention, which is for measuring gain wavelength characteristic or signal-power wavelength characteristic of a multiple-wavelength-pumped Raman amplifier that is pumped by pumping lights from a plurality of pumping light sources based on values monitored by a plurality of photodetectors having different wavelength-sensitivity characteristics, includes calculating the gain wavelength characteristic or the signal-power wavelength characteristic from the wavelength-sensitivity characteristics of the photodetectors and gain wavelength characteristics obtained by Raman amplification by the pumping light sources.

A computer readable recording medium according to still another aspect of the present invention stores a program for controlling pumping light powers for a multiple-wavelength-pumped Raman amplifier that is pumped by pumping lights from a plurality of pumping light sources, by measuring gain wavelength characteristic or signal-power wavelength characteristic of the multiple-wavelength-pumped Raman amplifier using a plurality of photodetectors having different wavelength-sensitivity characteristics. The program causes a computer to execute estimating a power of each of signal channels in a wavelength band for use based on values monitored by the photodetectors; and determining the pumping light powers using the power of each of the signal channels estimated.

A computer readable recording medium according to still another aspect of the present invention stores a program for measuring gain wavelength characteristic or signal-power wavelength characteristic of a multiple-wavelength-pumped Raman amplifier that is pumped by pumping lights from a plurality of pumping light sources based on values monitored by a plurality of photodetectors having different wavelength-sensitivity characteristics. The program causes a computer to execute calculating the gain wavelength characteristic or the signal-power wavelength characteristic from the wavelength-sensitivity characteristics of the photodetectors and gain wavelength characteristics obtained by Raman amplification by the pumping light sources.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 shows fluctuations of power distributions of a signal light and a pumping light due to an external factor;

FIG. 27 is a graph of transitions of wavelength-dependent output signal powers until the output signal power converges to Net Gain 0 dB according to a first embodiment of the present invention;

FIG. 28 is a graph of transitions of wavelength-dependent output signal powers until the output signal power converges to Net Gain 0 dB according to a second embodiment of the present invention;

FIG. 29 is a graph of transitions of wavelength-dependent output signal powers until the output signal power converges to Net Gain 0 dB according to a third embodiment of the present invention;

FIG. 30 is a graph of transitions of wavelength-dependent output signal powers until the output signal power converges to Net Gain 0 dB according to a fourth embodiment of the present invention;

FIG. 36 is a table of pumping light powers before designing, after convergence by a linear approximation, and after convergence by a method of solving a nonlinear equation at a final stage;

FIG. 37 is a table of pumping light powers before designing and pumping light wavelengths according to a ninth embodiment of the present invention;

FIG. 39 is a graph of wavelength dependencies of a measured value of Raman gain and a Raman gain calculated from pumping light power obtained by solving an inverse problem according to the ninth embodiment;

FIG. 43 is a graph of a process of determination of pumping light power corresponding to a second stage of control, indicated as distributions in a longitudinal direction of signal light power and pumping light power;

FIG. 44 is a schematic of pumping light wavelengths and powers at the time of designing according to a tenth embodiment of the present invention;

DETAILED DESCRIPTION OF THE PREFERRED EMBODIMENTS

Exemplary embodiments of the present invention are described in detail below with reference to the accompanying drawings.

Figure 1:
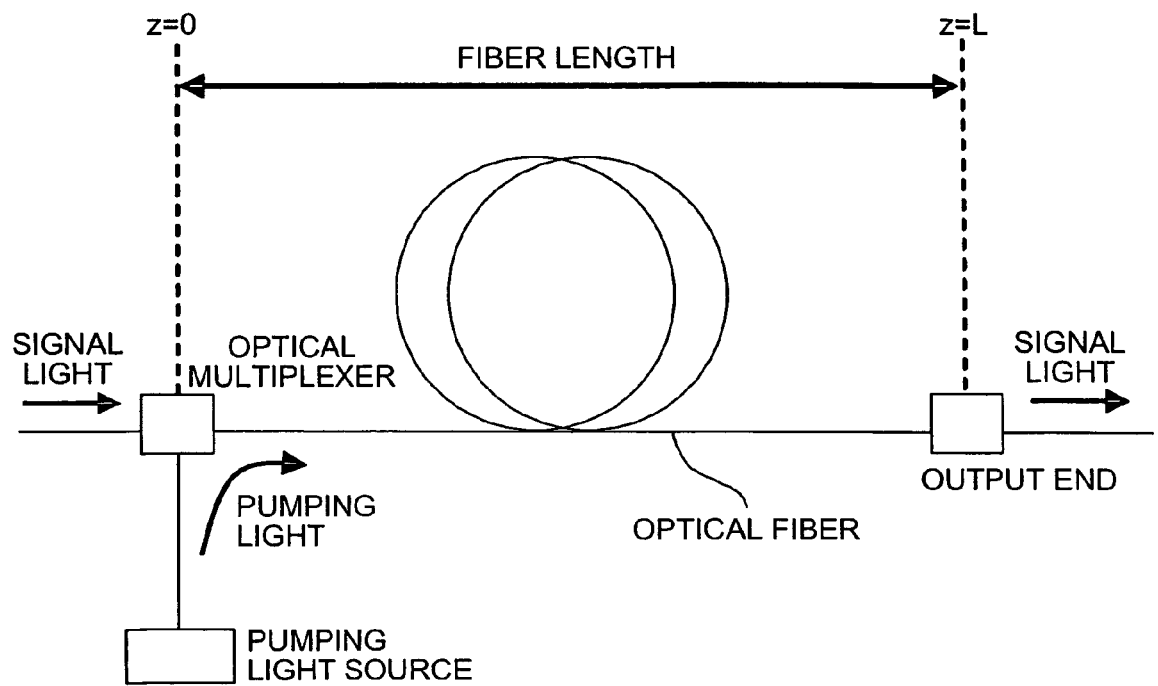
FIG. 1 is a schematic of a forward-pumped Raman amplifier using a single-wavelength pumping light.

FIG. 1 is a schematic of a forward-pumped Raman amplifier using a single-wavelength pumping light. A signal light propagates in an optical transmission line in an arrow direction in the figure. A pumping light, which is emitted from a pumping light source through an optical multiplexer provided in the middle, is lead to the optical transmission line. The signal light multiplexed with the pumping light is subjected to Raman amplification through an amplification medium and outputted from an exit end. As the amplification medium, an amplification medium with high nonlinearity is used. For example, the amplification medium is the optical transmission line itself in a distributed Raman amplifier and is a dispersion compensating fiber (DCF) in a centralized amplifier.

With this Raman amplifier, an arithmetic operation process, to which a method of liner approximation according to the present invention is applied to obtain pumping light input conditions satisfying a desired signal light output characteristic, is described. Note that, according to the present invention, examples of application related to operations of the Raman amplifier are classified into three examples of design, control, and adjustment.

The design means determining optimum pumping light power to satisfy target specifications (output signal light power, a Raman gain, a net gain, etc.).

The control means changing, when an output signal changes because of a change in an input signal or a change in a line state, pumping light power to keep the output in a range required by specifications or return the output to the range.

The adjustment means changing, when an output deviates from a specification value, pumping light power to bring the output close to the specification value. When the specification value is changed, adjustment also means changing pumping light power to bring the output close to a changed value of the specification value.

As a simplest system of a Raman amplifier, the system in FIG. 1 is considered. Propagation equations neglecting influences of a Rayleigh scattering term and an Amplified Spontaneous Emission (ASE) term are expressed as $$\frac{dP_S}{dz} = -\alpha_S P_S + g_{SP} P_S P_P \tag{1}$$

$$\frac{dP_P}{dz} = -\alpha_P P_P - g_{PS} P_P P_S \tag{2}$$

where, $P_S=P_S(z)$ represents a longitudinal distribution of signal light power, $P_P=P_P(z)$ represents a longitudinal distribution of pumping light power, $\alpha_S$ and $\alpha_P$ represents absorption coefficients of signal light and pumping light, respectively, and $g_{SP}$ represents Raman-gain efficiency between the signal light and the pumping light. $g_{PS}$ is represented as $g_{PS}=g_{SP}\times v_P/v_S$. $v_P$ and $v_S$ are frequencies of the pumping light and the signal light, respectively. Note that z is a position coordinate in a fiber longitudinal direction. When signal light power and pumping light power at the time when pumping light power is designed under arbitrary conditions are set as $P_S=P_{S0}(z)$ and $P_P=P_{P0}(z)$, respectively, and substituted in Eqs. (1) and (2), the following equations are obtained $$\frac{dP_{S0}}{dz} = -\alpha_S P_{S0} + g_{SP} P_{S0} P_{P0} \tag{3}$$

$$\frac{dP_{P0}}{dz} = -\alpha_P P_{P0} - g_{PS} P_{P0} P_{S0} \tag{4}$$

where, solutions of $P_{S0}$ and $P_{P0}$ are at least known in terms of numerical values. A state in which power fluctuates from a certain designed state is considered. As a result, it is assumed that the following equations are obtained $$P_S(z) = P_{S0}(z) + \epsilon(z) \tag{5}$$

$$P_P(z) = P_{P0}(z) + \eta(z) \tag{6}$$

FIG. 2 shows power distributions in a longitudinal direction of signal light and pumping light and power distributions at the time when the signal light and the pumping light fluctuate because of some influence. Eqs. (5) and (6) are substituted in Eqs. (1) and (2), then the equations become $$\frac{d}{dz}(P_{S0}+\epsilon) = -\alpha_S(P_{S0}+\epsilon) + g_{SP}(P_{S0}+\epsilon)(P_{P0}+\eta) \tag{7}$$

$$\frac{d}{dz}(P_{P0}+\eta) = -\alpha_P(P_{P0}+\eta) - g_{PS}(P_{P0}+\eta)(P_{S0}+\epsilon) \tag{8}$$

From Eqs. (3) and (4), the following equations are obtained $$\frac{d\varepsilon}{dz} = -\alpha_S \varepsilon + g_{SP}\varepsilon P_{P0} + g_{SP}P_{S0}\eta + g_{SP}\varepsilon\eta \quad (9)$$

$$\frac{d\eta}{dz} = -\alpha_P \eta - g_{PS}\eta P_{S0} - g_{PS}P_{P0}\varepsilon - g_{PS}\eta\varepsilon \quad (10)$$

If a term of $\varepsilon \times \eta$ is neglected considering that $\varepsilon$ and $\eta$ are small compared with PS0 and PP0, Eqs. (9) and (10) change to the following differential equations $$\frac{d\varepsilon}{dz} = -\alpha_S \varepsilon + g_{SP}P_{P0}\varepsilon + g_{SP}P_{S0}\eta \quad (11)$$

$$\frac{d\eta}{dz} = -\alpha_P \eta - g_{PS}P_{P0}\varepsilon - g_{PS}P_{S0}\eta \quad (12)$$

This is expressed in vector as indicated by $$\begin{pmatrix} \frac{d\varepsilon}{dz} \\ \frac{d\eta}{dz} \end{pmatrix} = \begin{pmatrix} -\alpha_S + g_{SP}P_{P0}(z) & g_{SP}P_{S0}(z) \\ -g_{PS}P_{P0}(z) & -\alpha_P - g_{PS}P_{S0}(z) \end{pmatrix} \begin{pmatrix} \varepsilon \\ \eta \end{pmatrix} = F\begin{pmatrix} \varepsilon \\ \eta \end{pmatrix} \quad (13)$$

Since there are functions of z such as $P_{S0}(z)$ and $P_{P0}(z)$ in a matrix F, it is impossible to solve the equation analytically. However, if a longitudinal direction of an optical transmission line is divided into n very small sections, it is possible to solve the equation approximately assuming that $P_{S0}(z)$ and $P_{P0}(z)$ are constants between an $i^{th}$ section and an $(i+1)^{th}$ section.

Accuracy is higher when n is larger. However, since longer time is required, n only has to be determined properly. According to the present embodiment of the distributed Raman, n is determined such that the very small sections are divided at intervals of 0.5 kilometer. $P_{S0}(z)$ and $P_{P0}(z)$ are calculated by linearly interpolating a center value of the very small sections. However, it is also possible that power is converted into a logarithmic scale once and another interpolation method such as linear interpolation or Lagrange's interpolation is used.

Both sides of Eq. (13) are multiplied by a matrix $P^{-1}$ from the left of the sides. Note that $P^{-1}FP=B$ and B is a diagonal matrix. Then, $$P^{-1}\begin{pmatrix} \frac{d\varepsilon}{dz} \\ \frac{d\eta}{dz} \end{pmatrix} = P^{-1}FPP^{-1}\begin{pmatrix} \varepsilon \\ \eta \end{pmatrix} \quad (14)$$

$$P^{-1}\begin{pmatrix} \frac{d\varepsilon}{dz} \\ \frac{d\eta}{dz} \end{pmatrix} = BP^{-1}\begin{pmatrix} \varepsilon \\ \eta \end{pmatrix}$$

When $\begin{pmatrix} \frac{d\varepsilon'}{dz} \\ \frac{d\eta'}{dz} \end{pmatrix} = P^{-1}\begin{pmatrix} \frac{d\varepsilon}{dz} \\ \frac{d\eta}{dz} \end{pmatrix}$, $\begin{pmatrix} \varepsilon' \\ \eta' \end{pmatrix} = P^{-1}\begin{pmatrix} \varepsilon \\ \eta \end{pmatrix}$, and $B = \begin{pmatrix} \alpha & 0 \\ 0 & \beta \end{pmatrix}$, Eq. (14)

changes to $$\begin{pmatrix} \frac{d\varepsilon'}{dz} \\ \frac{d\eta'}{dz} \end{pmatrix} = \begin{pmatrix} \alpha & 0 \\ 0 & \beta \end{pmatrix}\begin{pmatrix} \varepsilon' \\ \eta' \end{pmatrix}.$$

When this equation is expanded, $$\frac{d\varepsilon'}{dz} = \alpha\varepsilon', \frac{d\eta'}{dz} = \beta\eta'$$

is obtained. $\varepsilon'$ and $\eta'$ are represented as functions of z as $\varepsilon' = k_1 \exp(\alpha z), \eta' = k_2 \exp(\beta z),$ where k1 and k2 are constants. Therefore, $$\begin{pmatrix} \varepsilon \\ \eta \end{pmatrix} = P\begin{pmatrix} \varepsilon' \\ \eta' \end{pmatrix} = \begin{pmatrix} P_{11} & P_{12} \\ P_{21} & P_{22} \end{pmatrix}\begin{pmatrix} k_1\exp(\alpha z) \\ k_2\exp(\beta z) \end{pmatrix}, \text{ where } P = \begin{pmatrix} P_{11} & P_{12} \\ P_{21} & P_{22} \end{pmatrix},$$

and $\varepsilon$ and $\eta$ are represented as functions of z. Therefore, a relational expression of $z=z_i$ and $z=z_{i+1}$ is derived as $$\begin{pmatrix} \varepsilon(z_{i+1}) \\ \eta(z_{i+1}) \end{pmatrix} = A_i\begin{pmatrix} \varepsilon(z_i) \\ \eta(z_i) \end{pmatrix}$$

Moreover, when it is assumed that $\varepsilon=\varepsilon(0)$ and $\eta=\eta(0)$ at an input end and $\varepsilon=\varepsilon(L)$ and $\eta=\eta(L)$ at an output end, a relational expression of the input end and the output end is derived as $$\begin{pmatrix} \varepsilon(L) \\ \eta(L) \end{pmatrix} = A_{n-1}A_{n-2}\ldots A_2 A_1\begin{pmatrix} \varepsilon(0) \\ \eta(0) \end{pmatrix} = A\begin{pmatrix} \varepsilon(0) \\ \eta(0) \end{pmatrix} \quad (15)$$

where, L is a fiber length and A is a matrix of two rows and two columns, which includes $\alpha_S$, $\alpha_P$, $g_{SP}$, $g_{PS}$, $P_{S0}(z)$, and $P_{P0}(z)$. All of these are known values in an initial design state.

Distributions of signals and pumping powers included in this matrix A may be obtained by solving a nonlinear propagation equation or may be obtained by measurement. The measurement may be performed by Optical Time Domain Reflectometry (OTDR).

The matrix elements may be obtained by measurement directly. As a method of the measurement, for example, pumping powers are caused to fluctuate sequentially one by one and amounts of fluctuation of a gain are measured sequentially to calculate matrix elements from values of the measurement.

Figure 3:
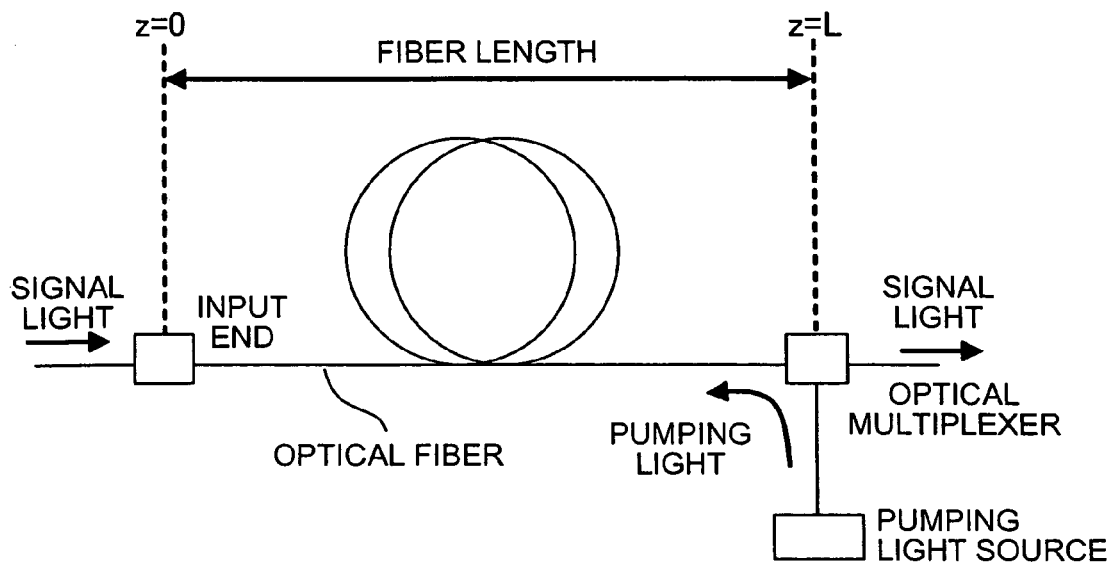
FIG. 3 is a schematic of a backward-pumped Raman amplifier using a single-wavelength pumping light.

In other words, if two of four parameters $\epsilon(0)$, $\eta(0)$, $\epsilon(L)$, and $\eta(L)$, that is, an amount of fluctuation in signal light input, an amount of fluctuation in pumping light input, an amount of fluctuation in signal light output, and an amount of fluctuation in pumping light output are determined in this relational expression, the remaining two parameters are automatically determined. In FIG. 3, one wave of signal light is amplified by a Raman amplifier with one wave of backward pumping light. The above description is also applicable to the constitution in FIG. 3.

Figure 4:
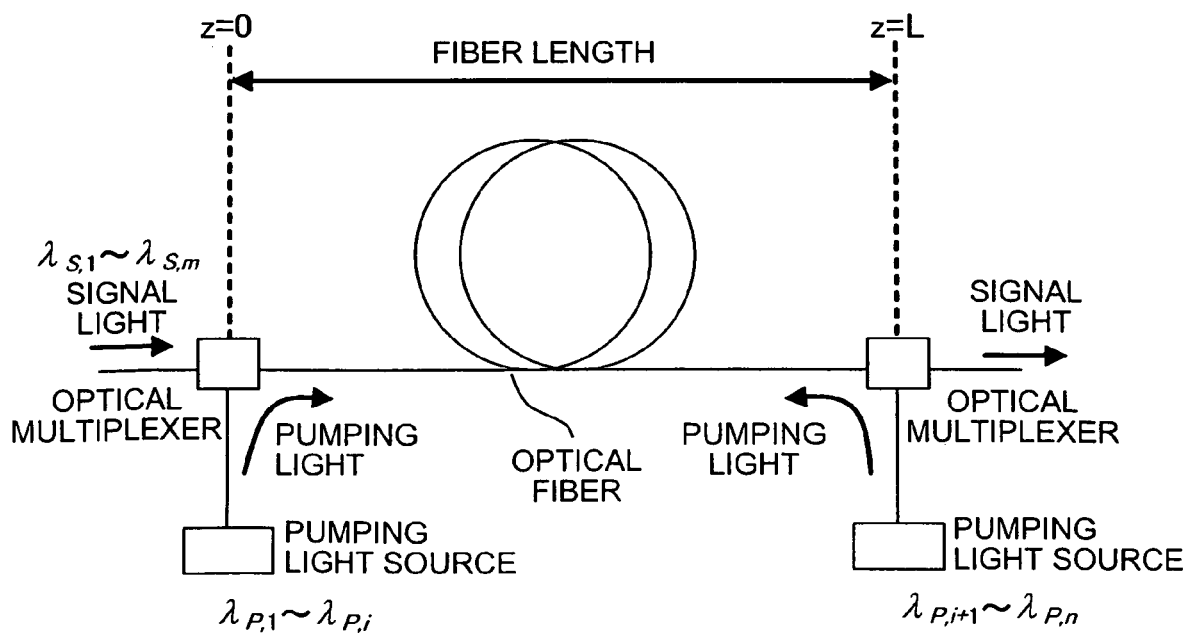
FIG. 4 is a schematic for illustrating an amplification of wavelength-division-multiplexed (WDM) signal light by a Raman amplifier using a forward pumping light and a backward pumping light having a total of n wavelengths.

The concept described above is extensible to an arbitrary number of waves of light. It is assumed that signal lights are m waves and pumping lights are n waves. It is also assumed that the pumping lights may include forward pumping light and backward pumping light. A diagram in that case is shown in FIG. 4. In FIG. 4, m waves of Wavelength Division Multiplexing (WDM) signal light are amplified by a Raman amplifier with total n waves of forward pumping light and backward pumping light. Respective light sources include a plurality of pumping laser diodes (LDs). Lights emitted from the respective pumping LDs are multiplexed by a wavelength multiplexer. The pumping LDs of respective wavelengths may be constituted to eliminate polarization dependency of a gain with a polarization beam combiner or a depolarizer before or after wavelength multiplexing. The symbol $\lambda$ in the figure represents the respective wavelengths. First subscripts S and P represent signal light and pumping light, respectively. Second subscripts represent numbers of signal light and pumping light, respectively. Subscripts m and n do not always have to be equal. In general, m is often larger than n in WDM transmission. Eq. (15) can be expanded as $$\begin{pmatrix} \epsilon_1(L) \\ \vdots \\ \epsilon_m(L) \\ \eta_1(L) \\ \vdots \\ \eta_n(L) \end{pmatrix} = A \begin{pmatrix} \epsilon_1(0) \\ \vdots \\ \epsilon_m(0) \\ \eta_1(0) \\ \vdots \\ \eta_n(0) \end{pmatrix} \quad (16)$$

Amounts of fluctuation in signal light and pumping light are set as $\epsilon$ and $\eta$, respectively. A is a matrix of $(m+n)\times(m+n)$. Eq. (16) indicates that, if two of four amounts of fluctuation in input pumping light power, output pumping light power, input signal light power, and output signal light power are known, it is possible to determine the remaining amounts of fluctuation. However, the number of unknown amounts to be determined must not exceed a conditional number. When the conditional number is large, the unknown amounts are determined by a linear least squares method. Although the least squares method is used According to the present embodiment, other method such as a method of minimizing a sum of quadratics of deviation may be used as long as the methods are used for the purpose of reducing deviation from a target value.

When it is desired to cause output signal power to fluctuate to a certain target value assuming that input signal power does not change with backward pumping light, an amount of fluctuation in pumping light power corresponding to the fluctuation is calculated. The calculation of the amount of fluctuation in pumping light power is explained as an example. Note that both signal light and pumping light are considered to be one wave. It is assumed that, if $\eta(L)$ is derived using Eq. (15) and pumping light power is converted as $P_{Po}(L)+\eta(L)$ to solve a nonlinear power transmission equation, a target signal output is obtained. However, actually, since linear approximation is performed, an error occurs between the pumping light power and the target signal output. When a degree of the error is estimated from Eq. (9), it is seen that the error is substantially proportional to a square of an amount of fluctuation to the target signal output. Thus, it is necessary to reduce the amount of fluctuation in an output signal to some extent to reduce the error. In other words, it is possible to improve accuracy of prediction by the linear approximation by using a method of setting a provisional target value until an output signal is brought close to the target value and bringing the output signal close to the target value stepwise.

To bring the output signal close to the target value step by step in this method, it is necessary to update the matrix A at each step. To determine the matrix A accurately, a longitudinal distribution of pumping light power before fluctuation and signal light power have to be known accurately. Thus, there are the following three methods as a method of updating the longitudinal distribution of pumping light power before fluctuation and signal light power.

In a first method, signal light power and pumping light power are updated to latest predicted solutions and caused to converge at each step in such a manner as $PS0(z) \rightarrow PS0(z)+\epsilon(z)$, $PP0(z) \rightarrow PP0(z)+\eta(z)$. Note that $\epsilon(z)$ and $\eta(z)$ are calculated by the linear approximation and known already. In this method, since a nonlinear equation is not solved, calculation time is extremely high. Since an error due to the linear approximation is added at each step, it is necessary to set a step width such that a final error between the output signal power and the target value is within an allowable range. Since this method can be performed at high speed, the method is effective mainly for control and adjustment of the Raman amplifier. A nonlinear equation is solved at an initial stage. However, since only longitudinal distribution power information before fluctuation is necessary, if this information is already known, a solution can be derived only by linear calculation completely.

After the signal light power and the pumping light power converge with the first method of, work for solving a power propagation equation including a Rayleigh scattering term and an ASE term to update $P_{S0}(z)$ and $P_{P0}(z)$ to accurate solutions and determining an amount of power fluctuation using values of the solutions according to Eq. (15) is repeated. Since it is possible to solve a nonlinear equation and confirm an error between the target value and the output signal every time, signal light power and pumping light power converge to optimum values surely. Since this second method is extremely accurate, the method is effective mainly for design of the Raman amplifier.

In a third method, a longitudinal direction power before fluctuation is updated to an accurate solution by solving the power propagation equation at every-step. A value obtained finally is principally the same as that in the second method. Thus, this method is effective mainly for design of the Raman amplifier. It is sufficient that a step width in this case is within 2 dB. A reason why the step width is determined as 2 dB is described later.

A step interval from the known condition to the next provisional target value can take various forms depending on conditions for prediction. For example, According to the present embodiment, the step interval is set to be fixed by a unit of dB. However, the interval may be set such that a ratio of the interval to a basic optical output is fixed. It is also possible to set the step interval such that an interval at an optical output (unit: W) is fixed. Moreover, this step interval does not always have to be a fixed value. For example, the step interval may be set fine under conditions in which prediction errors tend to occur and set rather rough under conditions in which relatively few prediction errors occur to improve response. It is desirable to combine these step intervals suitably to realize both required prediction accuracy and speed.

Figure 5:
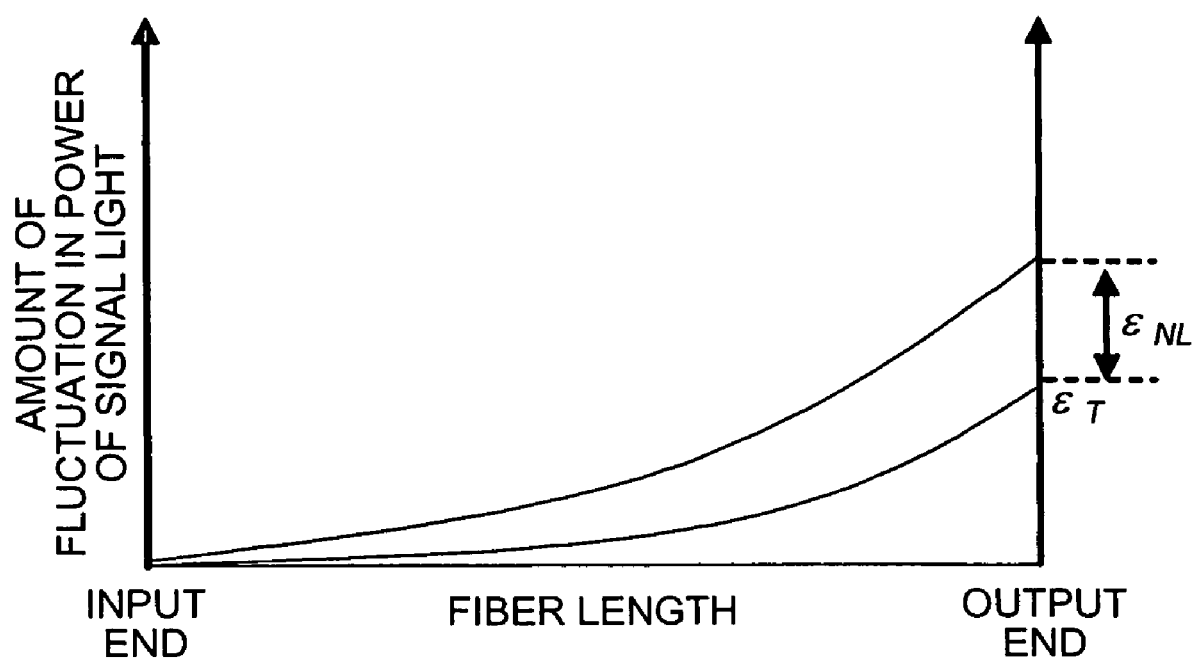
FIG. 5 is a graph of a longitudinal distribution of an amount of fluctuation in signal light power.

In the third method, the step width is determined as 2 dB. A reason for determining the step width as 2 dB is as described below. Concerning the output signal power, a "difference between the value before fluctuation and the provisional target value" and a "difference between the value after fluctuation and the provisional target value" are compared. If the "difference between the value after fluctuation and the provisional target value" is larger, it is likely that the signal light power and the pumping light power diverge even if the work is performed repeatedly. This is because the nonlinear terms in Eqs. (9) and (10) are neglected. Thus, an algorithm for making the "difference between the value after fluctuation and the provisional target value" smaller is required. First to third terms on the right part of Eq. (9) are linear terms with respect to $\epsilon$ and $\eta$. A fourth term is a nonlinear term with respect to $\epsilon$ and $\eta$. In the linear approximation, this fourth term is neglected. In FIG. 5, $\epsilon_S(L)=\epsilon_T$ is set as a target by the linear approximation. Actually, $\epsilon NL$ appears as an error. FIG. 5 is a schematic graph of a longitudinal distribution of an amount of fluctuation of signal light power. Based on Eq. (9), $\epsilon NL$ and $\epsilon_T$ are represented as $$\epsilon_{NL} = \int (g_{SP}\epsilon\eta)dz \quad (17)$$

$$\epsilon_T = \int (-\alpha_S\epsilon + g_{SP}\epsilon P_{P0} + g_{SP}P_{S0}\eta)dz \quad (18)$$

where, if $\epsilon T$ is larger than $\epsilon NL$, the output signal power is closer to the target value than the original value. If the first term on the right part of Eq. (9) is neglected considering that $\alpha S$ is sufficiently small, Eq. (18) can be represented as $$\varepsilon_T = \int (g\varepsilon P_{P0} + gP_{S0}\eta)dz = \int g\varepsilon\eta\left(\frac{P_{P0}}{\eta} + \frac{P_{S0}}{\varepsilon}\right)dz \quad (19)$$

To have $\Sigma T$ larger than $eN$, from Eqs. (17) and (19), the following expression only has to be obtained.

$$\frac{P_{P0}}{\eta} + \frac{P_{S0}}{\varepsilon} > 1 \quad (20)$$

Since $P_{P0}$ and $\eta$ are positive in this system, the expression is established if $P_{S0}$ is larger than $\epsilon$. Therefore, if the difference between the value after fluctuation and the provisional target value is within 3 dB, the output signal power is closer to the provisional target value than the original value. According to the present embodiment, taking into account influence of a loss not included in the expression above, this value is set to 2 dB. In other words, if the difference between the value after fluctuation and the target value is 2 dB or more, a value closer to the target value by 2 dB is determined as the provisional target value. If the difference is within 2 dB, the provisional target value is not set, and Eq. (15) is solved such that the output signal value is equal to the target value. It goes without saying that a value other than 2 dB may be set by finding a proper numerical value taking into account speed for bringing the output signal power close to the target value and safety.

Note that the method described above can be applied in the same manner in the case of three or more waves.

The method is explained as a method of determining pumping light power to fix an input signal and increase an output signal to a target value. Besides, the applied method can be applied, for example, when an input signal and an output signal have an opposite relation or when an output signal and an amount of fluctuation in pumping light power is known and an input signal is estimated as long as two of the four amounts of fluctuation in Eq. (16) are known and the method is performed for the purpose of determining the remaining two amounts of fluctuation.

In the above description, to obtain true values of $P_{S0}(z)$ and $P_{P0}(z)$, the nonlinear equation is solved or an amount of fluctuation obtained by the linear approximation is added. However, instead, the description may be applied to an actual system to perform measurement and obtain a numerical value. In addition, a value obtained on the basis of a measured value may be used. For example, the measurement is performed by an OTDR.

Figure 6:
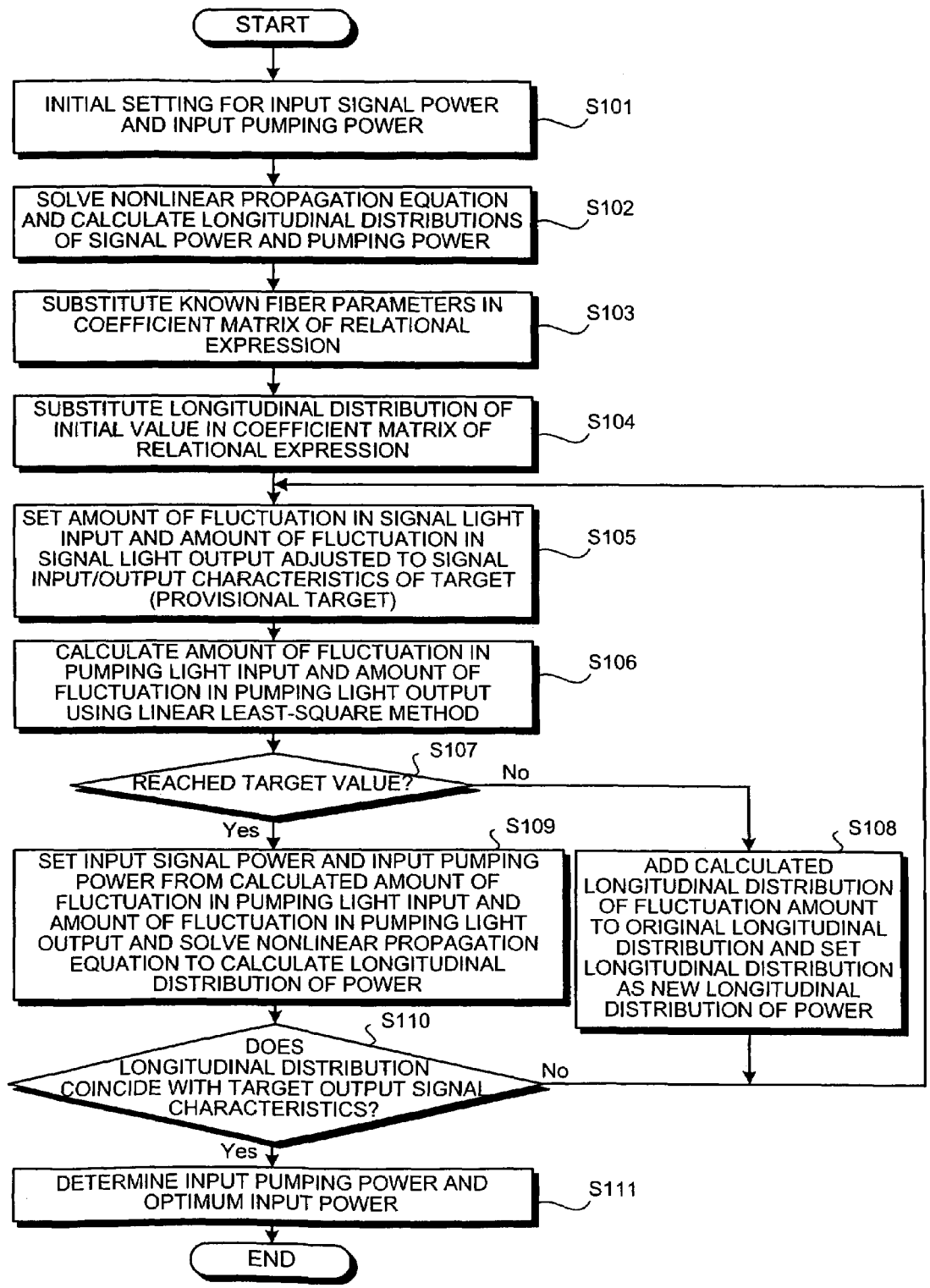
FIG. 6 is a flowchart of a processing procedure for determining an optimum input power at the time of designing.
Figure 7:
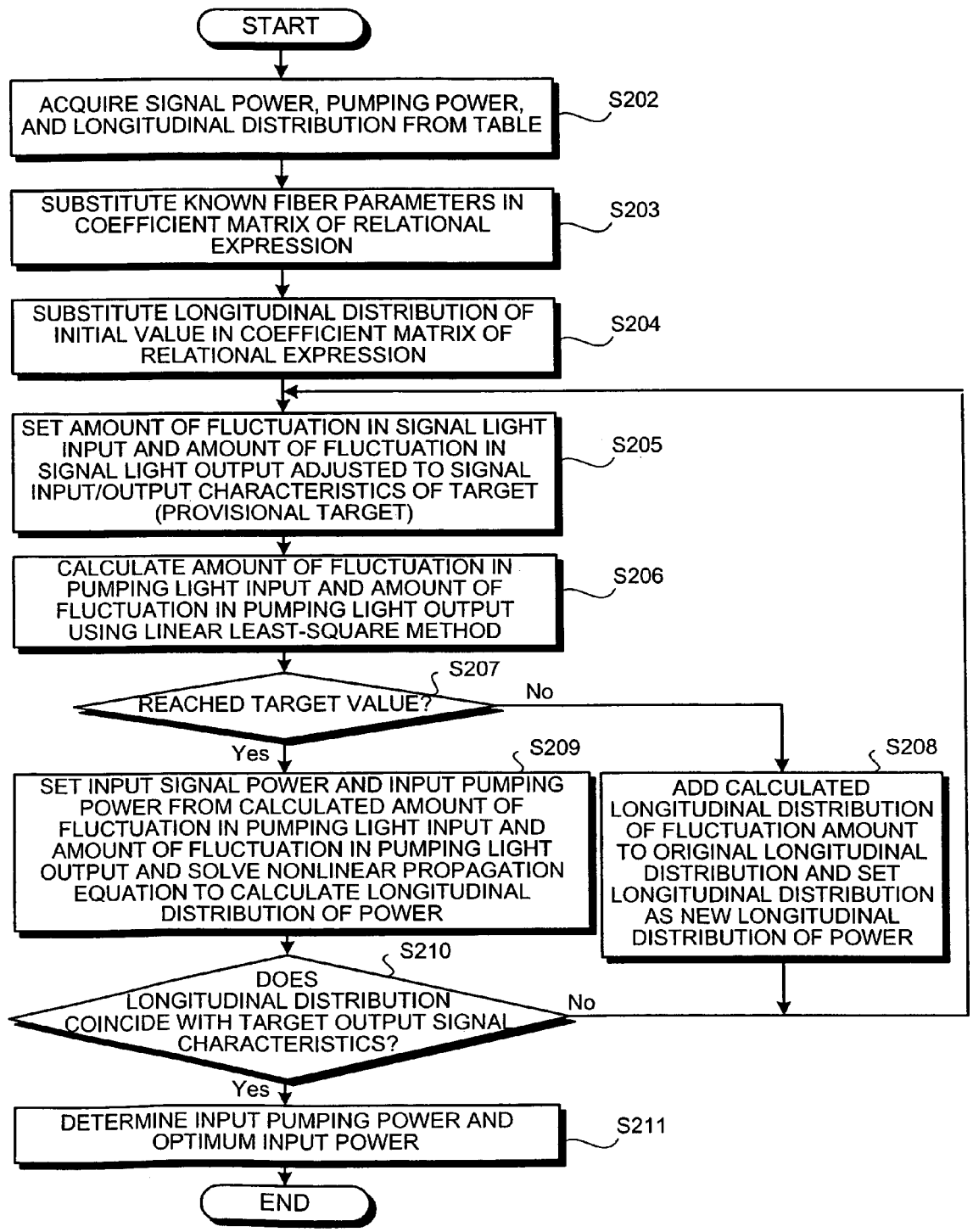
FIG. 7 is a flowchart of another processing procedure for determining the optimum input power at the time of designing.
Figure 8:
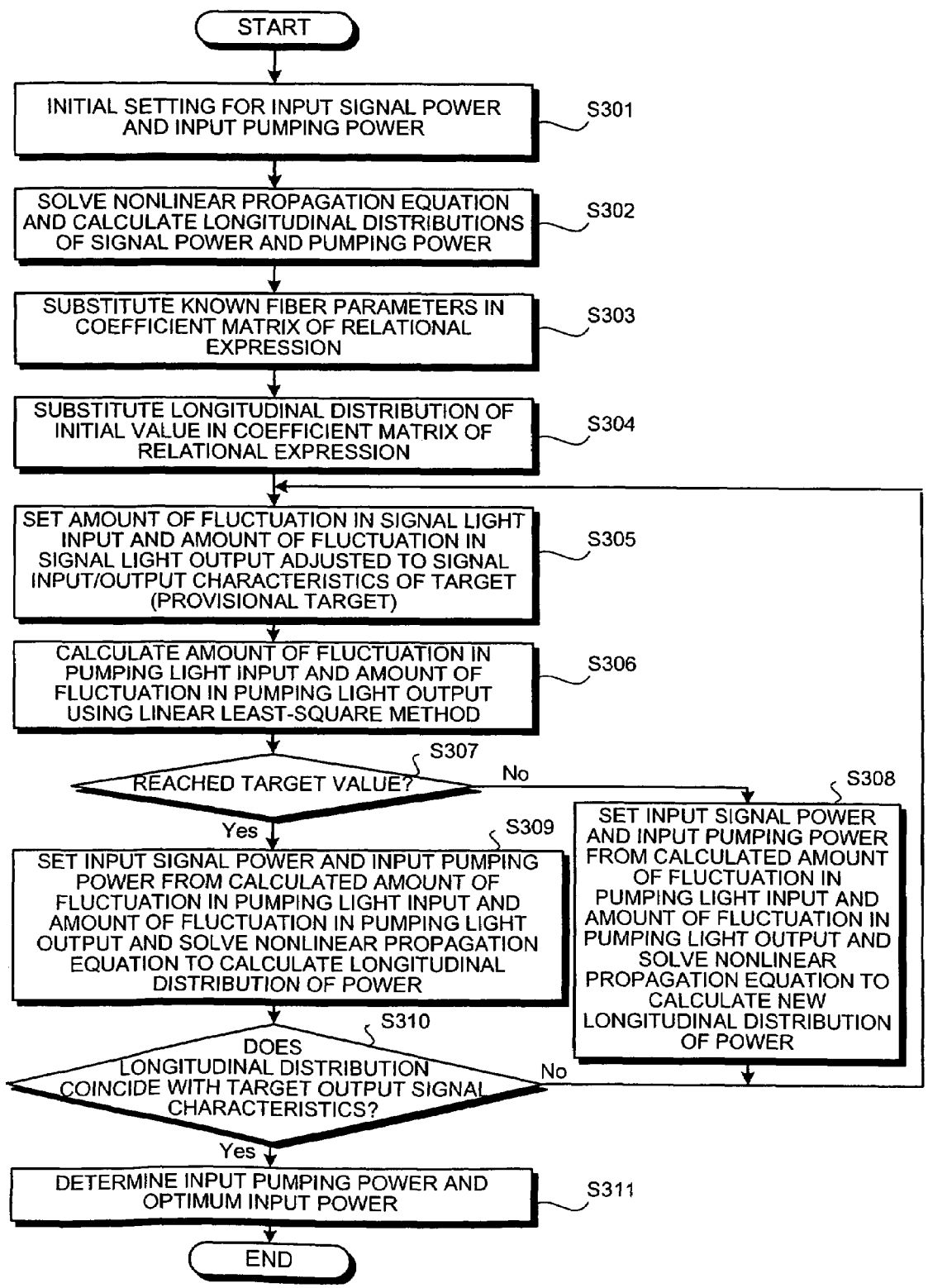
FIG. 8 is a flowchart of still another processing procedure for determining the optimum input power at the time of designing.
Figure 9:
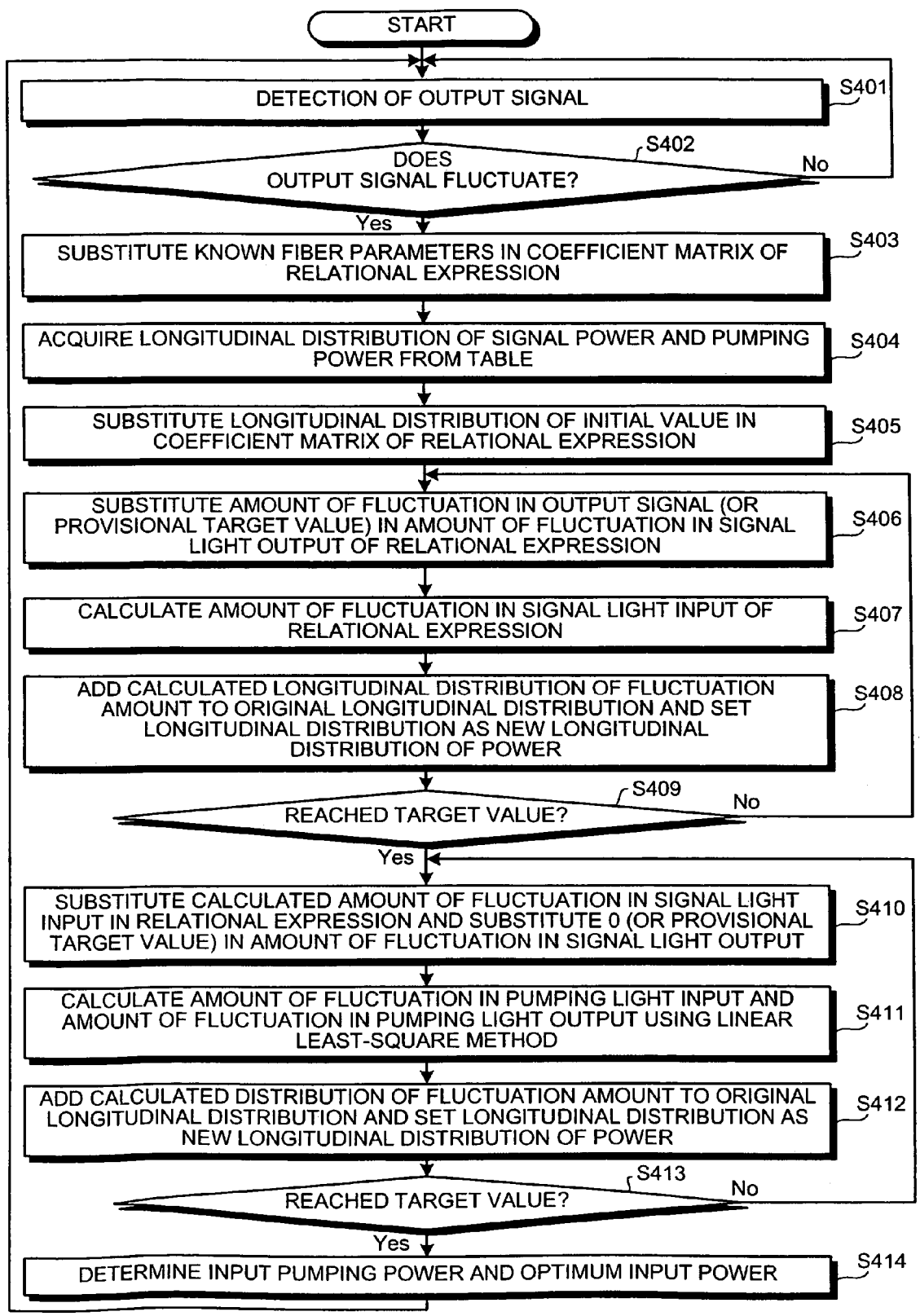
FIG. 9 is a flowchart of a processing procedure for controlling fluctuation in an output signal.

FIGS. 6 to 8 are flowcharts for determining optimum input power in designing. In FIG. 6, a nonlinear propagation equation is solved to obtain longitudinal distributions of signal power and pumping power. On the other hand, in FIG. 7, longitudinal distributions of signal power and pumping power are obtained from a table. In FIGS. 6 and 7, when input power does not reach a provisional target value, obtained longitudinal distribution of amounts of fluctuation are added to the original longitudinal distributions and set as new longitudinal distribution of power. On the other hand, In FIG. 8, when input power does not reach a provisional target value, input signal power and input pumping power are set from an obtained amount of fluctuation in pumping light input and an obtained amount of fluctuation in pumping light output and a nonlinear propagation equation is solved every time to obtain new longitudinal distributions of power. FIG. 9 is a flowchart of a control procedure for controlling output signal fluctuation.

Figure 10:
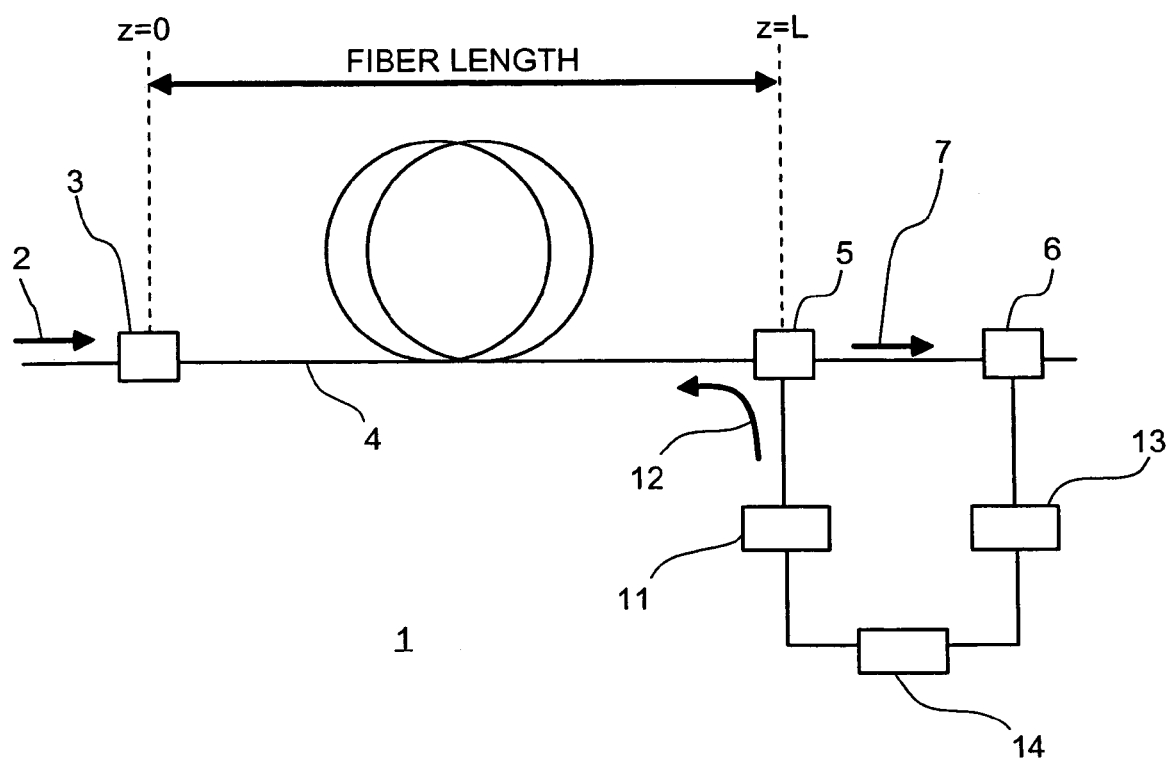
FIG. 10 is a schematic of a backward-pumped Raman amplifier including a control apparatus.

A constitution of a Raman amplifier 1 is shown in FIG. 10. Signal light 2 is made incident on the Raman amplifier 1 from an incidence end 3 (z=0) of the Raman amplifier 1 on a left part in the figure. On the other hand, pumping light 12 is outputted from a pumping light source 11 and, then, inputted to the Raman amplifier 1 from the back of an optical transmission fiber 4 through an optical multiplexer 5. The signal light 2 is subjected to optical amplification by stimulated Raman scattering caused by the pumping light 12 in the optical transmission fiber 4 acting as an amplification medium and, then, outputted from an exit end (z=L). In the constitution of the Raman amplifier shown in FIG. 1, the exit end is identical with the optical multiplexer 5. The amplification medium is the optical transmission line itself in the distributed Raman amplifier as According to the present embodiment. In the centralized Raman amplifier, an amplification medium with high nonlinearity such as a dispersion compensating fiber (DCF) is used.

Figure 11:
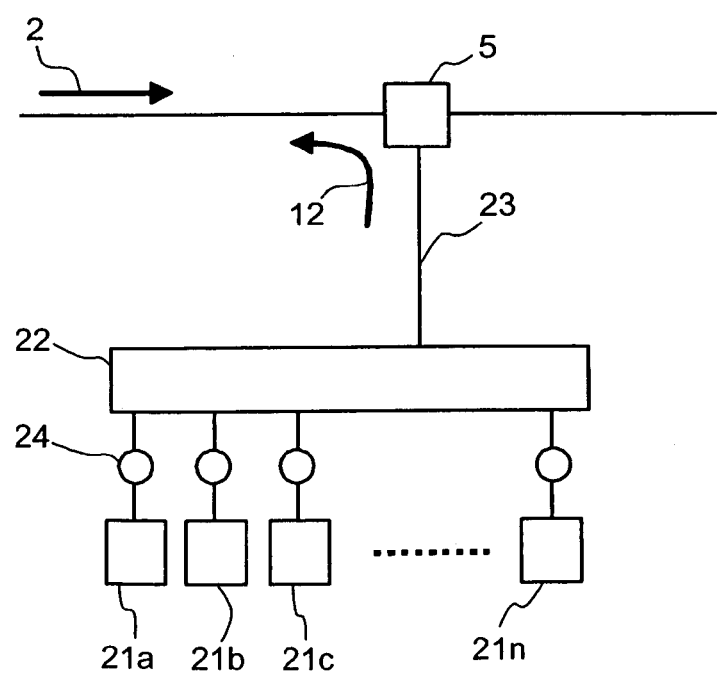
FIG. 11 is a schematic for illustrating an example of a pumping light source.
Figure 12:
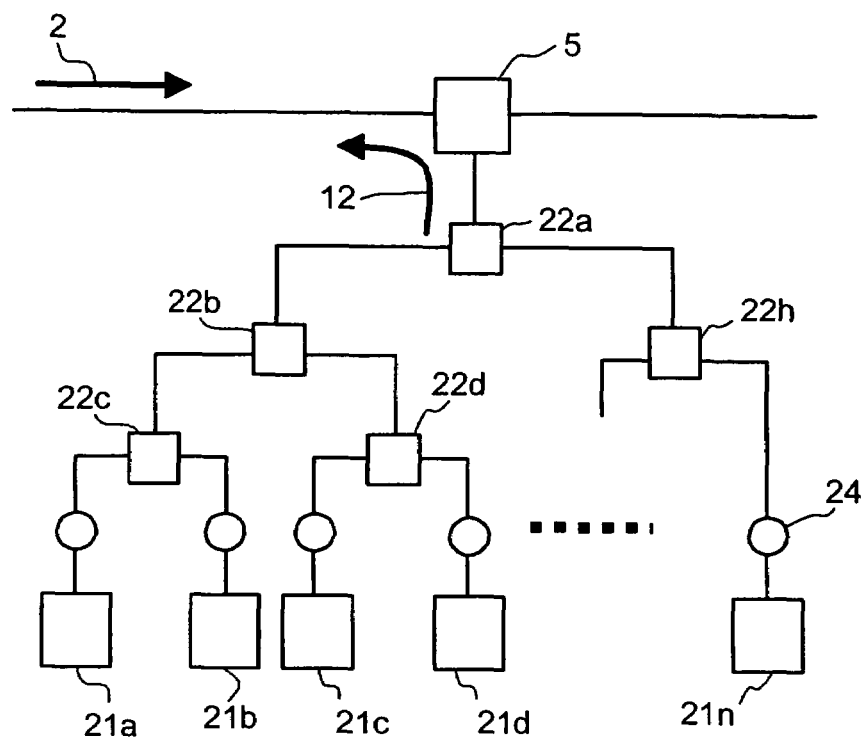
FIG. 12 is a schematic of a pumping light source using a wavelength multiplexer.
Figure 13:
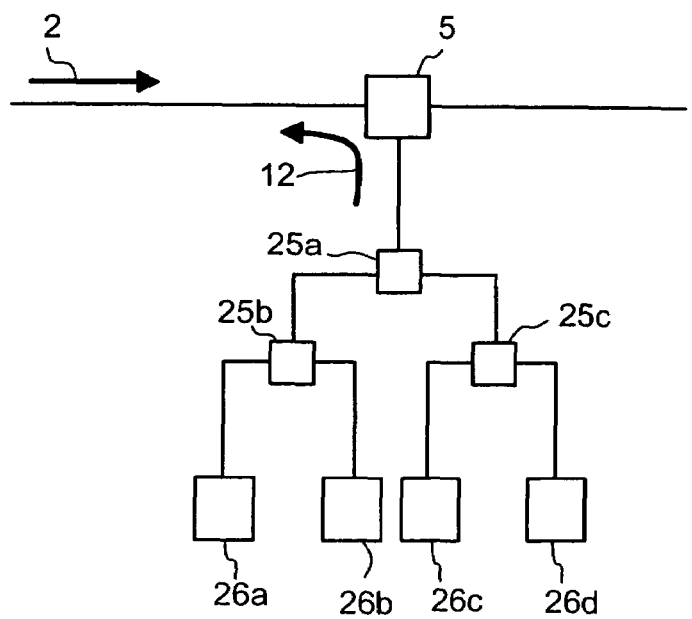
FIG. 13 is a schematic of a pumping light source using a polarization beam combiner and a wavelength combiner.

As shown in FIG. 11, the pumping light source 11 is constituted such that pumping lights emitted from a plurality of laser elements 21a to 21n are multiplexed by a multiplexer 22 and exit from an output fiber 23. As the multiplexer 22, a single or a plurality of wavelength multiplexers, polarization multiplexers, and the like are combined according to a type of a fiber that determines a wavelength of a laser element and a polarization state of output light. Pumping lights having different wavelengths and polarization states are multiplexed. Note that output lights of the laser elements may be depolarized by depolarizers 24 set at output ends of the respective laser elements or output ends of the multiplexers and, then, inputted to the optical transmission fiber through the optical multiplexer. For example, in the case of the pumping light source 11 shown in FIG. 11, output fibers of the laser elements 21a to 21n are polarization-preserving fibers, which are connected to the multiplexer 22 through the depolarizers 24, respectively. In this case, a wavelength multiplexer (a WDM coupler) is used as the multiplexer 22. As the wavelength multiplexer, for example, there are a Mach-Zender wavelength multiplexer, which is capable of multiplexing three or more waves with a single multiplexer, and a wavelength multiplexer obtained by combining a plurality of WDM couplers 22a to 22h constituted to multiplex lights of two wavelengths with a dielectric multilayer film as shown in FIG. 12. As other forms of the pumping light source 11, there is a pumping light source shown in FIG. 13. First, pumping light sources 26a and 26b having polarization states orthogonal to each other are multiplexed by a polarization multiplexer 25b. Similarly, pumping light sources 26c and 26d are multiplexed by a polarization multiplexer 25c. Output fibers of both the polarization multiplexer 25b and the polarization multiplexer 25c are subjected to wavelength multiplexing by a wavelength multiplexer 25a and outputted. The constitution described above is provided for the purpose of eliminating polarization dependency of optical amplification inherent in the Raman amplifier and covering a desired gain wavelength band. Therefore, a constitution of the Raman amplifier is not limited to the one illustrated According to the present embodiment as long as the constitution conforms to this purpose. Note that the laser elements constituting the pumping light source 11 may be laser elements obtained by modularizing semiconductor laser chips having a Fabry-Perot resonator structure to obtain a fiber output or may be laser elements using an external resonator such as Fiber Bragg Grating (FBG) to stabilize a wavelength. Instead of the FBG, a resonator structure with a purpose of stabilization of a wavelength may be formed in a semiconductor laser chip itself. By using these wavelength stabilizing means, a wavelength is stabilized even if output pumping light powers from the respective laser elements are adjusted. Thus, there is an advantage that accuracy of gain adjustment according to the present invention is further improved.

When the laser elements constituting the pumping light source 11 include a plurality of wavelengths, it is possible to obtain an arbitrary gain wavelength profile by adjusting intensities of respective pumping lights. A control apparatus 14 performs pumping light control for the respective wavelengths as described below. Control means changing, when an output signal changes because of a change in an input signal or a change in a line state, pumping light power to keep the output in a range required by specifications or return the output to the range.

Figure 14:
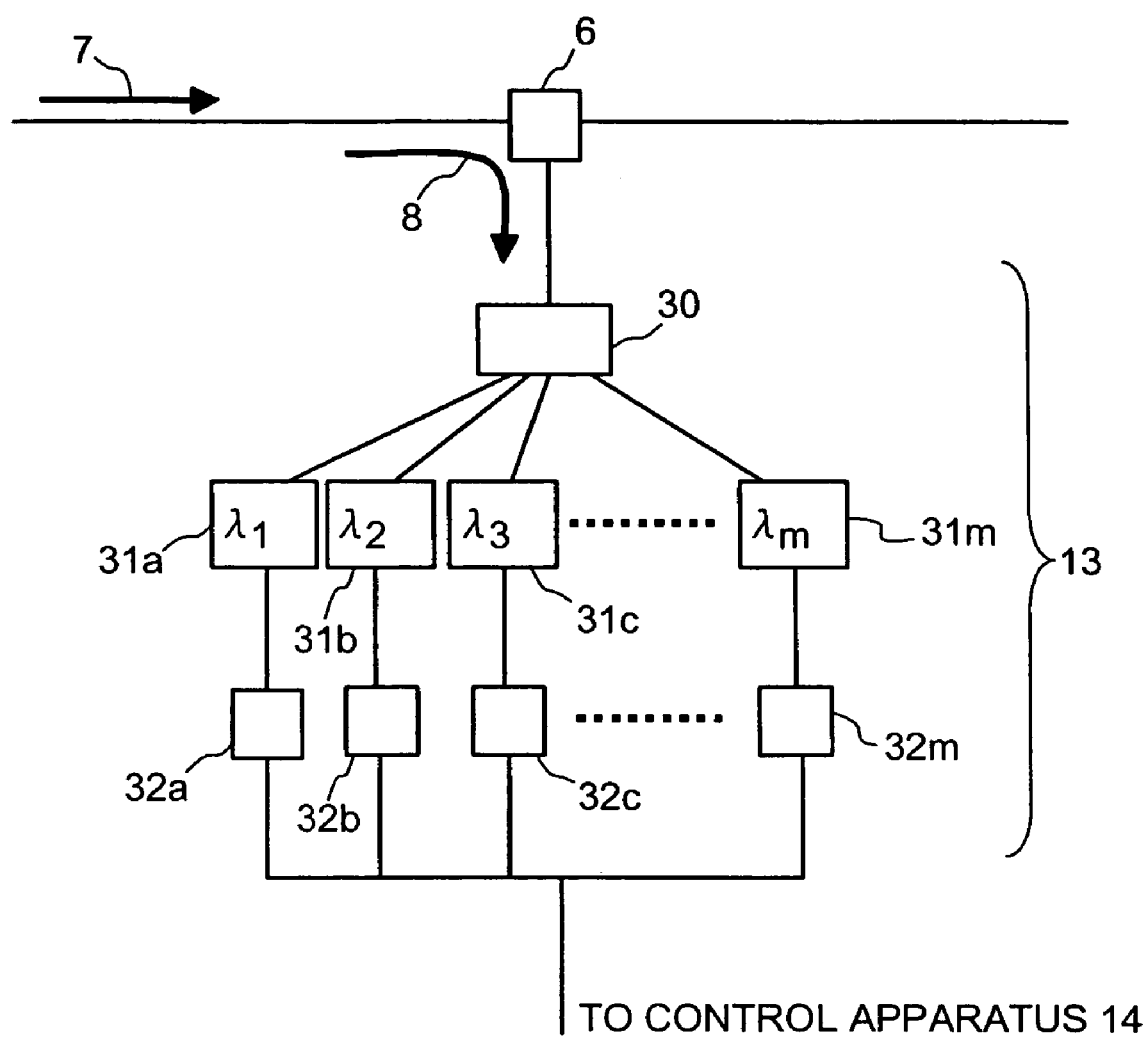
FIG. 14 is a schematic of a photo-detecting unit including an optical coupler, a band-pass filter, and a photodetector.

First, as shown in FIG. 14, a part of signal light 7 optically amplified and outputted is branched by an optical coupler 6 and, then, lead into a photo-detecting unit 13. The part of the signal light 7 lead into the photo-detecting unit 13 is further branched to a plurality of ports by an optical coupler 30 as monitor light 8 to have substantially equal powers. The number of branches is determined by the number required by the control apparatus 14 for control of a Raman gain. Since the branched signal light includes wavelengths of all signal channels, wavelength components other than those required for a monitor are cut by Band Pass Filters (BPFs) 31a to 31m or the like to extract only wavelength regions different for each branch. Then, the signal light is inputted to a plurality of photodetectors 32a to 32m. As a photodetector, a photo-diode (PD) is often used. The control apparatus 14 sets intensity information for each signal light wavelength obtained from the photodetectors 32a to 32m as a gain wavelength characteristic of the Raman amplifier. The control apparatus 14 controls pumping light intensities of the respective wavelengths such that the gain wavelength characteristic has a desired intensity distribution.

Figure 15:
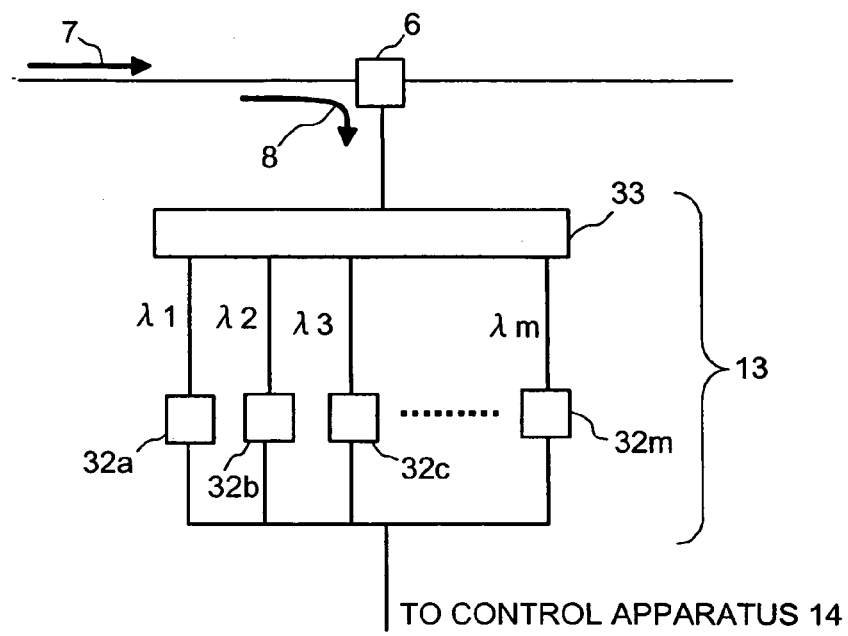
FIG. 15 is a schematic of a photo-detecting unit including an optical coupler and a photodetector.
Figure 16:
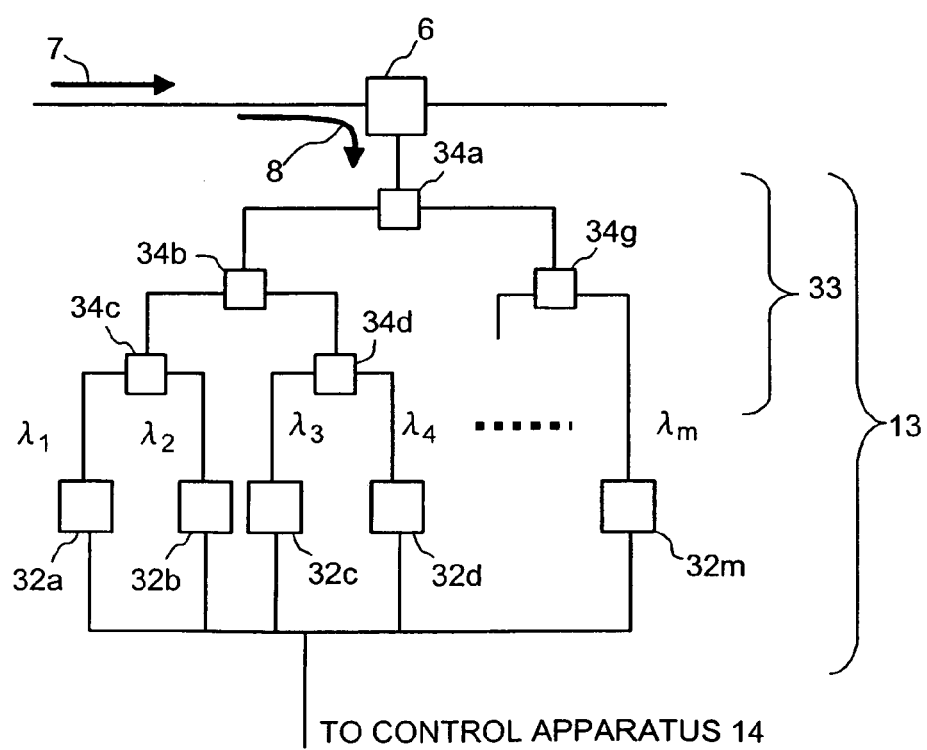
FIG. 16 is a schematic of another photo-detecting unit including an optical couple and a photodetector.

Note that, as shown in FIG. 15, the photo-detecting unit 13 may be obtained by combining a Mach-Zender wavelength demultiplexer 33 and photodetectors. With such a constitution, it is possible not only to further simplify a constitution but also to extract only necessary wavelength light at low loss and reflect the wavelength light on more accurate control. A plurality of wavelength multiplexer/demultiplexers 34a to 34m using a dielectric multilayer film filter may be combined as shown in FIG. 16 to replace the Mach-Zender wavelength demultiplexer 33 such that separate wavelengths of a signal light amplification band are inputted to the respective photodetectors.

The wavelength demultiplexer 33 may be constituted by an arrayed waveguide grating (AWG) or may be constituted by a fiber-type coupler.

Figure 17:
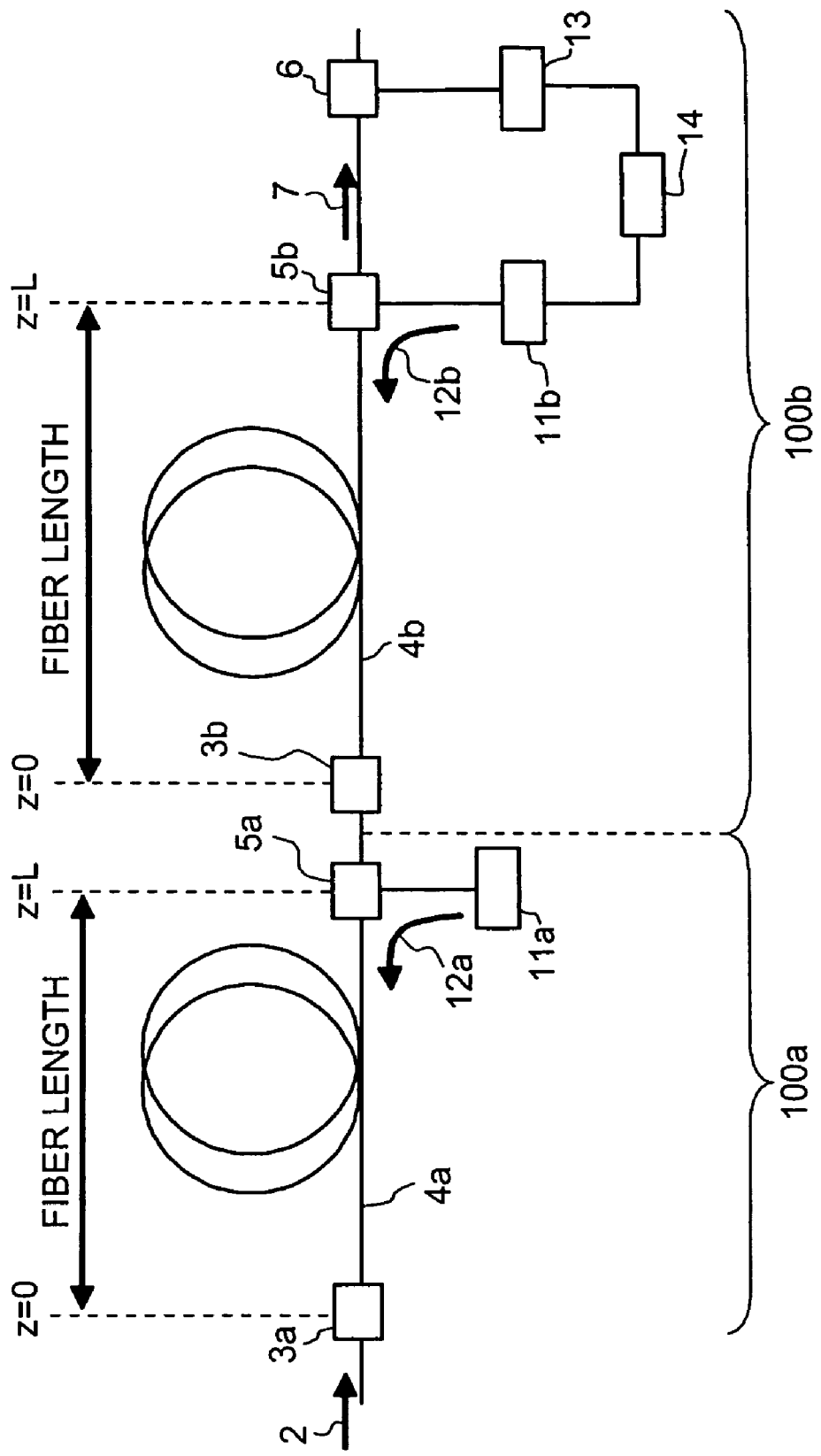
FIG. 17 is a schematic of two backward-pumped Raman amplifiers connected in tandem.

According to the present embodiment, as shown in FIG. 17, when one of laser elements constituting a pumping light source 11a in a Raman amplifier 100a on a pre-stage side of a system, in which two backward-pumped Raman amplifiers shown in FIG. 10 are connected in tandem, the following control is performed. It is assumed that the broken-down laser element is a fifth one (1451 nm) from a short wavelength side. Note that it is assumed that, as monitoring and control for a signal light output, the signal light output is monitored on an output-side of a Raman amplifier 100b on a post-stage side to control a pumping light source 11b of the Raman amplifier 100b on the post-stage side. Since monitoring and control on the pre-stage side are not performed, the monitoring and the control are not shown in the figure. Conditions of signal light, pre-stage and post-stage fibers 4a and 4b, pumping light, Net Gain, and the like are as described below.

Signal light: 1530 to 1604 nm, 100 gigahertz interval, 90 channels, input signal light power=0 dBm/ch Fibers (both pre-stage and post-stage): Dispersion Shifted Fiber (DSF), 100 kilometers Pumping light (both pre-stage and post-stage): backward ten waves Net Gain: 0 dB Pumping light wavelengths satisfying these conditions and power necessary for the respective pumping light wavelengths are as shown in Table 1 below.

TABLE 1

| Pumping light wavelengths and power | | | | | | | | | | |
|---|---|---|---|---|---|---|---|---|---|---|
| Wavlength [nm] | 1422 | 1430 | 1437 | 1445 | 1451 | 1459 | 1466 | 1473 | 1480 | 1501 |
| Power [mW] | 500 | 275 | 229 | 96 | 96 | 47 | 53 | 24 | 20 | 30 |

According to the present embodiment, the number of monitors of the photo-detecting unit 13 is set identical with the number of pumping light wavelengths. A reason for this is described later. Gain wavelength bands generated by pumping lights 12a and 12b outputted from the pumping light sources 11a and 11b are divided such that the number of the gain wavelength bands is the same as the number of the photodetectors 32a to 32m. Only a specific selected number of signal light wavelengths are inputted to the respective photodetectors. Specific numerical values are as shown in Table 2 below.

More specifically, the gain wavelength bands generated by the pumping lights 12a and 12b are equally divided on a frequency axis to monitor a gain wavelength characteristic with the photodetectors 32a to 32m. In this case, wavelength selection for signal lights inputted to the photodetectors 32a to 32m is performed by two methods.

TABLE 2

| | Monitor wavelengths [nm] of photodetectors | | | | | | | | | |
|---|---|---|---|---|---|---|---|---|---|---|
| | Photo-detector | | | | | | | | | |
| | 32a | 32b | 32c | 32d | 32e | 32f | 32g | 32h | 32i | 32j |
| Minimum monitor wavelength | 1530.3 | 1537.4 | 1544.5 | 1551.7 | 1559.0 | 1566.3 | 1573.7 | 1581.2 | 1588.7 | 1596.3 |
| Maximum monitor wavelength | 1536.6 | 1543.7 | 1550.9 | 1558.2 | 1565.5 | 1572.9 | 1580.4 | 1587.9 | 1595.5 | 1603.2 |
| Representative wavelength | 1533.5 | 1540.6 | 1547.7 | 1554.9 | 1562.2 | 1569.6 | 1577.0 | 1584.5 | 1592.1 | 1599.7 |

Figure 18:
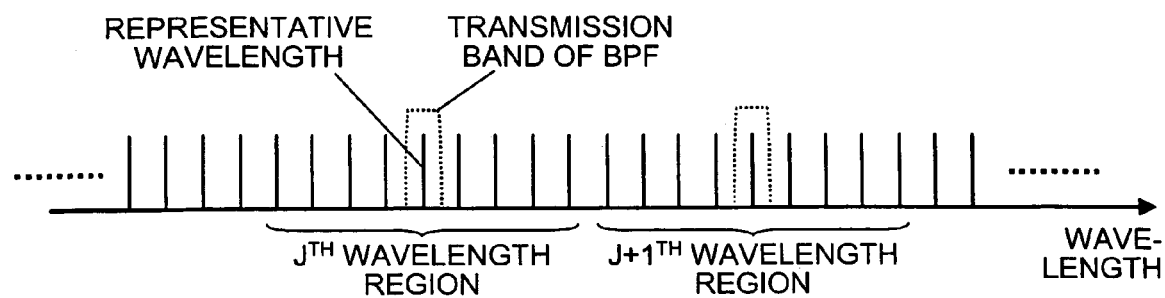
FIG. 18 is a schematic for explaining a band-pass filter that can select a signal light of a specific representative wavelength in an equally-divided wavelength region.

A first method is a method of, as shown in FIG. 18, selecting only signal light of a specific representative wavelength of the equally-divided wavelength region and inputting the signal light to the respective photodetectors. The photo-detecting unit 13 has, for example, a constitution shown in FIG. 14. In the photodetectors 32a to 32m, transmission bands of the BPFs 31a to 31m are narrowed to set only one channel of a signal as an object of monitoring ultimately. According to the present embodiment, a wavelength near the center of each wavelength region is set as the object. Since a relation between a signal light output and a wavelength is made clear in this method, there is an advantage that measurement accuracy is improved.

Figure 19:
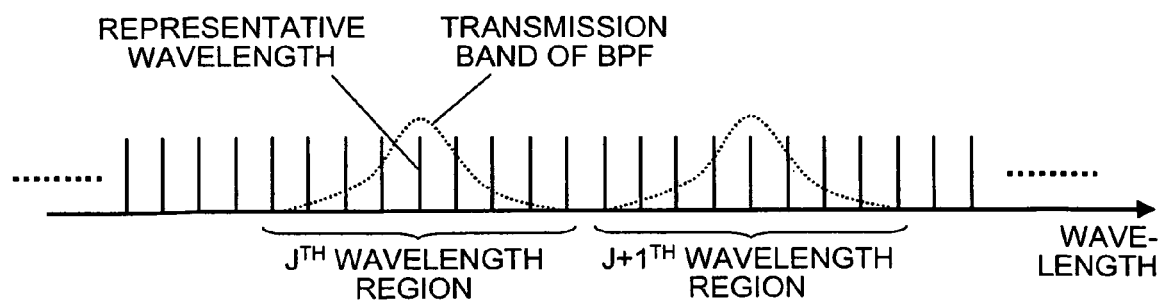
FIG. 19 is a schematic for explaining a band-pass filter that can select a signal light of a plurality of wavelengths in an equally-divided wavelength region.
Figure 20:
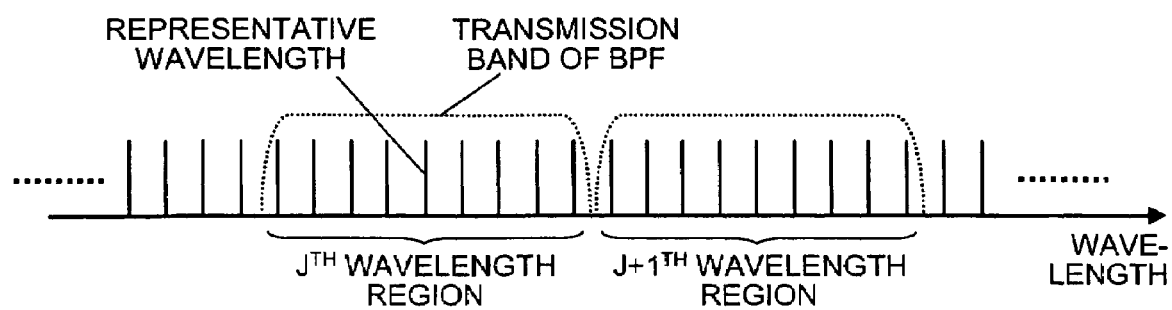
FIG. 20 is a schematic for explaining a band-pass filter that can select a signal light of all wavelengths in an equally-divided wavelength region.

On the other hand, in the first method, since the power is small, it is difficult to acquire sensitivity. In addition, requirement for transmission wavelength accuracy of the BPFs is higher. Thus, it may be difficult to realize the first method. In such a case, the second method is effective. A second method is a method of, as shown in FIG. 19, monitoring a plurality of powers of signal channels included in equally-divided wavelength regions with photodetectors. For example, In the respective photodetectors of the photo-detecting unit 13 having the constitution shown in FIG. 14, transmission bands of the BPFs 31a to 31m are set rather wide. In the first and the second methods, the photo-detecting unit 13 may be constituted as shown in FIG. 15 or may be constituted as shown in FIG. 16. In this case, the same effect as the first method is realized by adjusting transmission bands to respective ports of the wavelength demultiplexer 33. Consequently, there are advantages that the wavelength bands include a plurality of signal channels, rather high photo-detection sensitivity can be acquired, and the requirement or the like for wavelength accuracy of the BPFs 31a to 31m, the wavelength demultiplexer 33, and the like is eased. However, a relation between information on monitored powers and actual powers in the respective signal light wavelengths is made slightly unclear, it is necessary to find an optimum value according to necessary accuracy with a repetition method described later. It goes without saying that, when a band is actually designated, conditions for realizing both sensitivity and measurement accuracy should be selected. According to the present embodiment, as the method of monitoring a plurality of powers, dielectric multilayer film filters having substantially the same degree of transmittances are used for all signal channels included in equally-divided wavelength regions as shown in FIG. 20.

As the selection of transmission wavelength bands of the BPFs 31a to 31m and the wavelength demultiplexer 33, gain wavelength bands of signal light may be divided equally on a frequency as According to the present embodiment. Alternatively, the selection may be performed in the same manner on a wavelength. The transmission wavelength bands may be set to include a long wavelength side of about 100 nm from peak wavelengths or Root Mean. Square (RMS) wavelengths of the respective laser elements forming the pumping light 11, for example, the laser elements 21a to 21n in FIG. 11. Alternatively, this wavelength may be set to substantially coincide with a wavelength at which sensitivity of the respective photodetectors is optimized. This is because a peak of a Raman gain is on a long wavelength side about 100 nm (about 13 terahertz as a frequency) from a pumping light wavelength. It is possible to obtain sensitivity of the photodetectors 32a to 32m satisfactorily by adjusting the transmission wavelength bands of the BPFs 31a to 31m to a wavelength near this peak.

However, actually, since the number of signal channels is 90 channels, monitoring only in ten positions According to the present embodiment is insufficient for measuring an overall gain wavelength characteristic. Therefore, it is necessary to interpolate signal light output distribution of the respective channels accurately. The present invention provides a method for the interpolation. According to the present invention, a principle of superposition of Spectral Raman-gain efficiency of respective pumping lights is used. Thus, even when signal light monitoring is not applied to all signal light wavelengths, it is possible to learn outputs of all the signal light wavelengths from information on a part of the signal light wavelengths. A specific method is explained below.

In the system in which the two Raman amplifiers 100$a$ and 100$b$ are connected as shown in FIG. 17, pumping wavelengths of n waves are subjected to wavelength division multiplexing (WDM) in pumping light (power $P_{f,j}$; j=1 to n at the pre-stage (subscript f) and pumping wavelengths of n waves are also subjected to WDM in pumping light (power $P_{b,j}$; j=1 to n) at the post-stage (subscript b). Signal light of m waves (channels) is subjected to WDM in signal light (pre-stage power $S_{f,i}$; i=1 to m, post-stage power $S_{b,i}$).

First, a propagation equation of $i^{th}$ signal light for the pre-stage is represented as follows when a Rayleigh scattering term, an SSE term, and an inter-signal Raman term are neglected $$\frac{dS_{f,i}(z)}{dz} = -\alpha_i S_{f,i}(z) + \sum_{j=1}^{n} g_{ji} S_{f,i}(z) P_{f,j}(z) \quad (31)$$

where, $\alpha i$ represents an absorption coefficient of the ith signal light, $g_{ji}$ represents Raman-gain efficiency between jth pumping light and the ith signal light, and z represents a position in a longitudinal direction. In FIG. 17, z=0 indicates an input end 3$a$ of the Raman amplifier and z=L indicates an output end of the Raman amplifier. In the case of the Raman amplifier, it is difficult to define an input end in a distributed amplifier using an optical transmission line as an amplification medium. In general, a position around an output end of an optical amplifier connected to a stage immediately before the Raman amplifier or a position where a Raman gain or pumping light power is generally 0 is selected as the input end. In addition, as the output end, in FIG. 17, an optical multiplexer 5$a$ is in a position of z=L. When a fiber length per one stage of an amplification fiber is L, a ratio of signal light powers at the output end and the input end is represented as $$\frac{S_{f,i}(L)}{S_{f,i}(0)} = \exp(-\alpha_i \cdot L) \cdot \exp\left\{\sum_{j=1}^{n} \left(g_{ji} \int_0^L P_{f,j} dz\right)\right\} \quad (32)$$

The equation represents the ratio at normal time. At failure time, when the signal light power and the pumping light power are set as Sf,i'(z) and Pf,j'(z), respectively, the ratio is represented as $$\frac{S'_{f,i}(L)}{S'_{f,i}(0)} = \exp(-\alpha_i \cdot L) \cdot \exp\left\{\sum_{j=1}^{n} \left(g_{ji} \int_0^L P'_{f,j} dz\right)\right\} \quad (33)$$

When Eq. (32) is divided by Eq. (33), the following equation is obtained $$\frac{S_{f,i}(L)}{S'_{f,i}(L)} = \exp\left[\sum_{j=1}^{n}\left\{g_{ji}\int_0^L (P_{f,j}-P'_{f,j})dz\right\}\right] = \exp\left(\sum_{j=1}^{n} g_{ji} A_j\right) \quad (34)$$

where, $$A_j = \int_0^L (P_{f,j} - P'_{f,j}) dz.$$

A process same as the process for deriving Eq. (34) is applied to the post-stage. Since the fiber length depending on an input end 3$b$ and an output end 5$b$ is L, when signal light powers at normal time and failure time are set as $S_{b,i}(z)$ and $S_{b,i}'(z)$ and pumping light powers at normal time and failure time are set as $P_{b,j}(z)$ and $P_{b,j}'(z)$, the following equation is obtained $$\frac{S_{b,i}(L)}{S'_{b,i}(L)} = \frac{S_{f,i}(L)}{S'_{f,i}(L)} \cdot \exp\left[\sum_{j=1}^{n}\left\{g_{ji}\int_0^L (P_{b,j}-P'_{b,j})dz\right\}\right] \quad (35)$$

$$= \exp\left(\sum_{j=1}^{n} g_{ji} A_j\right) \cdot \exp\left(\sum_{j=1}^{n} g_{ji} B_j\right)$$

$$= \exp\left(\sum_{j=1}^{n} g_{ji} C_j\right)$$

where, $$B_j = \int_0^L (P_{b,j} - P'_{b,j}) dz, \ C_j = A_j + B_j.$$

Therefore, it is possible to represent a ratio of output signal light powers at normal time and failure time, that is, a ratio of signal light powers in a monitoring position with Eq. (35). When Eq. (35) is converted from a linear scale into a log scale, the following equation is obtained $$10 \cdot \log_{10}\left(\frac{S_{b,i}(L)}{S'_{b,i}(L)}\right) = 10 \cdot \log_{10} e \cdot \sum_{j=1}^{n} g_{ji} C_j.$$

When the left part is substituted by Gi and $D_j=10 \cdot \log_{10} e \cdot C_j$, the equation is changed as $$G_i = \sum_{j=1}^{n} g_{ji} D_j \quad (36)$$

In the above description, an effect of the inter-signal Raman is neglected. When power is propagated from a signal channel on a short wavelength side to a signal channel on a long wavelength side by the inter-signal Raman, a gain on the short wavelength side decreases and a gain on the long wavelength side increases. Consequently, gradient occurs in wavelength dependency of a gain. This is called Raman tilt. The Raman tile is a phenomenon in which gradient occurs over signal bands broadly. Thus, signal light power can be represented sufficiently by superposition of a Spectral Raman-gain efficiency from the respective pumping lights. Therefore, in the following description, it is assumed that an approximate term for compensating for the effect of the inter-signal Raman is included in $D_j$.

Figure 21:
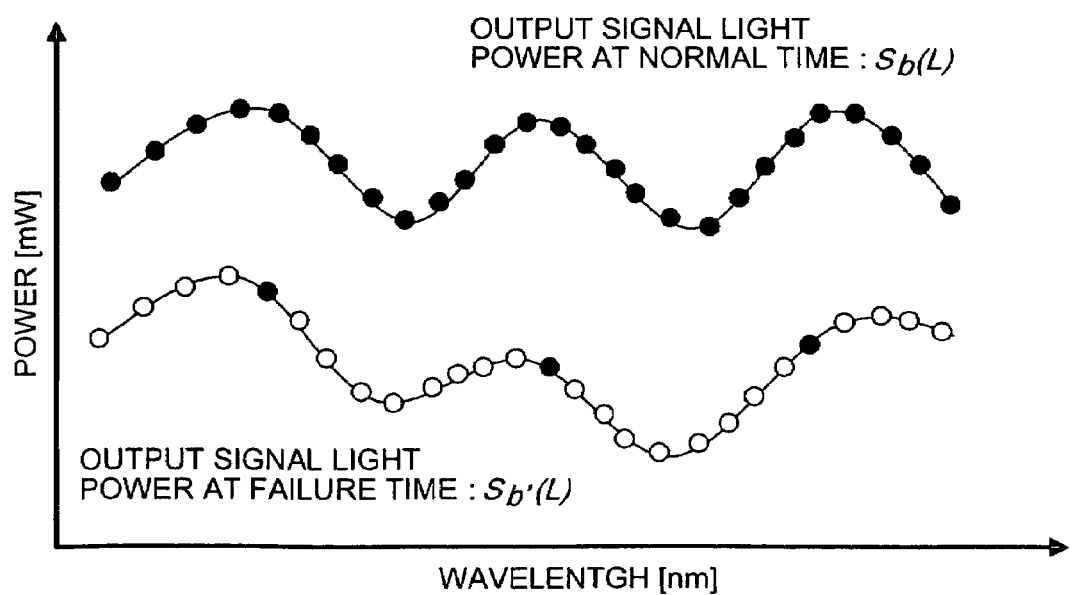
FIG. 21 is a graph of output signal light powers at normal time and failure time.

When it is assumed that output signal light power of one channel can be monitored by one photodetector, a concept of output signal light powers at normal time and failure time is as shown in FIG. 21. In the figure, powers of channels indicated by black circles are known. At normal time, since powers of all channels are calculated at the time of designing respective pumping light outputs, all the powers are known. Designing means determining optimum pumping light power to satisfy target specifications (output signal light power, a Raman gain, a net gain, etc.). However, since it is not known which pumping light fails at failure time, only powers of monitored channels are known and powers of the other channels are unknown. The unknown powers are indicated by white circles. When monitored channels are I=1, 2, . . . , n, Eq. (36) can be represented as $$G_I = \sum_{j=1}^{n} g_{jI} D_j \qquad (37)$$

Thus, when the equation is written with respect to I=1, 2, . . . , n, the following equation is obtained $$\begin{pmatrix} G_1 \\ G_2 \\ \vdots \\ G_n \end{pmatrix} = \begin{pmatrix} g_{11} & g_{21} & \cdots & g_{n1} \\ g_{12} & g_{22} & \cdots & g_{n2} \\ \vdots & \vdots & \ddots & \vdots \\ g_{1n} & g_{2n} & \cdots & g_{nn} \end{pmatrix} \begin{pmatrix} D_1 \\ D_2 \\ \vdots \\ D_n \end{pmatrix} = g \begin{pmatrix} D_1 \\ D_2 \\ \vdots \\ D_n \end{pmatrix} \qquad (38)$$

Since GI and a matrix g are known, when $$\begin{pmatrix} D_1 \\ D_2 \\ \vdots \\ D_n \end{pmatrix} = g^{-1} \begin{pmatrix} G_1 \\ G_2 \\ \vdots \\ G_n \end{pmatrix} \qquad (39)$$

all n pieces of Dj are calculated. From Eq. (39), it is seen that, if the number of monitors in the photo-detecting unit is equal to or larger than the number of pumping light wavelengths, necessary sufficient conditions for deriving signal light powers of all the channels are satisfied and it is possible to predict signal light powers of all the channels accurately. Therefore, in this case, Gi is calculated with respect to all the signal channels (i=1 to m) from Eq. (36) as represented by $$\begin{pmatrix} G_1 \\ G_2 \\ \vdots \\ G_m \end{pmatrix} = \begin{pmatrix} g_{11} & g_{21} & \cdots & g_{n1} \\ g_{12} & g_{22} & \cdots & g_{n2} \\ \vdots & \vdots & \ddots & \vdots \\ g_{1m} & g_{2m} & \cdots & g_{nm} \end{pmatrix} \begin{pmatrix} D_1 \\ D_2 \\ \vdots \\ D_n \end{pmatrix} \qquad (40)$$

As a result, it is possible to calculate output signal light powers of all the channels at failure time from the definition of $G_i$.

According to the present embodiment, the system in which the two stages of Raman amplifiers are connected is explained. The explanation is also applicable to a system in which three or more stages of Raman amplifiers are connected. For example, it is assumed that amplifiers with a fiber length L are connected in series at one stage from a Raman amplifier, input signal light power of which is known, to a Raman amplifier that monitors outputs. When a longitudinal distribution of pumping light power at kth stage ($1 \leq k \leq l$) changes from $P_{k,j}$ to $P'_{k,j}$ due to some factor and, as a result, output signal light power at first stage fluctuates from $S_{1,i}(L)$ to $S'_{1,i}(L)$, $D_j$ only has to be set as $$D_j = 10 \cdot \log_{10} e \cdot \sum_{k=1}^{l} \int_{(k-1)L}^{kL} (P_{k,j} - P'_{k,j}) dz.$$

However, when signal light power is actually predicted, as described above, it is assumed that a compensation term for the effect of the inter-signal Raman is included in $D_j$ of the above equation.

Control for the Raman amplifier is performed with a method described below using numerical values of the output signal light powers of all the channels derived in this way.

The nonlinear propagation equation concerning an amount of fluctuation in power can be approximated to a linear differential equation by neglecting a quadratic term of the amount of fluctuation. Since the equation is linear, a relational expression of an amount of fluctuation in input power and an amount of fluctuation in output power can be represented as $$\begin{pmatrix} \varepsilon_1(L) \\ \vdots \\ \varepsilon_m(L) \\ \eta_1(L) \\ \vdots \\ \eta_n(L) \end{pmatrix} = A \begin{pmatrix} \varepsilon_1(0) \\ \vdots \\ \varepsilon_m(0) \\ \eta_1(0) \\ \vdots \\ \eta_n(0) \end{pmatrix} \qquad (41)$$

where, amounts of fluctuation in power at the input end (z=0) of signal lights of m waves are set as $\varepsilon_1(0)$, $\varepsilon_2(0)$, . . . , $\varepsilon_m(0)$, amounts of fluctuation in power at the output end (z=L) of signal lights of m waves are set as $\varepsilon_1(L)$, $\varepsilon_2(L)$, . . . , $\varepsilon_m(L)$, amounts of fluctuation in power at the input end (z=0) of pumping lights of n waves are set as $\eta_1(0), \eta_2(0), \ldots, \eta_n(0)$, and amounts of fluctuation in power at the output end (z=L) of pumping lights of n waves are set as $\eta_1(L), \eta_2(L), \ldots, \eta_n(L)$. As indicated by expression (41), the amounts of fluctuation in power can be divided into the four groups. A is an (m+n)×(m+n) matrix, which is known because the matrix is determined only by signal light power, pumping light power, and fiber parameters that do not fluctuate. In the WDM transmission, in general, m is larger than n. If two of the four groups are determined, the remaining two groups are automatically determined using Eq. (31).

As a first stage of the control method, the numerical values of the respective signal light powers derived from Eq. (40) are used as monitoring results of the amounts of fluctuation in output signal light power $\varepsilon_1(L), \varepsilon_2(L), \ldots, \varepsilon_m(L)$. All the amounts of fluctuation in input pumping light power $\eta_1(L), \eta_2(L), \ldots, \eta_n(L)$ are 0. It is possible to estimate the amounts of fluctuation in input signal light power $\varepsilon_1(0), \varepsilon_2(0), \ldots, \varepsilon_m(0)$ by substituting these amounts in Eq. (41).

As a second stage, the estimated amounts of fluctuation in input signal light power $\epsilon_1(0)$, $\epsilon_2(0)$, ..., $\epsilon_m(0)$ and the amounts of fluctuation in output signal light power, all of which are 0, are substituted in Eq. (31). Then, the amounts of fluctuation in input pumping light power $\eta_1(L)$, $\eta_2(L)$, ..., $\eta_n(L)$ satisfying the amounts are automatically calculated.

An error due to the linear approximation occurs in pumping light power calculated in this way. To reduce such an error, at the first stage, input signal light power is estimated by repeatedly setting an intermediate provisional target value to bring the input signal light power close to the monitored signal light power. Similarly, at the second stage, input pumping light power is determined. A ratio of the provisional target value at this point and power before fluctuation is defined as a step width.

It is possible to cause the input pumping light power to converge on a desired signal light gain wavelength characteristic finally by repeating the steps in two stages a plurality of times.

Figure 22:
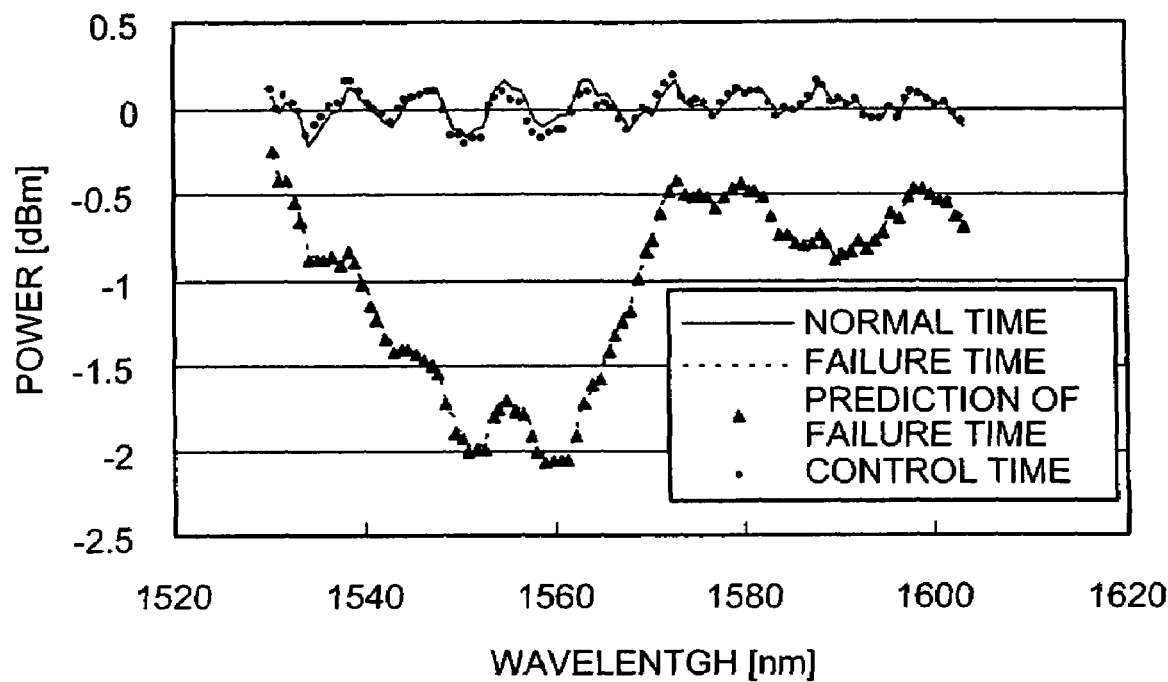
FIG. 22 is a graph of output signal light powers at normal time, failure time, and control time when signal light power of a representative wavelength in an equally-divided wavelength region is monitored and an interpolation method based on superposition of Spectral Raman-gain efficiency is used.

In FIG. 22, concerning post-stage output signal light power, a wavelength characteristic at normal time is indicated by a solid line, a wavelength characteristic at failure time is indicated by a dotted line, failure time predicted by using the interpolation method according to this embodiment is indicated by triangles, and control time of the power is indicated by black circles. For the control, a method of setting a provisional target value to bring the power close to a target value by 1 dB every time is used. In the figure, since the triangles are substantially placed on the dotted line, it is seen that output signal light power at failure time is interpolated accurately. Concerning the output signal light power at control time, since the black circles are substantially placed on the solid line, accurate control is performed.

Figure 23:
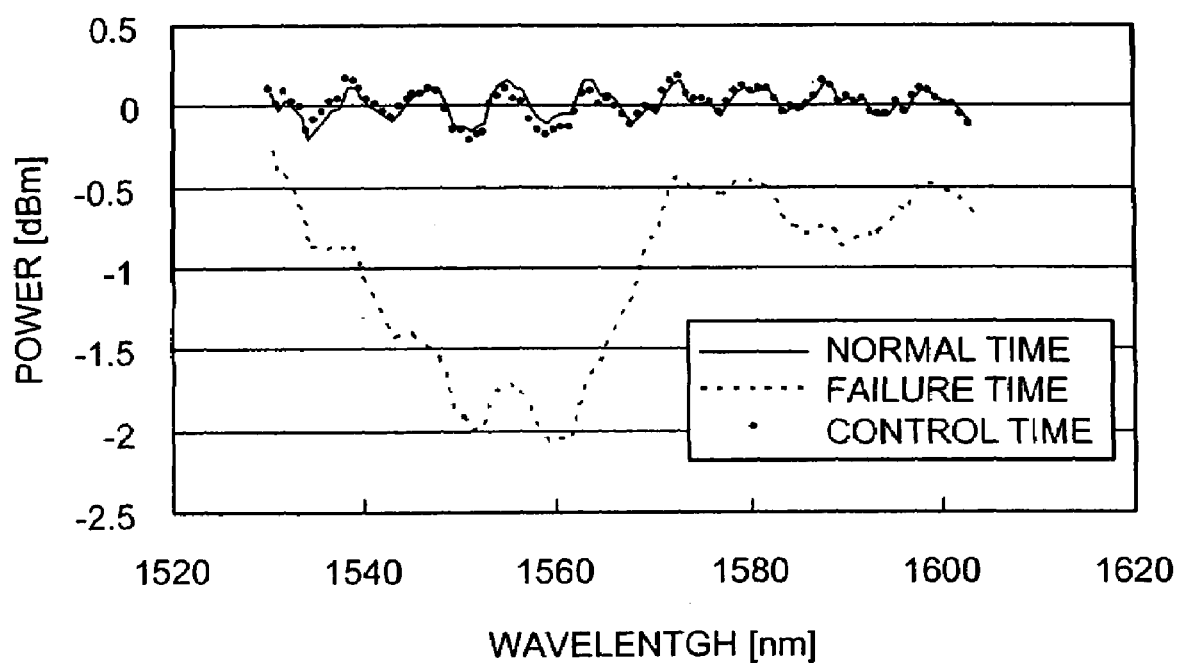
FIG. 23 is a graph of output signal light powers at normal time, failure time, and control time when all signal light powers are monitored.

A result of performing control by monitoring all ninety channels of signal lights and measuring wavelength characteristics of signal light outputs in that case is shown in FIG. 23. Specifically, photodetectors of the same number as the number of signal light channels, that is, ninety photodetectors are arranged at the post-stage output end to monitor output signal light power. In FIG. 23, wavelength characteristics of post-stage output signal light power are shown by indicating normal time, failure time, and control time with a solid line, a dotted line, black circles, respectively. For the control, a method of setting a provisional fluctuation amount to bring the power close to a target value by 1 dB every time. Note that it is also possible that an Optical Spectrum Analyzer (OSA) is used as a substitute for the ninety photodetectors and a method of actually monitoring wavelength characteristics of signal light outputs from the Raman amplifier is used.

In this case, a difference between a maximum value and a minimum value of the output signal light power (Max-Min) is 0.378 dB at normal time and 1.804 dB at failure time. At the control time, the Max-Min is 0.398 dB, which is very close to a value at normal time. In other words, outputs of all signal channels are measured accurately by arranging the photodetectors in the same number as the number of signal light channels. Thus, it is possible to perform highly accurate control.

As an evaluation parameter other than Max-Min, concerning all channels, a sum of squares of a difference [dB] between output signal light power [dBm] at control time and output signal light power [dBm] at normal time is divided by the number of all channels, and a square root of a quotient is calculated. This is defined as a "standard deviation at control time". A value of the standard deviation at control time is 0.0415. It is confirmed that, even if a part of pumping light waves of one Raman amplifier fails, the failure can be covered by control of the other Raman amplifier sufficiently.

At the control time according to this embodiment, Max-Min is 0.393 dB. This indicates that it is possible to perform control at the same accuracy as monitoring all ninety channels (at 0.398 dB). An extremely satisfactory result is obtained with the standard deviation at control time of 0.0415. When monitoring is performed by this first method, errors other than the error due to approximation assumed in Eq. (31) never occur. Thus, control at high accuracy is possible as indicated by the result described above.

On the other hand, in the first method, since power of monitoring light is small, it is difficult to acquire sensitivity. In addition, higher transmission wavelength accuracy of the BPFs is required. In such a case, it is possible to ease light-receiving sensitivity and wavelength accuracy by including a plurality of signal light channels in a monitor wavelength region. In particular, when the monitor wavelength region is secured most widely, it is possible to minimize an error with the second method to perform interpolation. Thus, this second method is explained below.

Figure 24:
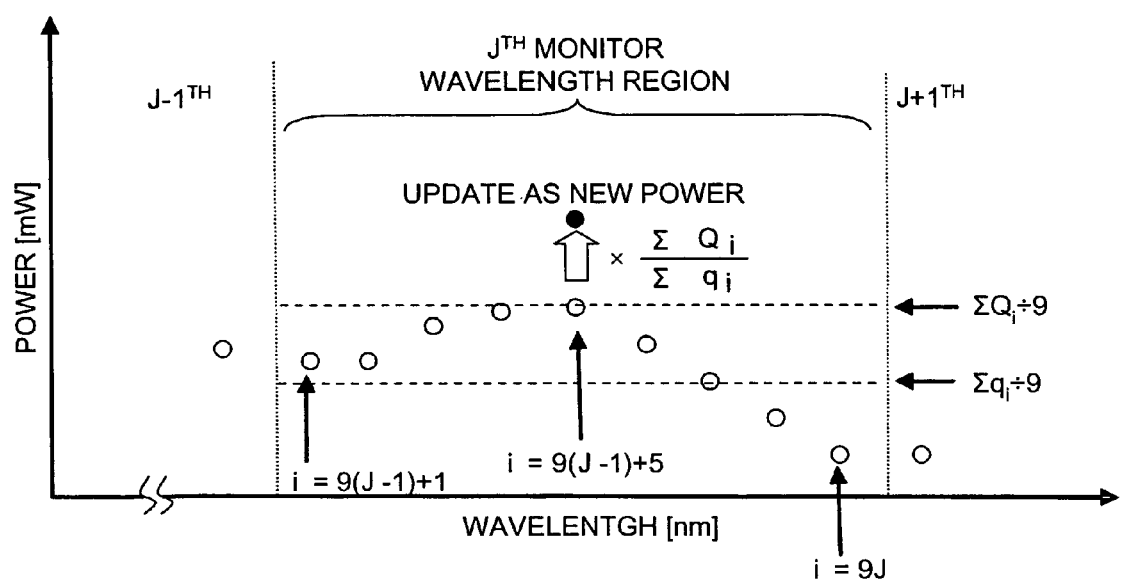
FIG. 24 is a graph for illustrating a method of performing an interpolation by minimizing an error when a wavelength to be monitored is not one signal light channel only.

A schematic for explaining this method is shown in FIG. 24. According to the present embodiment, since the number of pumping light wavelengths is n, the number of monitor wavelength regions is also n. The number of signal channels in the respective monitor wavelength regions is set to 1. In other words, According to the present embodiment, n=10 and l=0. To simplify signs, $P_i$ and $Q_i$ are represented as $$P_i = S_{b,i}(L),\ Q_i = S_{b,i}'(L).$$

In addition, assuming that power of one representative wavelength in the respective monitor wavelength regions (an unknown value: according to the present embodiment, a channel of a center wavelength of the respective monitor wavelength region) is equal to average power in the respective monitor wavelength regions (power converted from a monitor value taking into account sensitivity of a PD), output signal light power at failure time is calculated using the first method, that is, the interpolation according to superposition of Raman-gain efficiency spectrum from signal light of the representative wavelength. The output signal light power at failure time calculated (white circles in the figure) is set as $q_i$.

Since one photodetector monitors total power of one channel in a $j^{th}$ monitor wavelength region, $$\sum_{i=(J-1)l+1}^{Jl} (Q_i)$$

is known. Therefore, the representative channel power is updated to a new representative channel power (black circles in the figure) calculated by multiplying the representative channel power in the monitoring wavelength region obtained as qi by $$\frac{\sum_{i=(J-1)l+1}^{Jl} (Q_i)}{\sum_{i=(J-1)l+1}^{Jl} (q_i)} \quad (42)$$

and output power of all the signal channels at failure time is calculated again with the same method as the first method.

This trial is repeated and, concerning the number of times of the repetition, if Eq. (42) is within a certain range in all the J monitor wavelength regions, it is judged that the output power converges. According to the present embodiment, a range for judging convergence is set as 0.999 to 1.001 and the number of times of trial is three.

Figure 25:
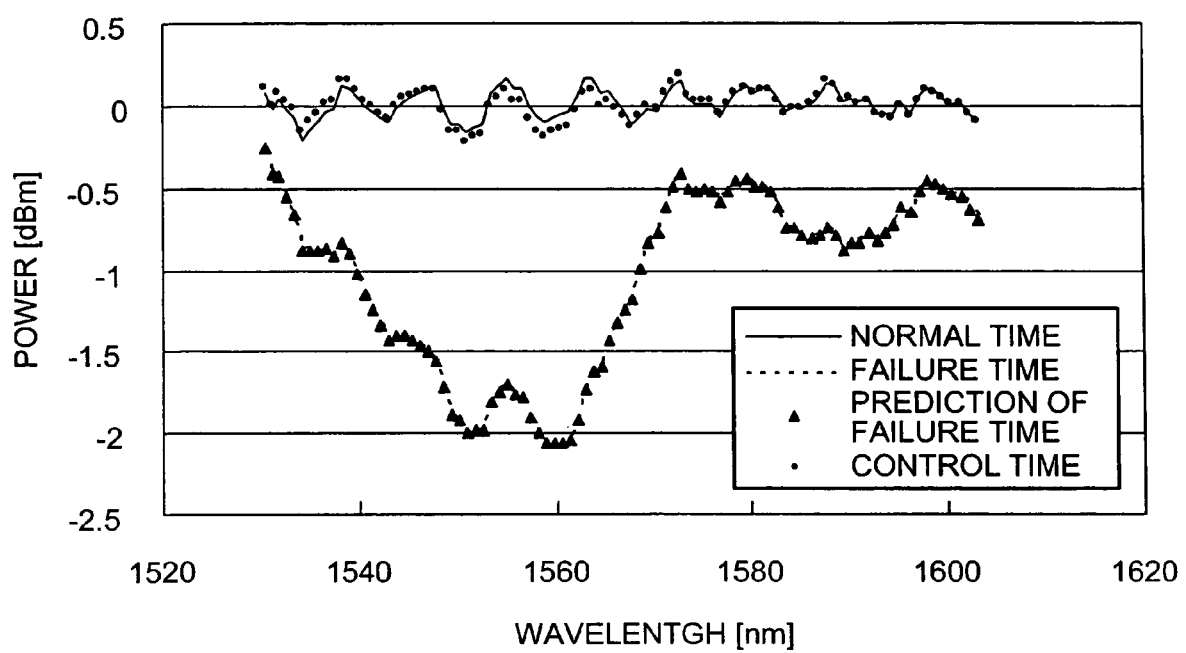
FIG. 25 is a graph of output signal light powers at normal time, failure time, and control time when a total of all signal light powers in an equally-divided wavelength region is monitored, an interpolation method based on superposition of spectral Raman-gain efficiency is used with a repetition method.

In FIG. 25, concerning post-stage output signal light power, a wavelength characteristic at normal time is indicated by a solid line, a wavelength characteristic at failure time is indicated by a dotted line, failure time predicted by using the second method is indicated by triangles, and control time of the power is indicated by black circles. For the control, a method of setting a provisional target value is used to bring the power close to a target value by 1 dB every time. In the figure, since the triangles are substantially placed on the dotted line, it is seen that output signal light power at failure time is interpolated accurately. Concerning the output signal light power at control time, since the black circles are substantially placed on the solid line, accurate control is performed. At the control time, Max-Min is 0.400 dB and a control result of accuracy very close to accuracy for monitoring all the ninety channels is obtained. A standard deviation at control time is 0.0426 and it is confirmed that a result equivalent to the result by the first method is obtained with this method.

According to the present embodiment, it is indicated that, if $G_i$ of the same number as the number of pumping lights (n) is known, $G_i$ of the number of all signal channels (m) can be derived. However, actually, if $\Sigma G_i$ of the same number as the number of pumping light (n) is known, from the following Eq. (43) obtained by expanding Eq. (36), first, Dj can be derived and, then, Gi of the number of all signal channels (m) can be derived. In $\Sigma G_i$, the number of a sum of Gi is arbitrary.

$$\sum_i (G_i) = \sum_i \left( \sum_{j=1}^n g_{ji} D_j \right) = \sum_{j=1}^n \left\{ \left( \sum_i g_{ji} \right) D_j \right\} \quad (43)$$

Note that, when a plurality of signal light powers received by one monitor are weighted according to a transmission spectrum characteristic of an optical filter (FIG. 7), a monitor value Pmonitor can be represented by the following Eq. (44). Note that wi is a weight coefficient of the respective signal light powers. n and i indicate the number of all or a part of signal channels of divided wavelength regions and a number of a signal channel. Pi indicates power of the respective signal channels.

$$P_{monitor} = \sum_{i=1}^n w_i P_i \quad (44)$$

In the equation, wi and Pmonitor are known and a value desired to be calculated is Pi. A method of determining an initial value of Pi and repeatedly updating Pi to cause Pi to converge in the same manner as the second method is used. When it is assumed that all Pi (i=1 to n) are equal, from Eq. (44), the following equation is obtained $$P_i = \frac{P_{monitor}}{\sum_{i=1}^n w_i} \quad (45)$$

and $P_i$ as an initial value is calculated. Therefore, it is possible to calculate power of all the signal channels in the same procedure as the second method in the following manner.

Signal light power of a representative wavelength of a monitor wavelength region is set to $P_i$ calculated by Eq. (15). A difference between output signal light power at normal time (known) and $P_i$ is $G_i$ of the representative wavelength of the monitor wavelength region. Since $G_i$ of the same number as the number of monitors is known, $G_i$ of all signal channels is known according to the principle of superposition of Raman gains (the first method). $P_i$ of all the signal channels is known using the output signal light power at normal time (known) and $G_i$.

However, at this stage, even if $P_i$ is substituted in the right part of Eq. (44), the right part does not coincide with a monitor value in the left part of Eq. (44). Therefore, concerning the respective monitor wavelength region, a process for multiplying all powers $P_i$ by a coefficient h to cause $P_i$ to coincide with the monitor value is set as indicated by $$P_{monitor} = \sum_{i=1}^n w_i(hP_i) = h \cdot \sum_{i=1}^n w_i P_i.$$

Since Pmonitor, wi, and Pi are known, h is calculated as $$h = \frac{P_{monitor}}{\sum_{i=1}^n w_i P_i}.$$

Then, $P_i$ is updated to $hP_i$ as new $P_i$.

The above process is repeated to cause the powers $P_i$ of all the signal channels to converge. With the method described above, even if the band pass filter having an arbitrary transmission band is used, it is possible to predict powers of all the signal channels accurately if the number of monitors is equal to or larger than the number of pumping lights.

Figure 26:
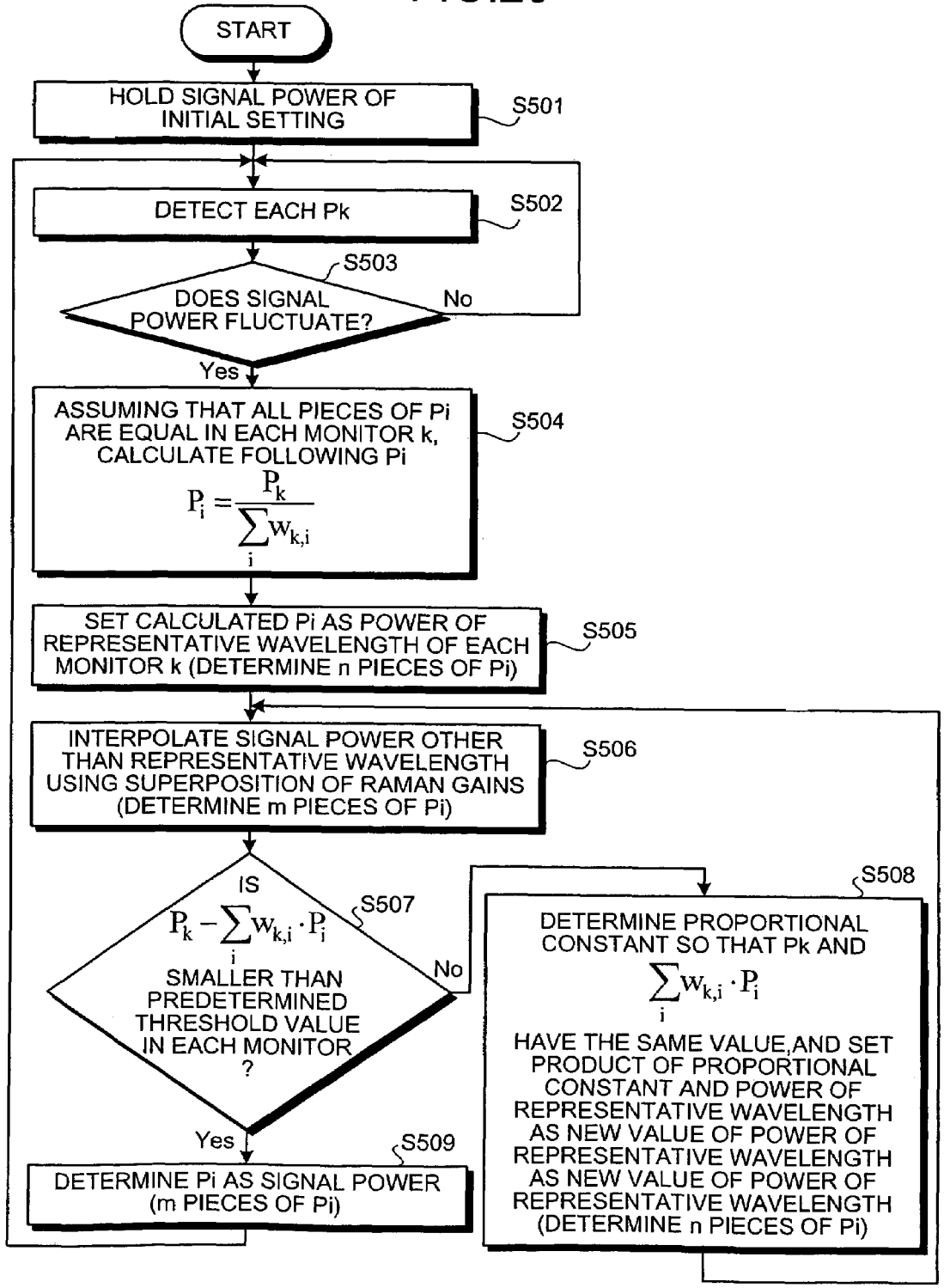
FIG. 26 is a flowchart of a processing procedure for determining signal power.

Note that the processing procedure for determining signal powers described above is shown as a flowchart in FIG. 26.

When pumping light powers of the Raman amplifier are designed, parameters required to be set, situations related to the parameters, specific methods to be selected, and the like can be classified as described below. Note that the number and wavelengths of pumping lights are already determined.

i. Characteristics of a Fiber
  1. Distributed
  2. Centralized ii. Combinations of Pumping Systems and Pumping Wavelengths
  1. Forward pumping alone
  2. Backward pumping alone
  3. Wavelengths in which forward pumping and backward pumping are the same are present in bidirectional pumping.
  4. Wavelengths in which forward pumping and backward pumping are the same are not present in bidirectional pumping.

iii. Setting of pumping light powers before designing
  1. An initial value is close to an optimum value.
  2. Pumping light powers, which are determined such that a target gain is obtained according to the principle of superposition of gains without taking into account the Raman effect among pumping lights, are set as an initial value.

3. All the pumping light powers are set to be the same to substantially adjust total pumping light power to the initial value in 2 above.

4. All the pumping light powers are set to be the same to set total pumping light power to a very small value.

iv. A Method of Updating the Matrix A

1. Only a method of adding an amount of fluctuation in powers calculated by the linear approximation method at the previous step to original powers to update the original powers is used.

2. In addition to 1 above, depending on a situation, a method of solving a nonlinear propagation equation using pumping light powers calculated by the linear approximation method at the previous step to calculate accurate powers and update the pumping light powers is adopted.

v. A Method of Bringing Pumping Light Powers Close to a Target Value

1. A provisional target value is set until pumping light powers are brought close to a target value.

2. A provisional target value is not set until pumping light powers are brought close to a target value.

The present invention includes all combinations of the classifications. The "centralized" fiber in i-2 can be treated in the same manner by changing a fiber length and fiber parameters. In examples 1 to 7, a combination is fixed to a combination of 1 in the condition i and 2 in the condition iv.

According to a first embodiment of the present invention, an initial value of pumping light powers is close to an optimum value and the pumping light powers can be designed only for forward pumping. The pumping light powers are determined under conditions described below.

Signal light: 1530 to 1610 nm, 0.1 terahertz interval, 97 channels, 0.1 mW/ch
Pumping light: eight waves for only forward pumping
Fiber: Single Mode Fiber (SMF), 50 kilometers
Target value: Net Gain 0 dB For update of the matrix A, only a method of solving a nonlinear propagation equation to calculate accurate signal light and pumping light powers is used. The pumping light powers are powers inputted to a transmission optical fiber. In the following description, powers represented as pumping light powers indicate powers inputted to the transmission optical fiber. Transitions of output signal powers are shown in FIG. 27. As it is seen from a result shown in FIG. 27, a substantially optimum gain is obtained in a pumping light set of C. Even if the linear approximation is applied from D, further improvement is not observed. In other words, it is indicated that an optimum combination of pumping light powers was obtained in this combination of pumping light wavelengths.

According to a second embodiment of the present invention, an initial value of pumping light powers is close to an optimum value and the pumping light powers can be designed only for backward pumping. The pumping light powers are determined under conditions described below.

Signal light: 1530 to 1610 nm, 0.1 terahertz interval, 97 channels, 1 mW/ch
Pumping light: eight waves for only forward pumping
Fiber: SMF, 50 kilometers
Target value: Net Gain 0 dB For update of the matrix A, only a method of solving a nonlinear propagation equation to calculate accurate signal light and pumping light powers is used. Transitions of output signal powers are shown in FIG. 28. Even if the linear approximation is applied from D, further improvement is not observed. In other words, it is indicated that an optimum combination of pumping light powers was obtained for a system with only backward pumping.

According to a third embodiment of the present invention, an initial value of pumping light powers is close to an optimum value and the pumping light powers can be designed for bilateral pumping. The pumping light powers are determined under conditions described below.

Signal light: 1530 to 1610 nm, 0.1 terahertz interval, 97 channels, 1 mW/ch
Fiber: SMF, 50 kilometers
Target value: Net Gain 0 dB For update of the matrix A, only a method of solving a nonlinear propagation equation to calculate accurate signal light and pumping light powers is used. Wavelengths of eight waves of backward pumping are the same as those in the second embodiment. Forward pumping of the same wavelengths as the four waves on the short wavelength side is added to consider a pump set of total twelve waves. If both forward and backward powers are moved, design cannot be determined uniquely. Thus, forward pumping light power is fixed in advance. Transitions of output signal powers until the output signal powers reach Net Gain 0 dB are shown in FIG. 29. As it is seen from a result in FIG. 29, a sufficiently optimum gain is obtained in a pump set of C. Even if the linear approximation is applied from D, further improvement is not observed. It can be said that pumping light powers have converged. In other words, it is indicated that an optimum combination of forward pumping light powers and pumping light powers was obtained by fixing forward pumping light powers for a system with bidirectional pumping.

According to a fourth embodiment of the present invention, an initial value of pumping light powers is close to an optimum value and the pumping light powers can be designed for bilateral pumping as in the third embodiment. The pumping light powers are determined under conditions described below.

Signal light: 1530 to 1610 nm, 0.1 terahertz interval, 97 channels, 1 mW/ch
Fiber: SMF, 50 kilometers
Target value: Net Gain 0 dB For update of the matrix A, only a method of solving a nonlinear propagation equation to calculate accurate signal light and pumping light powers is used. Pumping lights are eight waves. Wavelengths thereof are the same as those in the second embodiment. Among the eight waves, three waves are for forward pumping and five waves are for backward pumping. Since all the waves have different wavelengths, all pumping light powers are designed to fluctuate. Transitions of output signal powers until the output signal powers reach Net Gain 0 dB are shown in FIG. 30. As it is seen from a result in FIG. 30, a sufficiently satisfactory gain characteristic is obtained in a pump set of C. Even if the linear approximation is applied from D, further improvement is not observed. It can be said that pumping light powers have converged. In other words, it is indicated that an optimum combination of forward pumping light powers and backward pumping light powers was obtained for a system with bidirectional pumping.

According to a fifth embodiment of the present invention, pumping light powers can be designed when pumping light powers, which are determined such that a target gain is obtained according to the principle of superposition of gains without taking into account the Raman effect among pumping lights, are set as an initial value. The pumping light powers are determined under conditions described below.

Figure 31:
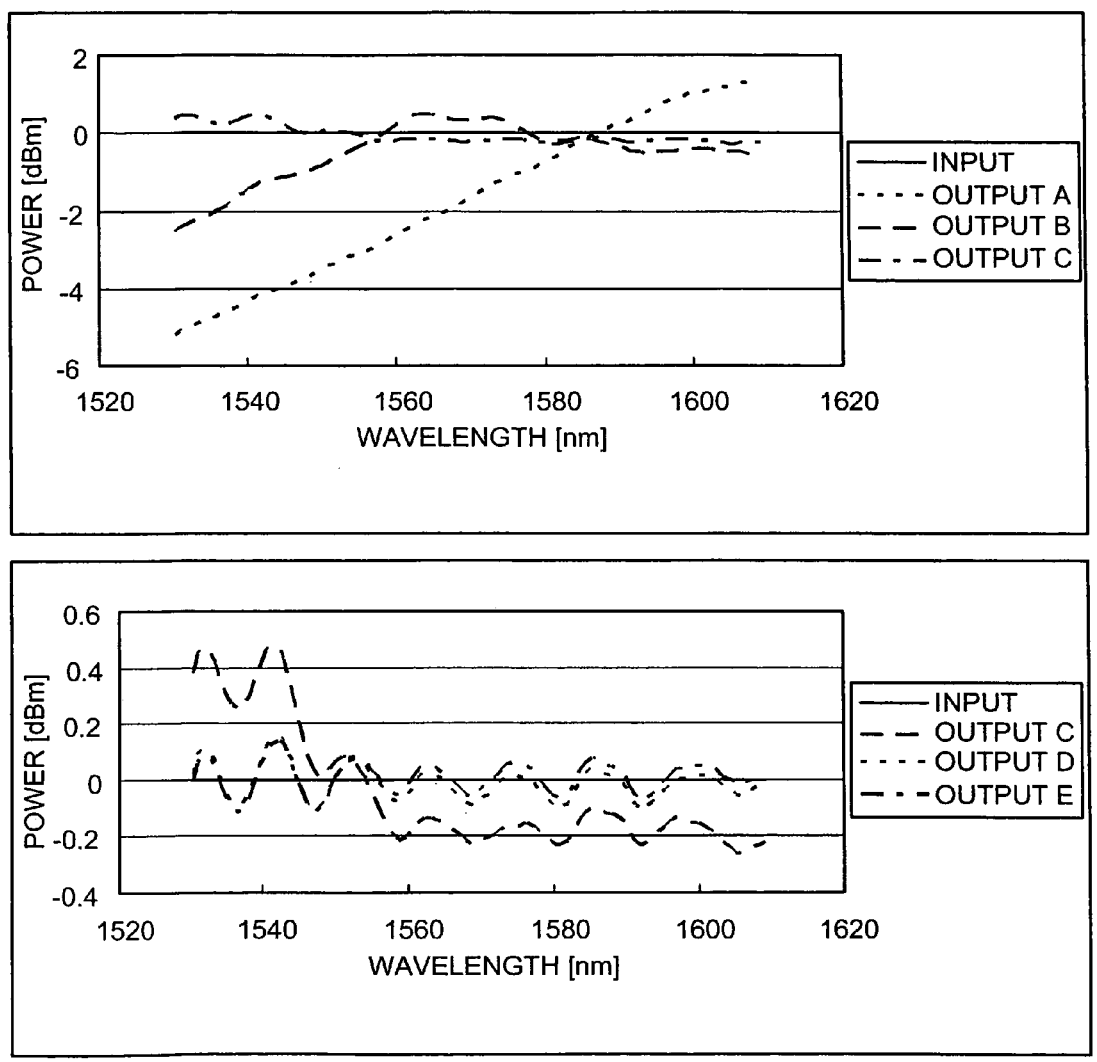
FIG. 31 is a graph of transitions of wavelength-dependent output signal powers until the output signal power converges to Net Gain 0 dB according to a fifth embodiment of the present invention.

Signal light: 1530 to 1610 nm, 0.1 terahertz interval, 97 channels, 1 mW/ch
Fiber: SMF, 50 kilometers
Target value: Net Gain 0 dB For update of the matrix A, only a method of solving a nonlinear propagation equation to calculate accurate signal light and pumping light powers is used. In addition, a method of setting a provisional target value such that pumping light powers are brought close to a target value by 2 dB every time is used. In other words, a provisional target value is set such that signal channels 2 dB or more apart from the target value come close to the target value by 2 dB and channels within 2 dB from the target value come close to the target value at a stretch. In pumping light powers before designing, the Raman effect among pumping lights is neglected. Thus, it is expected that a wavelength characteristic of output signals is tilted greatly. Transitions of output signal powers until the output signal powers reach Net Gain 0 dB are shown in FIG. 31. As it is seen from a result in FIG. 31, an optimum gain is obtained in a pump set of E. Even if calculation is further repeated from E, no improvement is observed. In other words, it is indicated that an optimum combination of pumping light powers was obtained for a system in which a wavelength characteristics of output signals was tilted greatly before designing.

According to a sixth embodiment of the present invention, pumping light powers can be designed when total pumping light power, which is determined such that a target gain is obtained according to the principle of superposition of gains without taking into account the Raman effect among pumping lights, is distributed equally to respective pumping lights is set as an initial value. The pumping light powers are determined under conditions described below.

Figure 32:
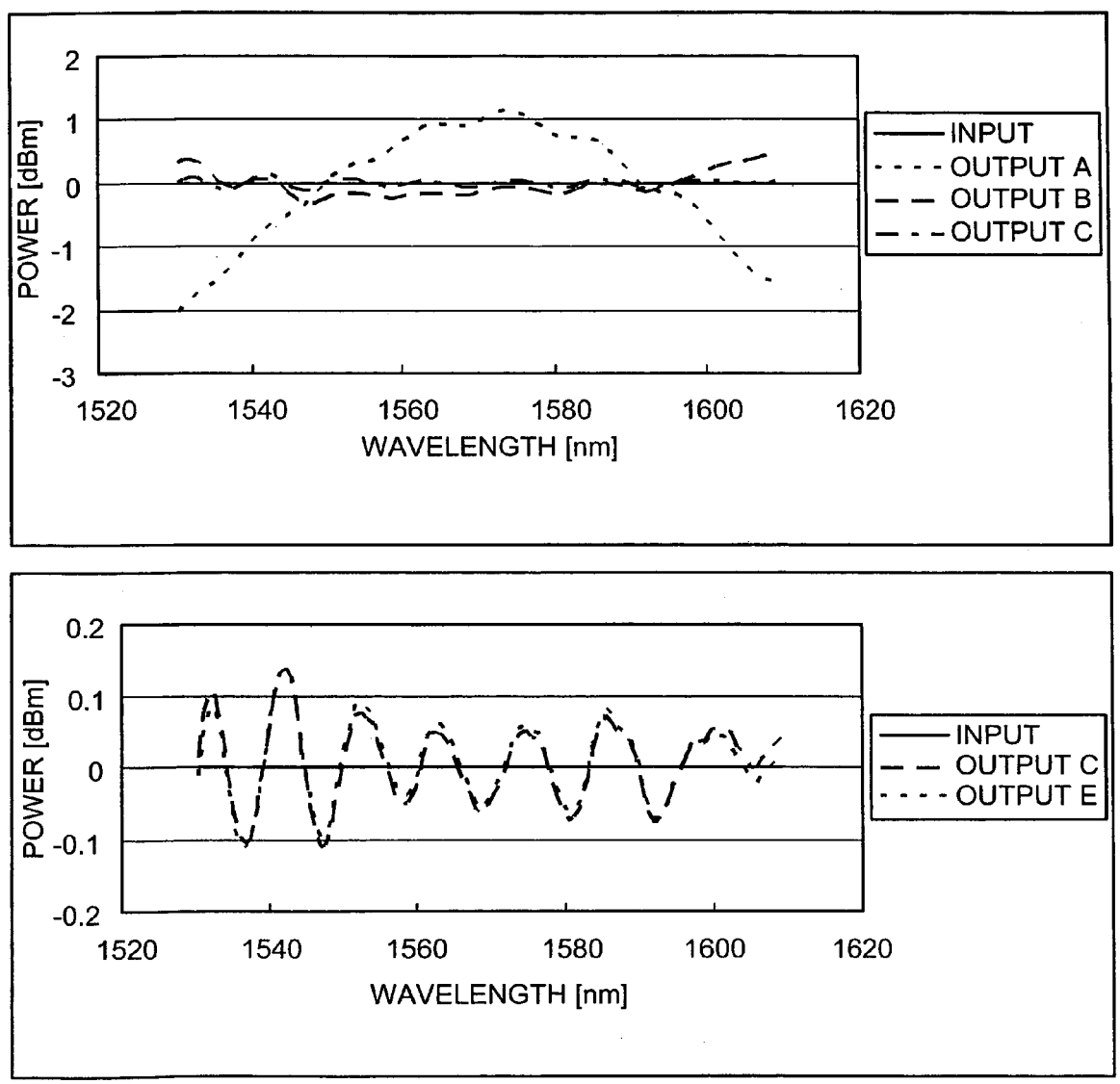
FIG. 32 is a graph of transitions of wavelength-dependent output signal powers until the output signal power converges to Net Gain 0 dB according to a sixth embodiment of the present invention.

Signal light: 1530 to 1610 nm, 0.1 terahertz interval, 97 channels, 1 mW/ch
Fiber: SMF, 50 kilometers
Target value: Net Gain 0 dB For update of the matrix A, only a method of solving a nonlinear propagation equation to calculate accurate signal light and pumping light powers is used. In addition, a pumping light powers are brought close to a target value at a stretch. Transitions of output signal powers until the output signal powers reach Net Gain 0 dB are shown in FIG. 32. As it is seen from a result in FIG. 32, an optimum gain is obtained in a pump set of C. Even if calculation is further repeated from E, no improvement is observed. In other words, it is indicated that an optimum combination of pumping light powers was obtained when total pumping light power was close to an optimum value before designing and the respective pumping light powers were equalized.

According to a seventh embodiment of the present invention, pumping light powers can be designed when the pumping light powers are set very low. The pumping light powers are determined under conditions described below.

Figure 33:
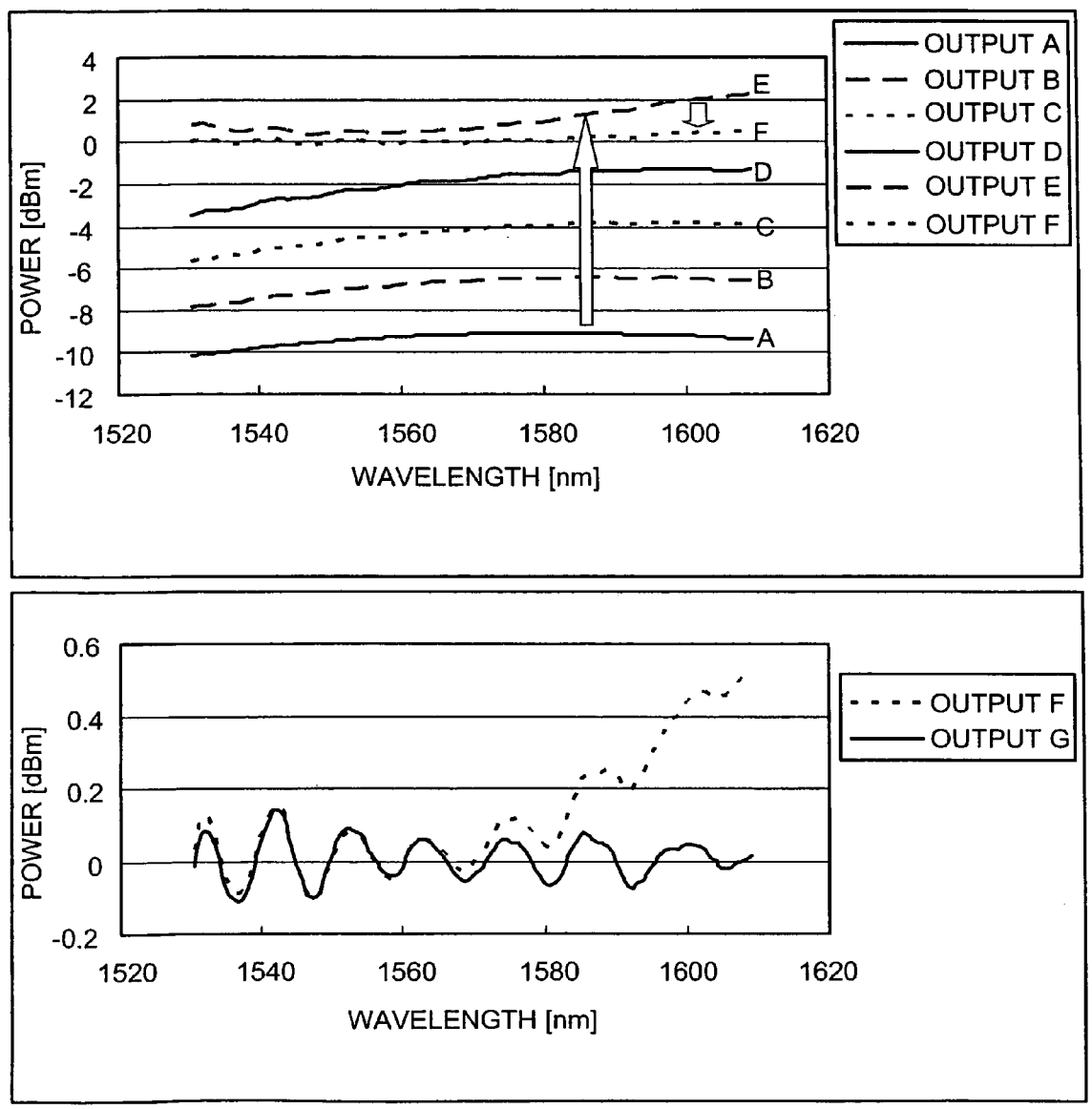
FIG. 33 is a graph of transitions of wavelength-dependent output signal powers until the output signal power converges to Net Gain 0 dB according to a seventh embodiment of the present invention.

Signal light: 1530 to 1610 nm, 0.1 terahertz interval, 97 channels, 1 mW/ch
Fiber: SMF, 50 kilometers
Target value: Net Gain 0 dB For update of the matrix A, only a method of solving a nonlinear propagation equation to calculate accurate signal light and pumping light powers is used. In addition, a method of setting a provisional target value such that pumping light powers are brought close to a target value by 2 dB every time is used. The number of pumping lights before designing and wavelengths are the same as those in the fifth embodiment. All the powers are set to 10 milliwatts. Transitions of output signal powers until the output signal powers reach Net Gain 0 dB are shown in FIG. 33. Whereas the output signal powers are brought close to the target value by 2 dB for all channels in A to D, the output signal powers are brought close to the target values for all the channels at a stretch in D to G. Even if calculation is further repeated from G, no improvement is observed. In other words, it is indicated that an optimum combination of pumping light powers was obtained when the respective pumping light powers were apart from an optimum value greatly in this way before designing.

According to an eighth embodiment of the present invention, a profile is planarized optimally by neglecting the Raman effect among pumping lights and superposing Raman gain spectra appearing from respective pumping wavelengths according to the principle of superposition. This profile is considered. If a value close to this profile is obtained in designing, it can be judged that optimum pumping light powers are obtained for a plurality of sets of pumping wavelengths.

Figures 34, 35:
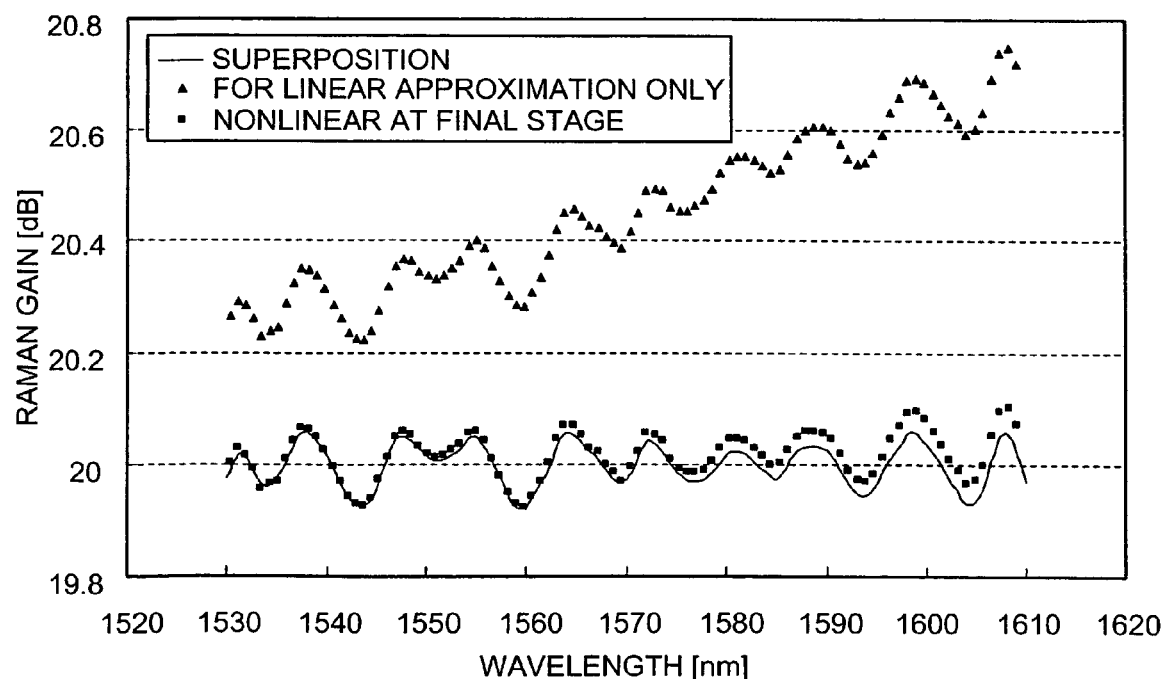
FIG. 34 is a table of pumping light powers before designing and pumping light wavelengths according to an eight embodiment of the present invention.
FIG. 35 is a graph of wavelength characteristics of a Raman gain obtained by three kinds of methods according to the eighth embodiment.

In the distributed Raman amplifier, as conditions, fibers are Dispersion Shifted Fibers (DSFs), a fiber length is 100 kilometers, a signal wavelength band is 1530 to 1610 nm, the total number of channels is 97 at 100 gigahertz intervals, input signal light power is 0 dBm/ch, pumping lights are backward ten waves, and pumping wavelengths have been determined. Pumping powers are calculated automatically to realize a Raman gain of 20 dB. An initial value of the respective pumping light powers was set to 10 milliwatts. Pumping light wavelengths and powers before designing are shown in FIG. 34. A Raman gain obtained in this case is about 2 dB in average. Thus, there is a difference of 18 dB between the target value and the Raman gain. Wavelength characteristics of Raman gains calculated by three kinds of methods are shown in FIG. 35. A mark ▲ indicates a method of setting a provisional target value such that a gain is increased by 1 dB every time from an initial state step by step while calculating the matrix A used in the middle using a result of the linear approximation. A mark ¦ indicates a result of improving accuracy by repeating the method once using a value of A obtained by a nonlinear equation to reduce an error after the gain converges with the method. Results obtained by thee methods were compared with a profile (superposition) indicated by a solid line obtained by using the principle of superposition of gains. It is indicated that a target gain profile is obtained at an error of about 0.6 dB and a value close to an optimum pump power is obtained at high speed by a method using only the linear approximation. A ninth embodiment of the present invention indicates that this error can be reduced according to setting of a provisional target value. A result of the method of solving a nonlinear equation at a final stage and a difference of a maximum value and a minimum value of an ideal profile are 0.180 dB and 0.137 dB, respectively. It is indicated that an optimum pump power can be determined accurately by this method. Pumping light powers before designing, after convergence only by the linear approximation, and after convergence by the method of solving a nonlinear equation at a final stage are shown in FIG. 36.

According to the ninth embodiment, actually measured values and pumping light powers obtained as a result of solving an inverse problem are compared. A determination ability of the comparison is described. Pumping light powers were determined with an actually measured Raman gain as a target. As experimental conditions, a fiber was 77.8 kilometers of True Wave® RS Fiber (TW-RS) (Non-zero dispersion fiber (NZDF) manufactured by OFS), the number of pumping lights was 9, an amplification band was 1530 to 1605 nm, an ASE light source was used, and wavelengths and powers of pumping lights were set such that a Raman gain of about 10 dB was obtained over the band. As design conditions, signals were set at intervals of 100 gigahertz over the band and total input signal light power was set to 0 dBm. When a nonlinear propagation equation was solved with the pumping light powers of the experiment to calculate a Raman gain, maximum deviation of 0.2 dB occurred between the Raman gain and actually measured values. It is considered that this is caused by deviation of fiber parameters in a simulation.

Figure 38:
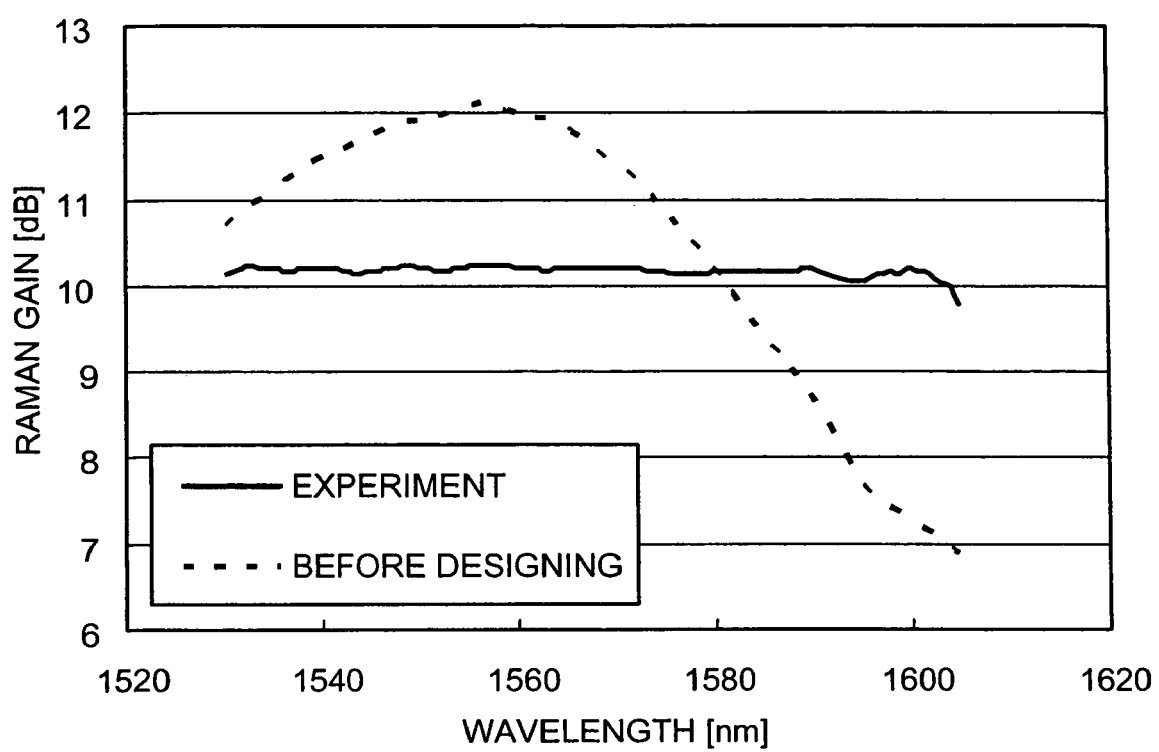
FIG. 38 is a graph of a Raman gain obtained by solving a nonlinear propagation equation with the pumping light power before designing according to the ninth embodiment.

Respective pumping light powers before designing are 42 milliwatts and total power thereof is substantially equal to pumping light total power in the experiment. Pumping wavelengths and pumping optical powers before designing are shown in FIG. 37. A Raman gain obtained by solving a nonlinear equation with the pumping light powers is shown in FIG. 38. When the Raman gain is compared with measured values, a maximum difference is 3 dB. Wavelength dependency of measured values and a Raman gain calculated from pumping light powers obtained by solving an inverse problem is shown in FIG. 39. As designing results, a result obtained by solving an inverse problem with a step width set to 2 dB, 1 dB, and 0.5 dB and causing the Raman gain to converge on a target value only with the linear approximation and a result obtained by solving a nonlinear equation after the Raman gain converges at the step width of 0.5 dB and causing the Raman gain to converge are shown. It is seen that an error between the Raman gain and the actually measured values decrease as the step width decreases. The result obtained by causing the Raman gain to converge at the step width of 0.5 dB only with the linear interpolation cannot be distinguished from the result obtained by solving the nonlinear equation finally. Therefore, concerning this system, it is indicated that, if the step width is set to 0.5 dB, optimum pumping light powers are obtained at high sped and accurately.

Figures 40, 41:
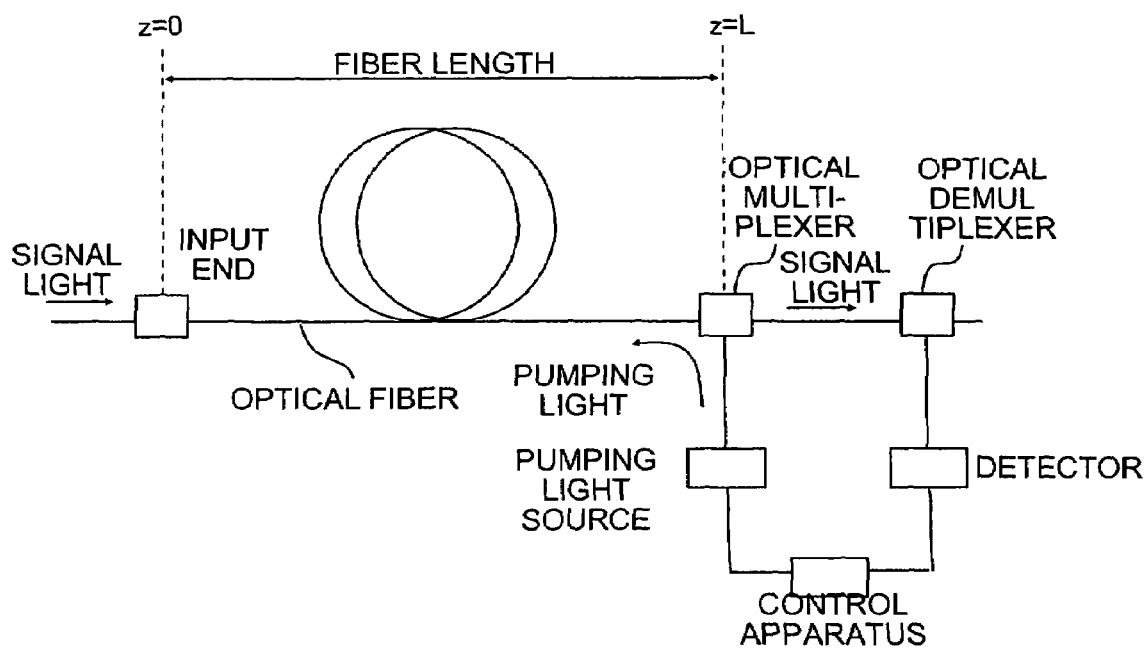
FIG. 40 is a table of the measured value and pumping light power obtained by solving the inverse problem according to the ninth embodiment.
FIG. 41 is a schematic of a Raman-amplifier system in which one signal light is amplified by one backward pumping light.

The respective pumping light powers are shown in FIG. 40. The pumping light powers obtained by the method of solving a nonlinear equation finally deviate from the pumping light powers of the experiment by 2 milliwatts in total power and maximum 6 milliwatts in the respective pumping light powers. This deviation affects the target Raman gain less. Thus, it can be said that the pumping light powers of the experiment are reproduced sufficiently. It is indicated that the method according to the linear approximation is effective in the object of solving an inverse problem for determining pumping light powers to realize a certain target signal output. Incidentally, calculation time for solving the nonlinear equation in this case was sixty times as long as calculation time in the case of a linear equation.

An example of applying the pumping light power determining method using the linear approximation to control of the Raman amplifier is explained. Control means changing, when a signal output changes because of a change in an input signal or a change in a line state, pumping light power to keep the output in a range required by specifications or return the output to the range. The control method used According to the present embodiment is explained briefly below.

FIG. 41 is a schematic of a system in which one wave of signal light is transmitted and the signal light is amplified by one wave of backward pumping light in an optical transmission line. A detector is arranged at an exit end to monitor an output signal. It is possible to control pumping light power of backward pumping with a control apparatus. A photodiode or the like is used for the detector.

It is assumed that input signal power fluctuate and output signal power also fluctuates due to influence of the fluctuation in the input signal power. In this case, the Raman amplifier is controlled by a process in two stages.

Figure 42:
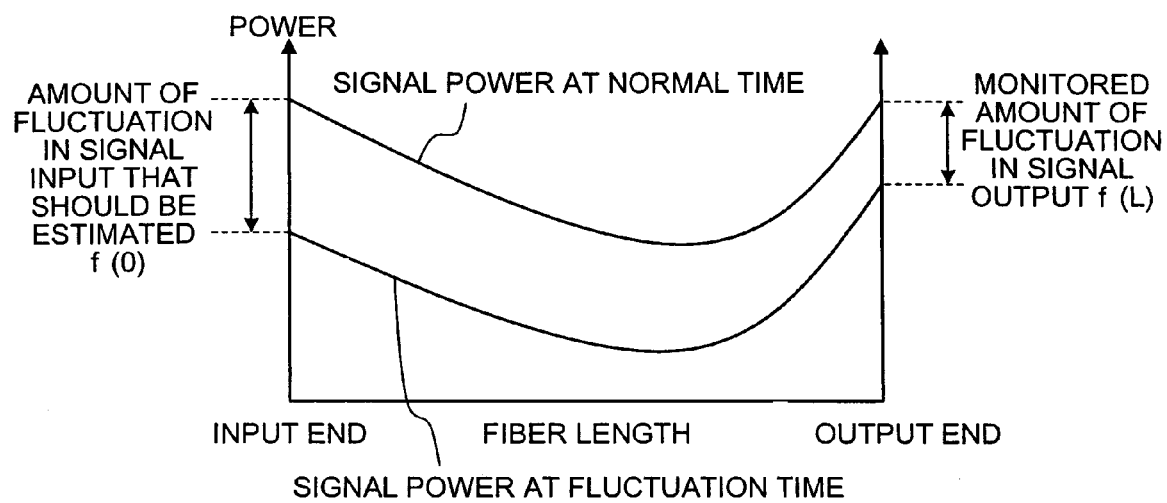
FIG. 42 is a graph of a process of estimation of an amount of fluctuation in an input signal corresponding to a first stage of control, indicated as a distribution in a longitudinal direction of signal light power.

First, as a first stage, an amount of fluctuation in an output signal $f(L)$ is monitored to estimate an amount of fluctuation in an input signal $f(0)$. FIG. 42 is a graph of a process of this estimation as a distribution in a longitudinal direction of signal light power. In this process, an amount of fluctuation $\eta(L)$ in a backward pumping light input is 0. When the amount of fluctuation in an output signal is sufficiently small, if $\epsilon(L)$ is set equal to $f(L)$ and $\eta(L)$ is set equal to 0 in Eq. (15), the amount of fluctuation in an input signal is automatically calculated. When the amount of fluctuation in an output signal is large, since an error due to the linear approximation occurs in an amount of fluctuation in an input signal after estimation, a method of setting a provisional target value and bringing the amount of fluctuation in an input signal close to a monitored amount of fluctuation in an output signal is effective. Since high-speed calculation is required in the control, it is better to use a result of a previous step for update of the matrix A.

As a second stage, pumping light power necessary for returning the output signal to the specification value is calculated using a result of the estimation of the amount of fluctuation in an input signal calculated at the first stage. FIG. 43 is a graph of this process shown as distributions in a longitudinal direction of signal light power and pumping light power. As an initially set value at the second stage, a design value before failure may be used or a value obtained by adding the amount of fluctuation in power estimated at the first stage to the design value. According to the present embodiment, the design value before failure is used. When the amount of fluctuation in an input signal $f(0)$ estimated at the first stage is sufficiently small, it is sufficient to set $\epsilon(L)$ equal to $f(L)$ and set $\eta(L)$ equal to 0 in Eq. (15) to determine an amount of fluctuation in pumping light power. When the amount of fluctuation in an input signal is large, to reduce an error due to the linear approximation, a method of setting a provisional target value and bringing the amount of fluctuation in an input signal close to an estimated amount of fluctuation in an input signal is effective. At the second stage, it is also advisable to use the method of adding the amount of fluctuation in power, which is a result of a previous step, to original power for update of the matrix A.

In the control described above, for simplification of explanation, both signal light and pumping light are one wave. However, this method can be applied in the same manner when there are a plurality of signal light wavelengths and a plurality of pumping light wavelengths. For example, in the control, concerning the estimation of an amount of fluctuation in an input signal at the first stage, since $\epsilon(L)$ and $\eta(L)$ in Eq. (16) are known and (m+n) parameters are known, m elements of $\epsilon(0)$ are derived uniquely. Concerning the second stage, since all the parameters cannot be determined uniquely, an algorithm for minimizing deviation with respect to a target value such as the least squares method only has to be used.

As an actual control method, control according to a combination of methods described below is also effective. For example, it is possible to solve a nonlinear equation in parallel with control using a computer in the middle of the control and obtain a latest value of the matrix A using a value of the nonlinear equation to thereby improve prediction accuracy. It is also possible that a step width is set large at first to reduce calculation time to cause a prediction result to converge and a prediction value of a smaller step width is calculated during the convergence to replace the prediction value with the prediction result. Consequently, it is possible to satisfy conflicting requirements of reducing time for a first response and obtaining a prediction result with high accuracy finally. Moreover, the control unit of the Raman amplifier includes information on, for example, conditions for every few dB as a table in advance instead of having only information on initial design in advance. Then, the control unit may extract conditions close to a target value from the table and form an algorithm for starting control (adjustment) with the conditions as initial conditions. With this method, it is also possible to realize both the response in a short time and the highly accurate prediction.

According to the present embodiment, the control is performed only at the post-stage. However, pumping light powers of both the pre-stage and the post-stage may be controlled. It goes without saying that the control can be expanded to three or more stages.

Figure 45:
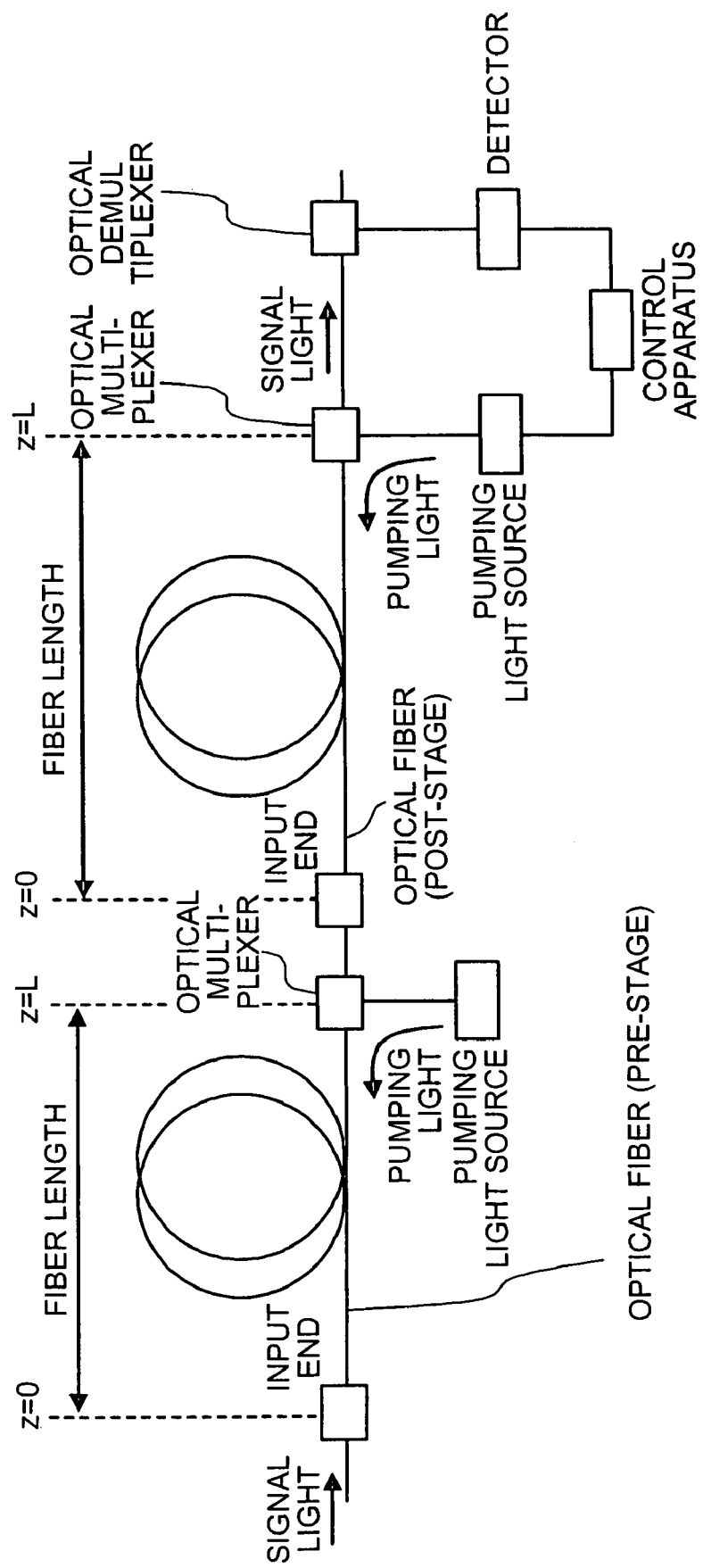
FIG. 45 is a schematic of a Raman-amplifier system according to the tenth embodiment.
Figure 46:
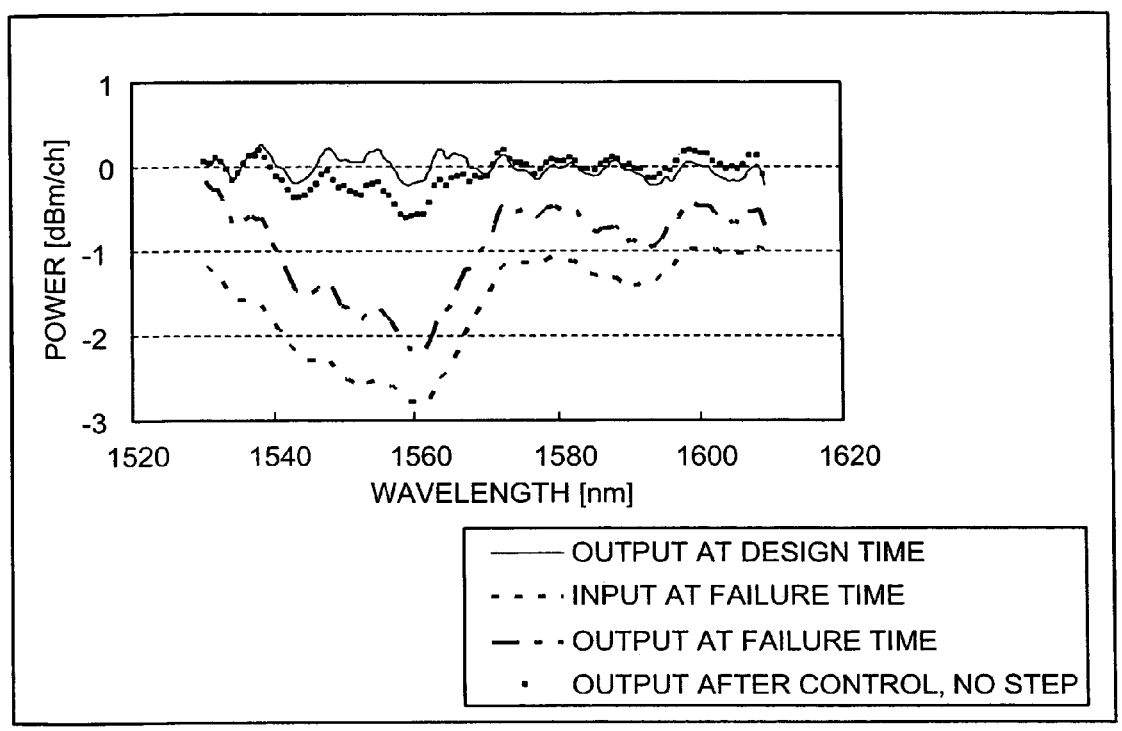
FIG. 46 is a graph of signal output power when it is assumed that a fifth pumping light source from a short wavelength side fails at a pre-stage, according to the tenth embodiment.
Figures 47, 48:
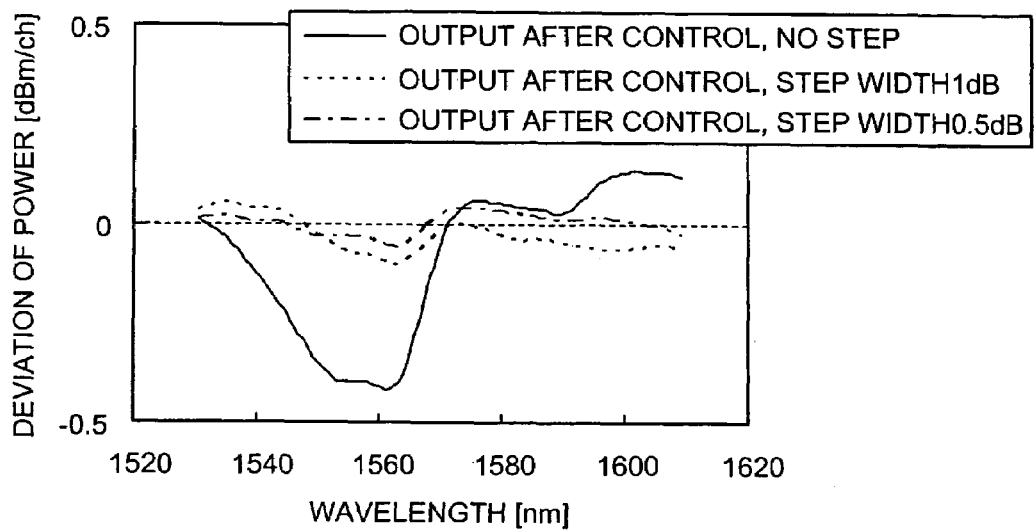
FIG. 47 is a graph of a deviation of controlled signal output power and signal output power before failure when it is assumed that a fifth pumping light source from a short wavelength side fails at a pre-stage, according to the tenth embodiment.
FIG. 48 is a schematic of pumping light wavelengths, pumping light powers before control, and pumping light powers after control, according to the tenth embodiment.

According to a tenth embodiment of the present invention, two stages of a system, wavelengths and powers of which are designed to realize a DSF 100 kilometers as a control object, signal light of 1530 to 1610 nm, 97 channels, 100 gigahertz intervals, input signal light power of 0 dBm/ch, backward ten waves as pumping light, and Net Gain of 0 dB, are connected. The stages are set as a pre-stage and a post-stage, respectively. Pumping light wavelengths and powers at the time of designing are shown in FIG. 44. FIG. 45 is a schematic diagram of the system. Considering a state in which one of pumping light sources at the pre-stage fails and an input signal and an output signal at the post-stage deviate from design values, pumping light power of a Raman unit at the post-stage is controlled by the control apparatus to return output signal light power to the design value. First, the output signal is monitored by a detector to estimate an amount of fluctuation in an input signal. Then, an amount of fluctuation in pumping light power realizing the derived input signal and the output signal at the time of designing is derived. The method of setting a provisional target value and bringing pumping light power close to a target value step by step is used. Since only the method using only the linear approximation, which can be performed at high speed, is effective in the control, the matrix A is calculated according to a result of the linear approximation to predict an amount of fluctuation in pumping light power. When it is assumed that a fifth pumping light source from a short wavelength side fails at the pre-stage, deviations of pumping light power from signal output power as a result of controlling the pumping light power and signal output power before failure are shown in FIGS. 46 and 47, respectively. Powers of the input signal and the output signal at the post-stage at failure time decrease by 2.5 dB or more and 2.0 dB or more, respectively. After the control, errors between the input signal and the output signal decreased as a step width changed from zero to 1 dB and 0.5 dB. A difference between a maximum value and a minimum value was 0.499 dB at the time of designing and 0.535 dB at the time of the control with the step width of 0.5 dB. Respective pumping light powers are shown in FIG. 48. It is indicated that it is possible to control pumping light power sufficiently with the method using only the linear approximation.

According to the tenth embodiment, it is assumed that the fifth pumping light source from the short wavelength side fails at the pre-stage. However, this control method is also effective when pumping light sources other than the fifth pumping light source from the short wavelength side fail.

According to the tenth embodiment, the control is performed only with backward pumping light. However, if the control is performed with forward pumping light, a Noise Figure can be further improved.

Although not described in the examples, this method can be applied to operation for keeping an output signal constant even if an input signal fluctuates. Since a method in this case is completely the same as the second stage of the method described above, effectiveness of the method is proved in the tenth embodiment.

An example of application of the pumping light power determining method using the linear approximation to adjustment of a Raman amplifier is described. Adjustment means changing, when an output deviates from a specification value, pumping light power to bring the output close to the specification value. When the specification value is changed, adjustment also means changing pumping light power to bring the output close to a changed value of the specification value.

An eleventh embodiment of the present invention deals with an example in which, when a designed Raman amplifier is installed and signal output power of specifications is not obtained, the power is returned to original power.

It is assumed that, when a Raman amplifier is actually installed, signal output power of specifications is not obtained in some cases. As a possible cause, there are an absorption coefficient and a Raman gain coefficient of a fiber, a fiber length, deviation of a wavelength and power of pumping light, and the like. According to the present embodiment, signal output power is adjusted according to pumping light power regardless of the cause. For the adjustment, a method of adjusting signal output power assuming that the signal input power fluctuates is used. This is completely the same as the method used in the control. The method of setting a provisional target value and adjusting signal output power step by step is not used.

It is assumed that conditions at a design stage are as described below.

Signal light: 1530 to 1610 nm, 0.1 terahertz interval, 97 channels, 1 mW/ch

Pumping light: eight waves for only forward pumping

Fiber: SMF, 50 kilometers

Target value: Net Gain 0 dB

Figures 49, 50:
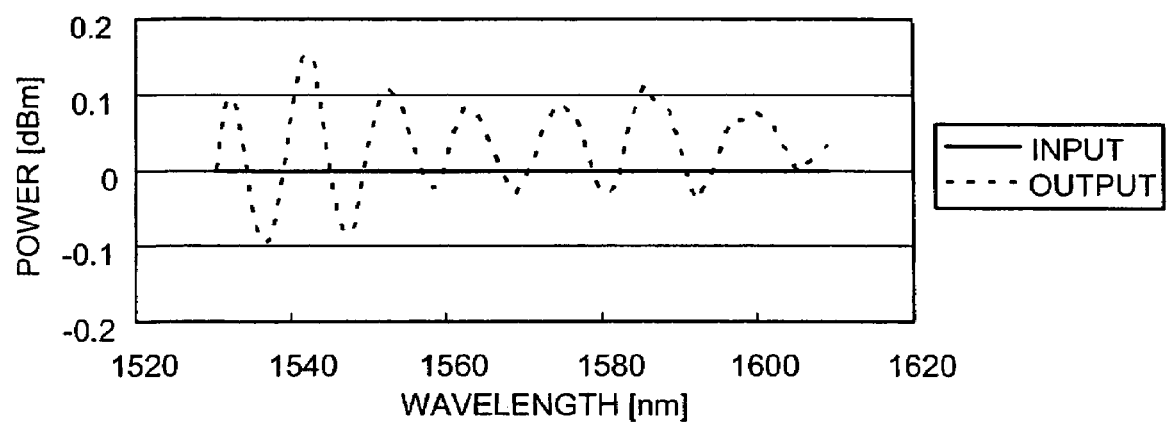
FIG. 49 is a schematic of pumping light wavelengths and powers before installation, that is, at a design stage, according to an eleventh embodiment of the present invention.
FIG. 50 is a graph of wavelength characteristics of input signal power and output signal power at the design stage, according to the eleventh embodiment.

FIG. 49 is a schematic of pumping light wavelengths and powers at the design stage. FIG. 50 is a graph of wavelength characteristics of input signal power and output signal power at the design stage.

Figures 51, 52:
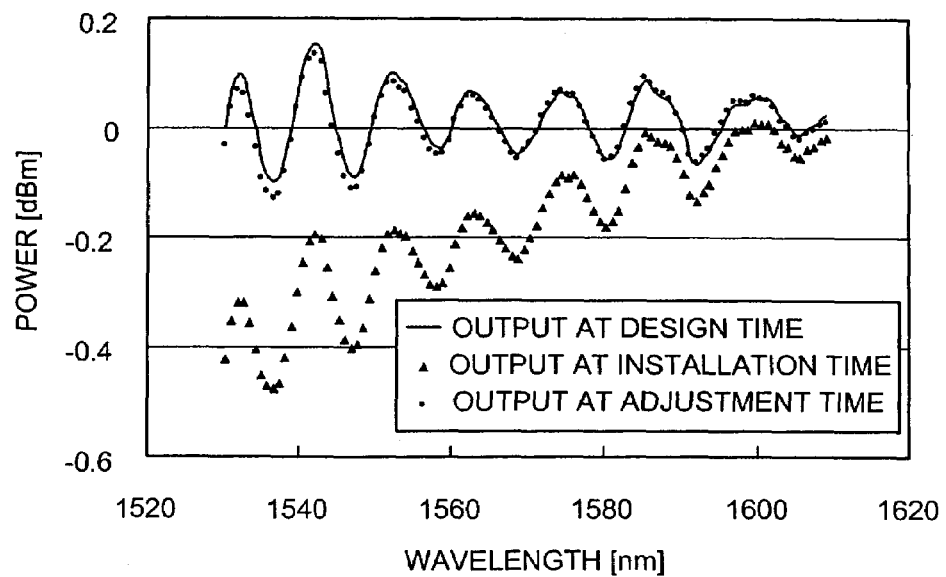
FIG. 51 is a schematic of pumping light wavelengths, pumping light powers before adjustment, and pumping light powers after adjustment, according to the eleventh embodiment.
FIG. 52 is a graph of transitions of signal output powers at the time of designing, at the time of installation, and after pumping light power adjustment, according to the eleventh embodiment.

Concerning an example of characteristic deviation from design values, it is assumed that an absorption coefficient and a Raman gain coefficient of a fiber deviate. According to the present embodiment, it was assumed that, in an actual fiber, a fiber characteristic of a DSF was added to an SMF by 5 percent. FIG. 51 is a schematic of pumping light wavelengths and pumping light powers before and after adjustment. FIG. 52 is a graph of deviations of signal output powers. The signal output powers indicate an output at the time of designing, an actual output at the time of installation, and an output after adjustment of pumping light power, respectively. Differences between maximum values and minimum values of the output powers were 0.252 dB, 0.487 dB, and 0.263 dB, respectively. Regardless of such an unclear cause, it is indicated that it is possible to return signal output power to a specification value with the pumping light power determining method using the linear approximation.

Although not described in the examples, as an example of adjustment using the pumping light power determining method using the linear approximation, when it is desired to increase or decrease the number of signal channels without changing a signal band, signal output power of specifications is maintained. When the number of signal channels is increased, the number of elements of the matrix A in Eq. (16) has to be increased. However, it is difficult to increase the number of elements of the matrix A. To cope with this difficulty, for example, when the number of channels doubles, that is, when a channel interval is halved, it is assumed that signal light powers of the respective channels double. In Eq. (16), $\epsilon(0)$ is determined to double input signal light power and $\epsilon(L)$ is determined to double output signal light power. $\eta(0)$ or $\eta(L)$, that is, an amount of fluctuation in pumping light power only has to be determined by the least squares method to match $\epsilon(0)$ or $\epsilon(L)$. It is sufficient to judge whether a provisional target value should be set and to which degree a step width should be set according to the number of channels to be increased or decreased.

According to a twelfth embodiment of the present invention, as in the embodiment described above, all ninety channels of signal lights are divided into total ten wavelength regions every nine channels from a short wavelength side. This number of wavelength regions is set equal to the number of pumping lights. For each of the wavelength regions, total power of all nine channels included in the wavelength region is monitored. Since only ten wavelength regions are monitored, it is necessary to estimate an unknown amount of fluctuation in an output from monitor values in ten positions according to interpolation.

According to the twelfth embodiment, the principle of superposition of Spectral Raman-gain efficiency is used. Average power in the monitored wavelength region was set as power of a channel in the center of the wavelength region and the same interpolation as the first method in the embodiment was performed. However, the repetition method as the second method was not performed.

Figure 53:
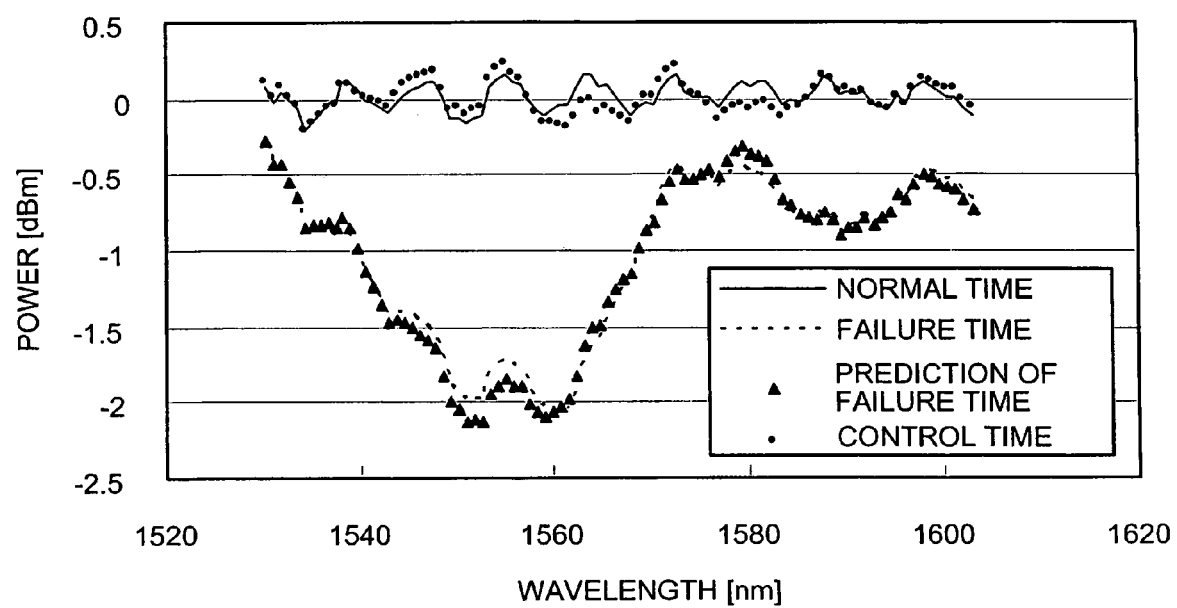
FIG. 53 is a graph of output signal light powers at normal time, failure time, and control time when a total of all signal light powers in equally-divided wavelength regions is monitored and the interpolation method according to superposition of Spectral Raman-gain efficiency is used without performing the repetition method.

In FIG. 53, concerning post-stage output signal light power, a wavelength characteristic at normal time is indicated by a solid line, a wavelength characteristic at failure time is indicated by a dotted line, predicted failure time is indicated by triangles, and control time of the power is indicated by black circles. For the control, a method of setting a provisional target value to bring the power close to a target value by 1 dB every time was used. In the figure, since the triangles are substantially placed on the dotted line, it is seen that output signal light power at failure time is interpolated accurately. Concerning the output signal light power at control time, since the black circles are substantially placed on the solid line, accurate control is performed. At the control time, Max-Min was 0.433 dB and a control result of accuracy very close to a value obtained by monitoring all the ninety channels (0.398 dB) was obtained. A standard deviation at control time was 0.0713. Thus, a satisfactory result was also obtained in this method.

According to a thirteenth embodiment, as in the embodiment described above, all ninety channels of signal lights are divided into total ten wavelength regions every nine channels from a short wavelength side. This number of wavelength regions is set equal to the number of pumping lights. For each of the wavelength regions, output signal light power in a center position with respect to a wavelength in the wavelength band is monitored. Eventually, powers for ten channels of signal lights are monitored using ten photodetectors. However, since only ten channels are monitored, it is necessary to estimate an amount of fluctuation in power of the remaining eighty channels from a value of an amount of fluctuation in power of the monitored ten channels according to interpolation.

According to the thirteenth embodiment, all powers of channels in one wavelength region were set identical with powers of monitored channels (near interpolation). Specifically, power of a channel in the center of the wavelength region was monitored.

Figure 54:
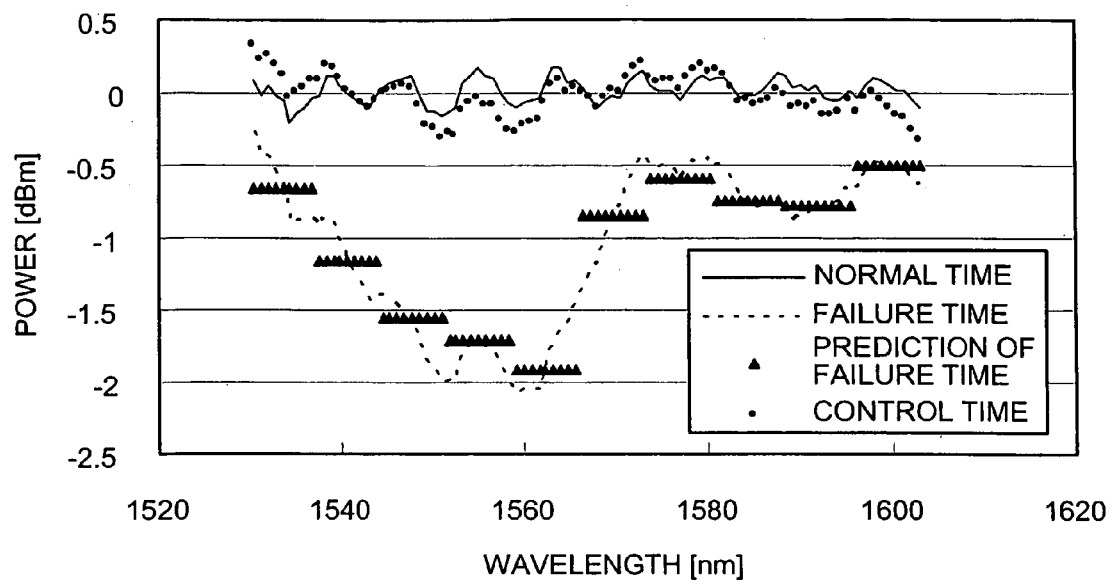
FIG. 54 is a graph of output signal light powers at normal time, failure time, and control time when only signal light power to be a representative wavelength of equally-divided wavelength regions is monitored and near interpolation is used.

In FIG. 54, output signal light power at a post-stage is shown. A wavelength characteristic at normal time is indicated by a solid line, a wavelength characteristic at failure time is indicated by a dotted line, predicted failure time is indicated by triangles, and control time of the power is indicated by black circles. For the control, a method of setting a provisional target value to bring the power close to a target value by 1 dB every time was used. In the figure, the triangles are hardly placed on the dotted line. Although overall tendency of output signal light power at failure time is reproduced, a local characteristic thereof is not predicted. Concerning output signal light power at control time, the black circles indicate values close to the solid line.

Max-Min of signal light output was 0.659 dB. Compared with Max-Min at the time when all the ninety channels of signal lights were monitored (0.398 dB), Max-Min was controlled to be less than twice as large, although the number of monitors was reduced to 1/9. A standard deviation at control time was 0.122. Compared with a standard deviation at the time when ninety PDs were used (0.0415), the standard deviation was about three times as large. Compared with the result in the embodiment, although this value is rather large, it is possible to obtain a result applicable to practical use with a more simple method.

Figure 55:
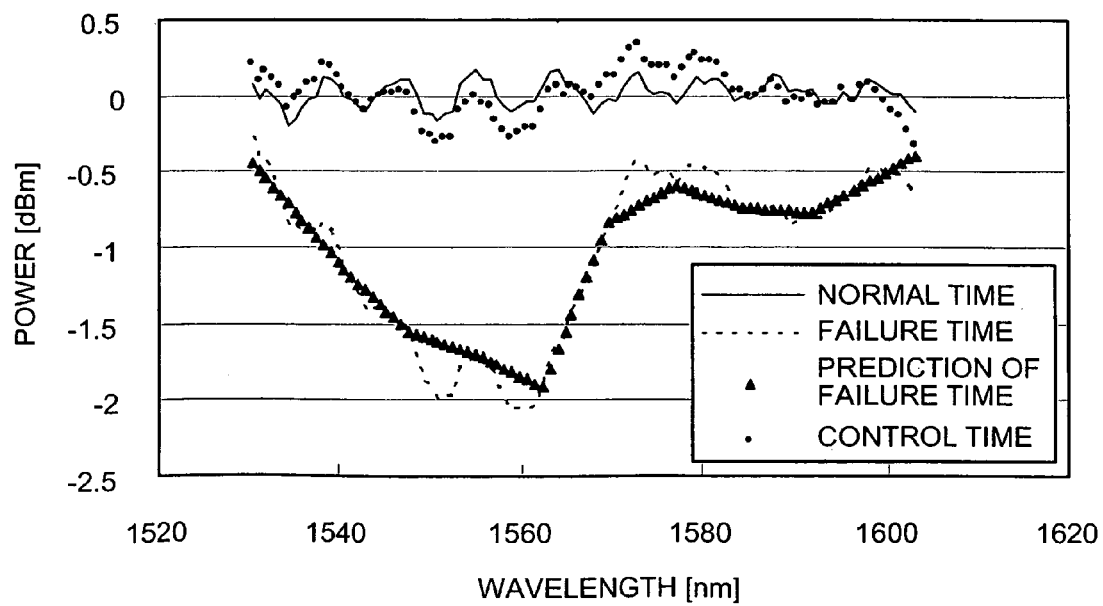
FIG. 55 is a graph of output signal light powers at normal time, failure time, and control time when only signal light power to be a representative wavelength of equally-divided wavelength regions is monitored and linear interpolation is used.

According to a fourteenth embodiment of the present invention, as in the thirteenth embodiment, ten photodetectors are used to monitor powers for ten channels of signal lights. As an interpolation method, a method of connecting monitored signal light powers with straight lines to estimate signal light powers of remaining channels (linear interpolation) was used. Although the linear interpolation is performed on a log scale according to the present embodiment, the linear interpolation may be performed on a linear scale. Four channels on a shortest wavelength side and four channels on a longest wavelength side are subjected to extrapolated interpolation with a straight line connecting two powers having closest wavelengths. In FIG. 55, concerning post-stage output signal light power, a wavelength characteristic at normal time is indicated by a solid line, a wavelength characteristic at failure time is indicated by a dotted line, predicted failure time is indicated by triangles, and control time of the power is indicated by black circles. For the control, a method of setting a provisional target value to bring the power close to a target value by 1 dB every time was used.

As a result of the control according to the present embodiment, Max-Min of signal light output was 0.664 dB. Compared with Max-Min at the time when all the ninety channels of signal lights were monitored (0.398 dB), Max-Min was controlled to be less than twice as large, although the number of monitors was reduced to 1/9. A standard deviation at control time was 0.121.

According to a fifteenth embodiment of the present invention, as in the thirteenth and the fourteenth embodiments, the number of photodetectors is the same as the number of pumping lights. That is, ten photodetectors are used. All ninety channels of signal lights are divided into total ten wavelength regions every nine channels from a short wavelength side. For each of the wavelength regions, total power of nine channels included in the wavelength region is monitored. Since only ten values are monitored, it is necessary to interpolate unknown numerical values using the ten values to estimate amounts of fluctuation in power of all the ninety channels.

Figure 56:
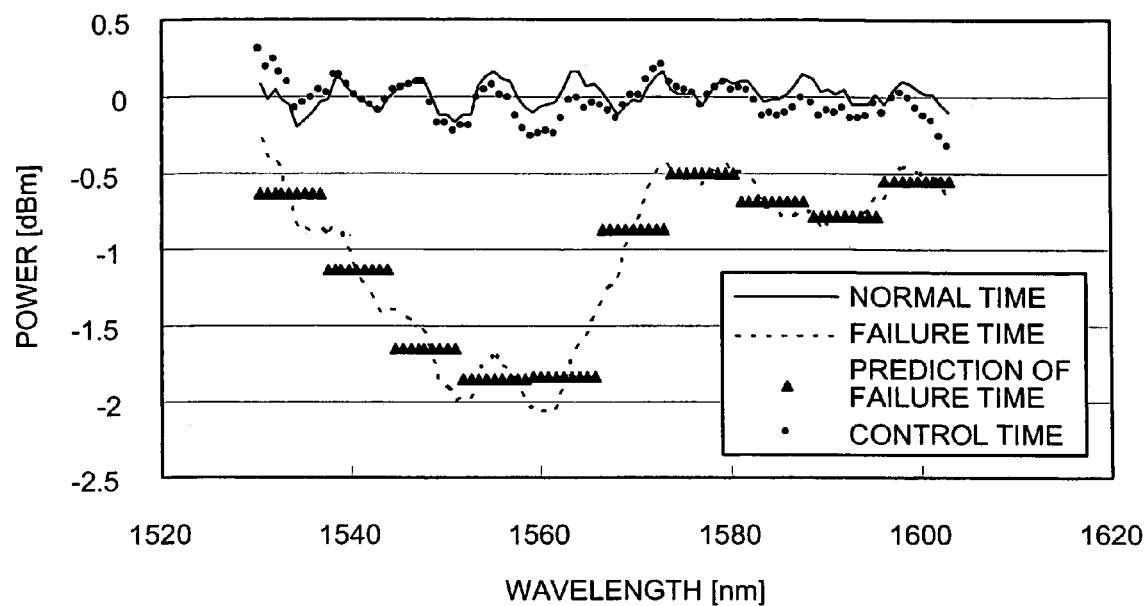
FIG. 56 is a graph of output signal light powers at normal time, failure time, and control time when a total of all signal light powers in equally-divided wavelength regions is monitored and near interpolation is used.

According to the fifteenth embodiment, average power in a wavelength region was set as power of a channel of a center wavelength in the wavelength region and the near interpolation was performed in the same manner as the second embodiment. In FIG. 56, concerning post-stage output signal light power, a wavelength characteristic at normal time is indicated by a solid line, a wavelength characteristic at failure time is indicated by a dotted line, predicted failure time is indicated by triangles, and control time of the power is indicated by black circles. For the control, a method of setting a provisional target value to bring the power close to a target value by 1 dB every time was used.

As a result of the control according to the present embodiment, Max-Min of signal light output was 0.645 dB. Compared with Max-Min at the time when all the ninety channels of signal lights were monitored (0.398 dB), Max-Min was controlled to be less than twice as large, although the number of monitors was reduced to ⅑. A standard deviation at control time was 0.111. This result indicates an improvement over the thirteenth embodiment in which an arbitrary channel (a wavelength near the center, etc.) in a certain wavelength region is monitored by one photodetector.

According to a sixteenth embodiment of the present invention, as in the fifteenth embodiment, the number of photodetectors is the same as the number of pumping lights. That is, ten photodetectors are used. All ninety channels of signal lights are divided into total ten wavelength regions every nine channels from a short wavelength side. For each of the wavelength regions, total power of nine channels included in the wavelength region is monitored. Since only ten values are monitored, it is necessary to interpolate unknown numerical values using the ten values to estimate amounts of fluctuation in power of all the ninety channels.

Figure 57:
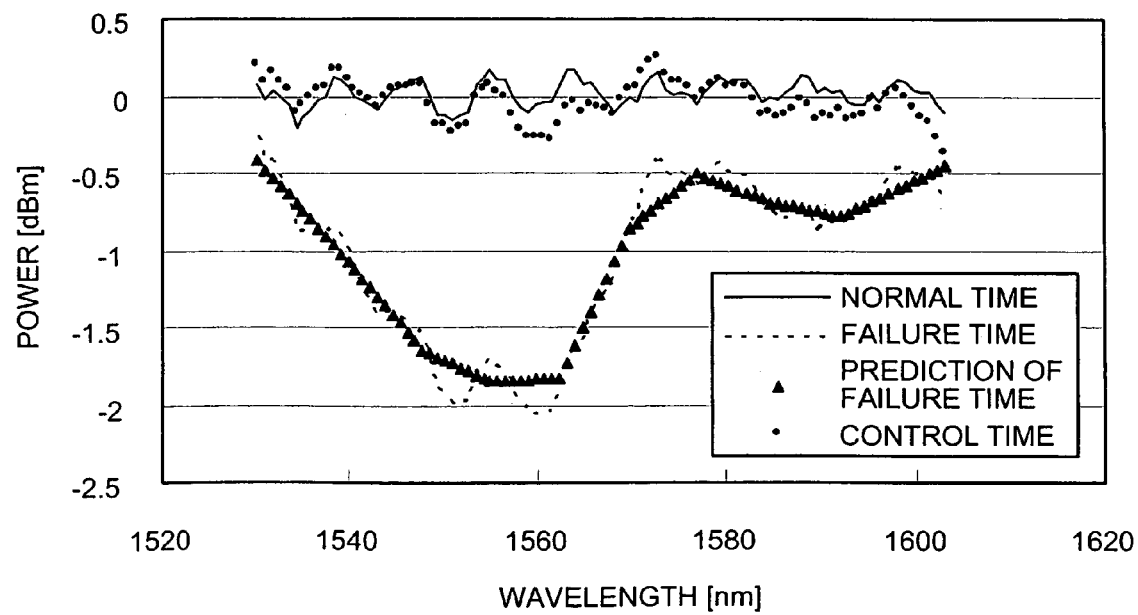
FIG. 57 is a graph of output signal light powers at normal time, failure time, and control time when a total of all signal light powers in equally-divided wavelength regions is monitored and linear interpolation is used.

According to the sixteenth embodiment, average power in a wavelength region was set as power of a channel of a center wavelength in the wavelength region and the near interpolation was performed in the same manner as the third embodiment. In FIG. 57, concerning post-stage output signal light power, a wavelength characteristic at normal time is indicated by a solid line, a wavelength characteristic at failure time is indicated by a dotted line, predicted failure time is indicated by triangles, and control time of the power is indicated by black circles. For the control, a method of setting a provisional target value to bring the power close to a target value by 1 dB every time was used.

As a result of the control according to the present embodiment, Max-Min of signal light output was 0.623 dB. Compared with Max-Min at the time when all the ninety channels of signal lights were monitored (0.398 dB), Max-Min was controlled to be less than twice as large, although the number of monitors was reduced to ⅑. A standard deviation at control time was 0.111.

According to the thirteenth to the sixteenth embodiments, although overall tendency of an amount of fluctuation in power of an entire signal band can be reproduced, tendency of a local amount of fluctuation in power in a divided wavelength region cannot be predicted. According to a seventh embodiment of the present invention, a method of predicting this tendency is explained.

Ten photodetectors are used to monitor powers for ten channels of signal lights. Powers of the remaining eighty channels are subjected to the linear interpolation. In this case, as in the sixteenth embodiment, the number of channels, which one photodetector can monitor, may be increased. According to the present embodiment, one channel is monitored by one photodetector. Output signal light powers at failure time ($q_i$; i=1 to 90) subjected to the linear interpolation in this case are indicated by a dotted line in FIG. 58. Output signal light powers at normal time ($P_i$) is indicated by black circles in FIG. 58 and powers ($p_i$) obtained by subjecting the output signal light powers ($P_i$) to the linear interpolation are indicated by a solid line.

Outputs of signal light power at failure time (Qi) are approximated as $$Q_i = q_i \cdot \frac{P_i}{p_i}.$$

Figure 58:
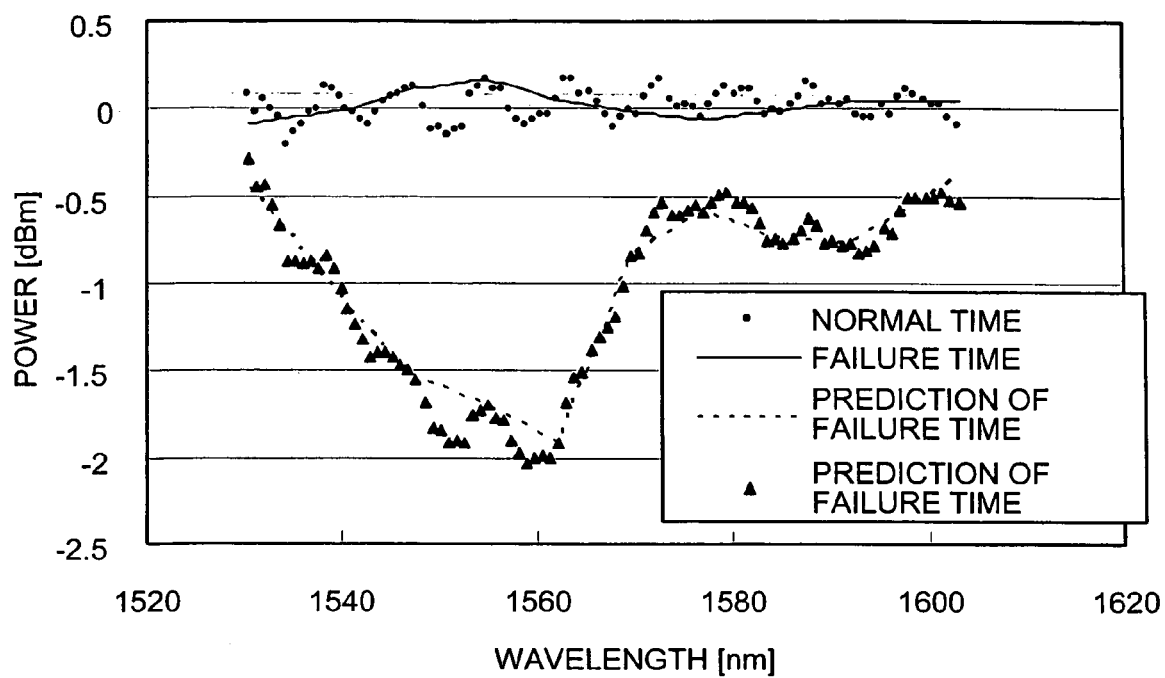
FIG. 58 is a graph of signal light power when local tendency in divided wavelength regions is estimated for output signal light power at failure time from output signal light power at normal time.

This is indicated by triangles in FIG. 58. This method includes an error due to approximation but is effective for predicting a local amount of fluctuation in power easily.

Figure 59:
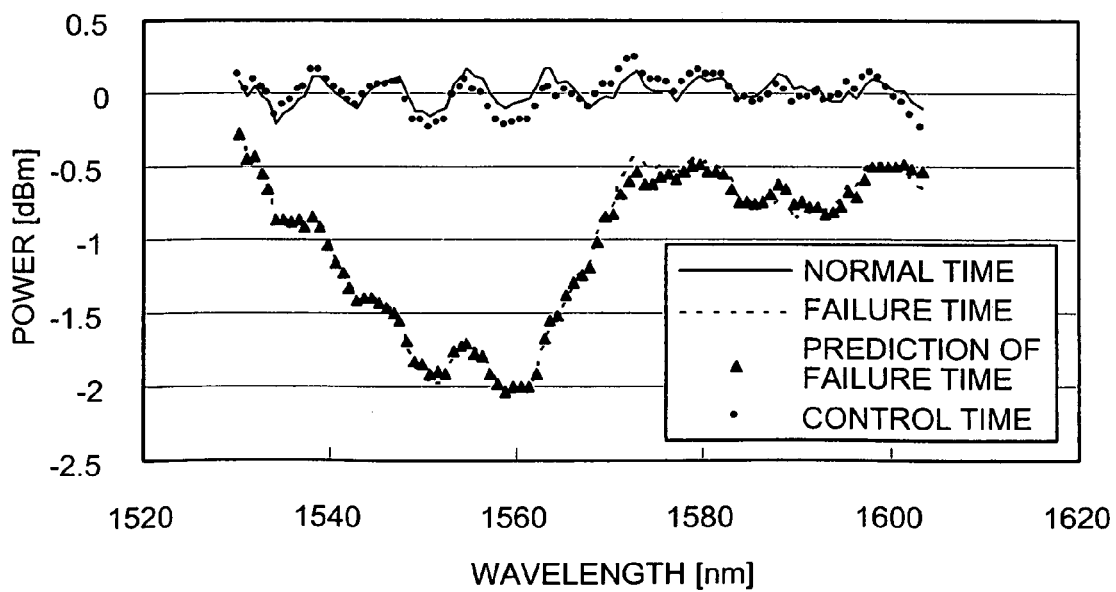
FIG. 59 is a graph of output signal light powers at normal time, failure time, and control time using an interpolation method according to a seventeenth embodiment of the present invention.

In FIG. 59, concerning post-stage output signal light power, a wavelength characteristic at normal time is indicated by a solid line, a wavelength characteristic at failure time is indicated by a dotted line, predicted failure time is indicated by triangles, and control time of the power is indicated by black circles. For the control, a method of setting a provisional target value to bring the power close to a target value by 1 dB every time was used.

As a result of the control according to the present embodiment, Max-Min of signal light output was 0.493 dB. Compared with Max-Min in the interpolation method only by the near interpolation or the linear interpolation, Max-Min was improved significantly. A standard deviation at control time was 0.0723. The standard deviation was also improved significantly.

The monitoring methods described above are compared and evaluated. The following three parameters are set as parameters for the evaluation.

Max-Min[dB]: A difference between a maximum value and a minimum value of output signal light power at control time Standard deviation at control time [dB]: A deviation obtained by dividing, concerning all channels, a sum of squares of a difference [dB] between output signal light power [dBm] at control time and output signal light power [dBm] at normal time by the number of all channels and calculating a square root of a quotient Standard deviation at failure time [dB]: A deviation obtained by dividing, concerning output signal lights at failure time of all channels, a sum of squares of a difference [dB] between a prediction value [dBm] interpolated from a monitor and a true value [dBm] by the number of all channels and calculating a square root of a quotient A table of values of the evaluation parameters applied to the respective monitoring methods is shown below.

TABLE 3

| Photo-detector | OSA or ten PDs | Ten PDs | Ten PDs | Ten PDs | The PDs |
|---|---|---|---|---|---|
| Transmission band of BPF | Only one channel | Only one channel | Only one channel | Only one channel | Only one channel |
| Interpolation method | — | Near interpolation | Linear interpolation | Predict from linear interpolation and normal value | Superposition of gains |
| Max–Min | 0.398 | 0.659 | 0.664 | 0.493 | 0.393 |
| Standard deviation at control time | 0.0415 | 0.122 | 0.121 | 0.0723 | 0.0415 |
| Standard deviation at failure time | 0 | 0.195 | 0.135 | 0.0499 | 0.00751 |

| Photo-detector | Ten PDs | Ten PDs | Ten PDs | Ten PDs | Ten PDs | The PDs |
|---|---|---|---|---|---|---|
| Transmission band of BPF | All monitor wavelength regions | All monitor wavelength regions | All monitor wavelength regions | All monitor wavelength regions | All monitor wavelength regions | All monitor wavelength regions |
| Interpolation method | Near interpolation | Linear interpolation | Superposition of gains | Superposition of gains | Superposition of gains | Superposition of gains |
| Number of times of repetition | — | — | 0 time | once | twice | Three times |
| Max–Min | 0.645 | 0.623 | 0.433 | 0.419 | 0.401 | 0.0400 |
| Standard deviation at control time | 0.111 | 0.115 | 0.0713 | 0.0504 | 0.0427 | 0.0426 |
| Standard deviation at failure time | 0.182 | 0.113 | 0.0734 | 0.0254 | 0.00382 | 0.00649 |

A value at normal time of Max-Min is 0.378. If all channels can be monitored using an OSA, the value is 0.398. Thus, extremely accurate control is performed. When ten PDs are used, with the near interpolation and the linear interpolation, Max-Min is in a range of 0.6 to 0.7, which is about twice as large as the value at normal time. On the other hand, if the interpolation according to superposition of gains is performed, a value very close to the value at normal time is obtained. As it is seen from the table, the value decreases as the number of times of repetition increases in the second method.

The same holds true for the standard deviation at control time.

The standard deviation at failure time is equal to or lower than 0.01 when the interpolation according to superposition of gains is performed. A controlled value thereof is very close to a normal value. Therefore, in this case, if the standard deviation at failure time is in an order of 0.01 or less, it can be judged that output signal light power at failure time is predicted for the control extremely accurately.

According to the tenth to the seventeenth embodiments, the control is performed when the fifth pumping light source (1451 nm) from the short wavelength side fails at the pre-stage. According to an eighteenth embodiment of the present invention, to confirm ability of application of the method according to the present invention, output signal light power at failure time is predicted when a pumping light source most on a long wavelength side (1501 nm) fails at the pre-stage. A result of the prediction is described.

Figure 60:
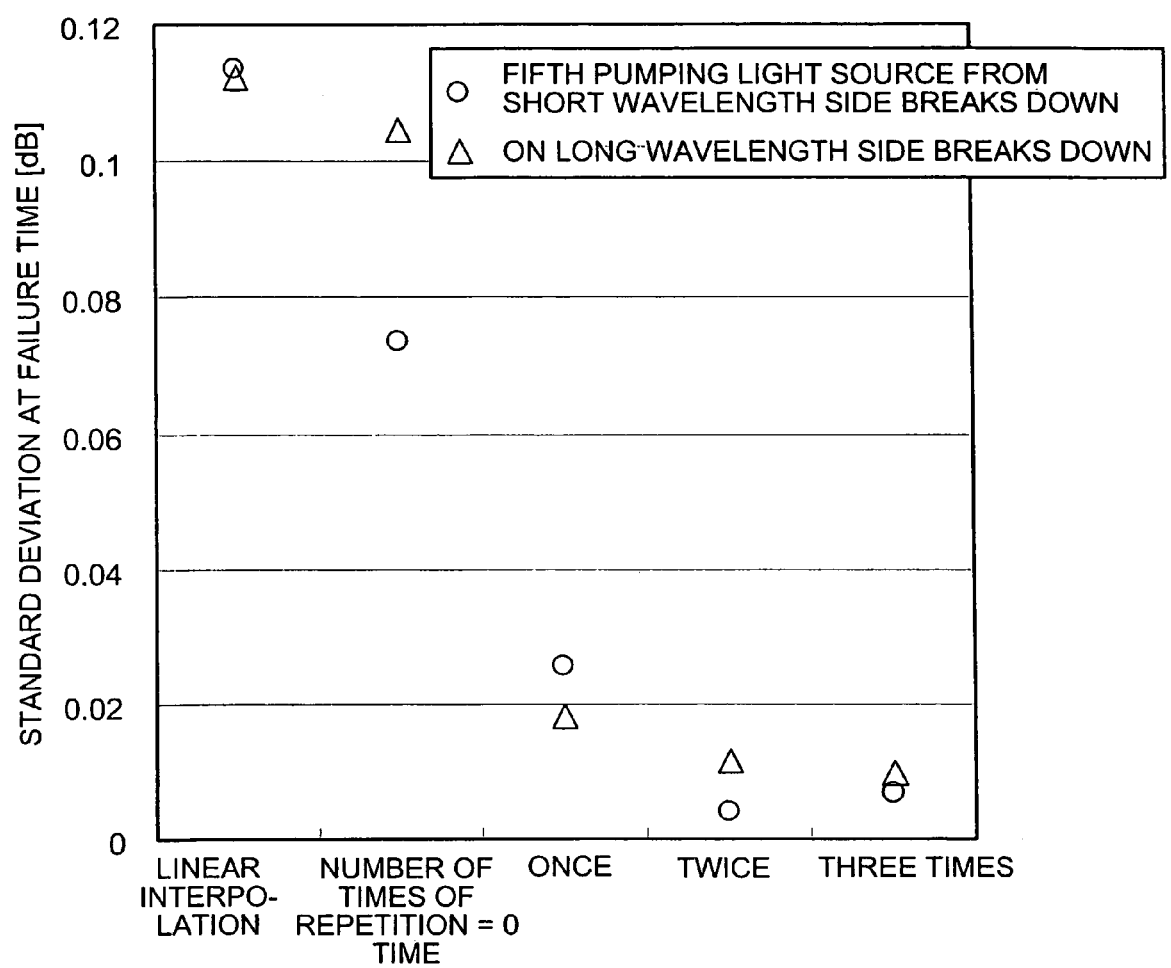
FIG. 60 is a graph in which values of a "standard deviation at failure time" obtained by interpolation methods are plotted.

Ten PDs were used in a photodetector. One PD monitored a total power of all channels included in a monitor wavelength region. Output signal light power at failure time was predicted with the methods by the linear interpolation and the interpolation according to superposition of gains. Standard deviations at failure time in that case are shown in FIG. 60. Standard deviation at failure time at the time when the fifth pumping light source from the short wavelength side fails is included in the figure. It is confirmed that, when the pumping light source most on the long wavelength side fails, as at the time when failure occurs near the middle of a gain wavelength band, it is possible to predict signal light powers of all the channels accurately and control the signal light powers. It is seen that, compared with the method without repetition of the linear interpolation or the superposition interpolation, a standard deviation decreases as the number of times of repetition is increased by the preferred form of the invention, that is, the second method. Under the same convergence judgment conditions as at the time of failure of the fifth pumping light source, the standard deviation converges when the linear interpolation or the superposition interpolation is repeated twice. However, in the figure, values obtained by repeating the linear interpolation or the superposition up to three times are shown. In this case, as at the time when failure occurs near the middle of a gain wavelength band, the standard deviation substantially converges when the number of times of repetition is two, and true output signal light powers at failure time of all the channels can be predicted.

Figure 61:
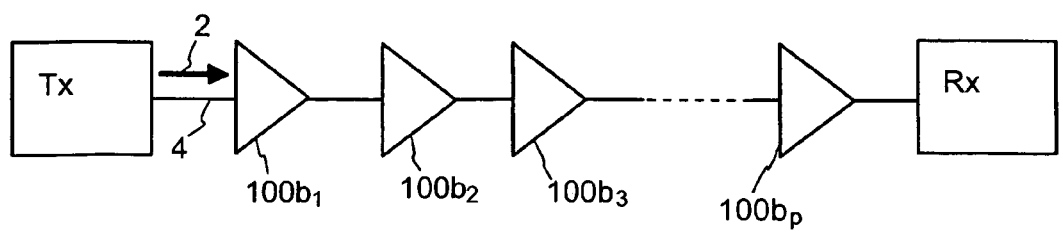
FIG. 61 is a schematic of an example of an optical transmission system using a Raman amplifier according to the present invention.

An optical transmission system 200, which uses the Raman amplifiers having the control function according to the present invention, is shown in FIG. 61. A light signal 2 outputted after being subjected to photoelectric conversion in an optical transmission device (Tx) is received by a light-receiving device (Rx) while a loss caused during transmission in an optical transmission fiber 4 is compensated for by Raman amplifiers $100b_1$ to $100b_p$. In the light-receiving device (Rx), the light signal 2 is reproduced as an electric signal. The Raman amplifiers $100b_1$ to $100b_p$ have the same constitution as the Raman amplifier 100b shown in FIG. 17. Thus, as explained in the embodiments of the present invention, the Raman amplifiers $100b_1$ to $100b_p$ have a function of, even when a part of laser elements constituting a pumping light source of a Raman amplifier connected to a pre-stage of the Raman amplifiers $100b_1$ to $100b_p$ fail, specifying a pumping light wavelength that has failed and adjusting own pumping light power to maintain a desired gain wavelength characteristic. In other words, in the optical transmission system 200, if the Raman amplifiers according to the present invention are connected in tandem, even if any one of the Raman amplifiers $100b_1$ to $100b_p$ fails, the Raman amplifiers at a post-stage compensate for fluctuation in a gain of a laser element that has failed. Thus, it is possible to minimize fluctuation in a signal light output from the optical transmission system 200.

Figure 62:
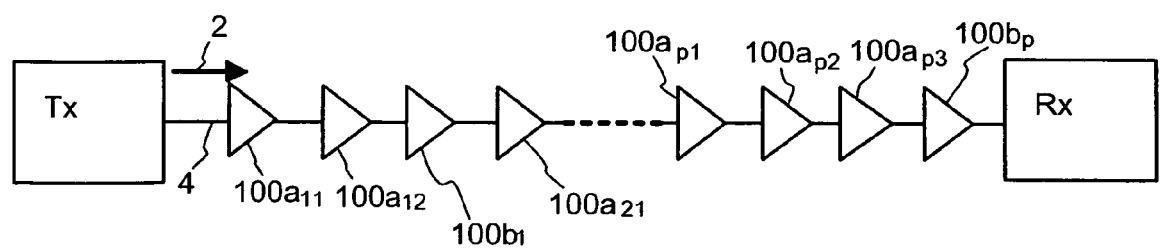
FIG. 62 is a schematic of another example of an optical transmission system using the Raman amplifier according to the present invention.

Another optical transmission system 201, which uses the Raman amplifiers having the control function according to the present invention, is shown in FIG. 62. The optical transmission system 201 shown in the figure is identical with the optical transmission system 200 except that Raman amplifiers $100a_{11}$ to $100a_{p3}$ are combined. Therefore, redundant explanations are omitted. As in the eighth embodiment, the Raman amplifiers $100a_{11}$ to $100a_{p3}$ are Raman amplifiers having the control function according to the present invention. On the other hand, the Raman amplifiers $100a_{11}$ to $100a_{p3}$ do not have a function for controlling gains. An operation of the optical transmission system 201 at the time when any one of laser elements constituting pumping light sources of the Raman amplifiers $100a_{11}$ to $100a_{p3}$ fails is explained below.

When failure occurs in any one of the Raman amplifiers $100_{11}$ to $100_{12}$, a Raman amplifier $100b_1$ detects the failure and performs control such that an output from the Raman amplifier $100b_1$ is maintained constant. Therefore, it is possible to prevent the failure from affecting the Raman amplifiers and the light-receiving device Rx on a post-stage side of the Raman amplifier $100b_1$.

When failure occurs in any one of the Raman amplifiers $100a_{p1}$ to $100a_{p3}$, a Raman amplifier $100b_p$ changes a gain wavelength characteristic to compensate for a loss, which has occurred in the Raman amplifier, and covers the loss. Note that, for example, when failure occurs in the Raman amplifier $100b_1$ or the like, a Raman amplifier $100b_2$ closest to the Raman amplifier $100b_1$ at a post-stage thereof operates to cover a loss due to the failure.

In this way, when failure occurs in any one of Raman amplifiers not having a control function, a Raman amplifier closest to the Raman amplifier on a post-stage side thereof operates to compensate for a loss due to the failure. On the other hand, a Raman amplifier having the control function has to generate pumping light power enough for compensating for a loss caused on a pre-stage side thereof. Therefore, the number of Raman amplifiers not having the control function to be connected at the pre-stage depends on an ability of amplification of the Raman amplifier having the control function.

By adopting a system constitution described above, all Raman amplifiers constituting the optical transmission system 201 are not required to be Raman amplifiers having the control function. It is possible to realize a system that has the control function but is manufactured at low cost.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multiple-wavelength-pumped Raman amplifier that sets and controls arbitrary signal gain and output characteristics for a wavelength-multiplexed signal light, the multiple-wavelength-pumped Raman amplifier comprising a control unit that controls, based on a relational expression associating a first fluctuation amount, a second fluctuation amount, a third fluctuation amount, and a fourth fluctuation amount, two fluctuation amounts from among the first to the fourth fluctuation amounts by determining other two fluctuation amounts in advance, to determine pumping light powers satisfying the relational expression, wherein
the first fluctuation amount is an amount of fluctuation in a current signal light power at a signal input end,
the second fluctuation amount is an amount of fluctuation in a current pumping light power at a pumping light input end,
the third fluctuation amount is an amount of fluctuation in the current signal power at a signal output end, and
the fourth fluctuation amount is an amount of fluctuation in the current pumping light power at a pumping light output end.

2. The multiple-wavelength-pumped Raman amplifier according to claim 1, wherein the relational expression is a simultaneous linear equation.

3. The multiple-wavelength-pumped Raman amplifier according to claim 1, wherein the relational expression is a linear approximation formula obtained by eliminating quadratic terms from a nonlinear propagation equation described with an amount of fluctuation in power.

4. The multiple-wavelength-pumped Raman amplifier according to claim 1, wherein the relational expression is an approximation in section obtained by assuming distribution information of a fixed length in an optical fiber under consideration as a constant.

5. The multiple-wavelength-pumped Raman amplifier according to claim 2, wherein a coefficient matrix of the simultaneous linear equation includes parameters of an optical fiber that serves as an amplification medium as a matrix element.

6. The multiple-wavelength-pumped Raman amplifier according to claim 5, wherein the parameters of the optical fiber are a loss parameter and a Raman gain parameter.

7. The multiple-wavelength-pumped Raman amplifier according to claim 2, wherein a coefficient matrix of the simultaneous linear equation includes a longitudinal distribution of at least one of signal power and pumping power currently obtained as a matrix element.

8. The multiple-wavelength-pumped Raman amplifier according to claim 7, wherein the longitudinal distribution of the at least one of the signal power and the pumping power is obtained by solving a nonlinear propagation equation.

9. The multiple-wavelength-pumped Raman amplifier according to claim 7, wherein the longitudinal distribution of the at least one of the signal power and the pumping power is obtained by performing a measurement of a power distribution in the optical fiber.

10. The multiple-wavelength-pumped Raman amplifier according to claim 9, wherein the measurement is performed by optical time domain reflectometry.

11. The multiple-wavelength-pumped Raman amplifier according to claim 7, wherein the longitudinal distribution of the at least one of the signal power and the pumping power is stored as data in a predetermined table in advance.

12. The multiple-wavelength-pumped Raman amplifier according to claim 7, wherein the matrix element is obtained by performing a measurement in advance.

13. The multiple-wavelength-pumped Raman amplifier according to claim 12, wherein
the measurement is performed by sequentially changing pumping powers one by one and measuring an amount of gain fluctuation due to influence of the changing the pumping powers, and
the matrix element is calculated from a result of the measurement.

14. The multiple-wavelength-pumped Raman amplifier according to claim 1, wherein the first fluctuation amount and the third fluctuation amount are determined in advance to calculate the second fluctuation amount and the fourth fluctuation amount.

15. The multiple-wavelength-pumped Raman amplifier according to claim 1, wherein the first fluctuation amount and the second fluctuation amount are determined in advance to calculate the third fluctuation amount and the fourth fluctuation amount.

16. The multiple-wavelength-pumped Raman amplifier according to claim 1, wherein the first fluctuation amount and the third fluctuation amount are determined in advance to calculate the second fluctuation amount and the fourth fluctuation amount.

17. The multiple-wavelength-pumped Raman amplifier according to claim 1, wherein
the control unit performs an intermediate calculation process in which an intermediate value between a value currently obtained and a final target value is set as a provisional target value and the other two fluctuation amounts satisfying the provisional target value, and
the final target value is obtained by repeatedly performing the intermediate calculation process by replacing the value currently obtained with a value calculated by the intermediate calculation process.

18. The multiple-wavelength-pumped Raman amplifier according to claim 17, wherein the control unit updates information on a longitudinal distribution of an optical fiber under consideration when performing the intermediate calculation process.

19. The multiple-wavelength-pumped Raman amplifier according to claim 18, wherein the control unit updates the information on the longitudinal distribution of the optical fiber by adding values of longitudinal distributions of the other two fluctuation amounts currently calculated to a current value of the longitudinal distribution of the optical fiber.

20. The multiple-wavelength-pumped Raman amplifier according to claim 18, wherein the control unit updates the information on the longitudinal distribution of the optical fiber by solving a nonlinear propagation equation.

21. The multiple-wavelength-pumped Raman amplifier according to claim 18, wherein a longitudinal distribution of at least one of signal power and pumping power is obtained by performing a measurement of a power distribution in the optical fiber.

22. The multiple-wavelength-pumped Raman amplifier according to claim 21, wherein the measurement is performed by optical time domain reflectometry.

23. The multiple-wavelength-pumped Raman amplifier according to claim 18, wherein a step size of the provisional target value at the time of the intermediate calculation process is a logarithmic value of a signal light gain.

24. The multiple-wavelength-pumped Raman amplifier according to claim 23, wherein the step size of the provisional target value at the time of the intermediate calculation process is equal to or less than 0.5 decibel in the signal light gain.

25. The multiple-wavelength-pumped Raman amplifier according to claim 23, wherein the step size of the provisional target value at the time of the intermediate calculation process is equal to or less than 1 decibel in the signal light gain.

26. The multiple-wavelength-pumped Raman amplifier according to claim 23, wherein the step size of the provisional target value at the time of the intermediate calculation process is equal to or less than 2 decibels in the signal light gain.

27. The multiple-wavelength-pumped Raman amplifier according to claim 23, wherein the step size of the provisional target value at the time of the intermediate calculation process is equal to or less than 3 decibels in the signal light gain.

28. The multiple-wavelength-pumped Raman amplifier according to claim 18, wherein a step size of the provisional target value at the time of the intermediate calculation process is different for at least one of each intermediate arithmetic processing and each signal channel.

29. A method of controlling a multiple-wavelength-pumped Raman amplifier that sets and controls arbitrary signal gain and output characteristics for a wavelength-multiplexed signal light, the method comprising controlling, based on a relational expression associating a first fluctuation amount, a second fluctuation amount, a third fluctuation amount, and a fourth fluctuation amount, two fluctuation amounts from among the first to the fourth fluctuation amounts by determining other two fluctuation amounts in advance, to determine pumping light powers satisfying the relational expression, wherein
the first fluctuation amount is an amount of fluctuation in a current signal light power at a signal input end,
the second fluctuation amount is an amount of fluctuation in a current pumping light power at a pumping light input end,
the third fluctuation amount is an amount of fluctuation in the current signal power at a signal output end, and
the fourth fluctuation amount is an amount of fluctuation in the current pumping light power at a pumping light output end.

30. The method according to claim 29, wherein the relational expression is a simultaneous linear equation.

31. The method according to claim 29, wherein the relational expression is a linear approximation formula obtained by eliminating quadratic terms from a nonlinear propagation equation described with an amount of fluctuation in power.

32. The method according to claim 29, wherein the relational expression is an approximation in section obtained by assuming distribution information of a fixed length in an optical fiber under consideration as a constant.

33. The method according to claim 30, wherein a coefficient matrix of the simultaneous linear equation includes parameters of an optical fiber that serves as an amplification medium as a matrix element.

34. The method according to claim 33, wherein the parameters of the optical fiber are a loss parameter and a Raman gain parameter.

35. The method according to claim 30, wherein a coefficient matrix of the simultaneous linear equation includes a longitudinal distribution of at least one of signal power and pumping power currently obtained as a matrix element.

36. The method according to claim 35, wherein the longitudinal distribution of the at least one of the signal power and the pumping power is obtained by solving a nonlinear propagation equation.

37. The method according to claim 35, wherein the longitudinal distribution of the at least one of the signal power and the pumping power is obtained by performing a measurement of a power distribution in the optical fiber.

38. The method according to claim 37, wherein the measurement is performed by optical time domain reflectometry.

39. The method according to claim 35, wherein the longitudinal distribution of the at least one of the signal power and the pumping power is stored as data in a predetermined table in advance.

40. The method according to claim 35, wherein the matrix element is obtained by performing a measurement in advance.

41. The method according to claim 40, wherein
the measurement is performed by sequentially changing pumping powers one by one and measuring an amount of gain fluctuation due to influence of the changing the pumping powers, and
the matrix element is calculated from a result of the measurement.

42. The method according to claim 29, wherein the first fluctuation amount and the third fluctuation amount are determined in advance to calculate the second fluctuation amount and the fourth fluctuation amount.

43. The method according to claim 29, wherein the first fluctuation amount and the second fluctuation amount are determined in advance to calculate the third fluctuation amount and the fourth fluctuation amount.

44. The method according to claim 29, wherein the first fluctuation amount and the third fluctuation amount are determined in advance to calculate the second fluctuation amount and the fourth fluctuation amount.

45. The method according to claim 29, wherein
the controlling includes performing an intermediate calculation process in which an intermediate value between a value currently obtained and a final target value is set as a provisional target value and the other two fluctuation amounts satisfying the provisional target value, and
the final target value is obtained by repeatedly performing the intermediate calculation process by replacing the value currently obtained with a value calculated by the intermediate calculation process.

46. The method according to claim 45, wherein the controlling includes updating information on a longitudinal distribution of an optical fiber under consideration when performing the intermediate calculation process.

47. The method according to claim 46, wherein the updating includes updating the information on the longitudinal distribution of the optical fiber by adding values of longitudinal distributions of the other two fluctuation amounts currently calculated to a current value of the longitudinal distribution of the optical fiber.

48. The method according to claim 46, wherein the updating includes updating the information on the longitudinal distribution of the optical fiber by solving a nonlinear propagation equation.

49. The method according to claim 46, wherein a longitudinal distribution of at least one of signal power and pumping power is obtained by performing a measurement of a power distribution in the optical fiber.

50. The method according to claim 49, wherein the measurement is performed by optical time domain reflectometry.

51. The method according to claim 46, wherein a step size of the provisional target value at the time of the intermediate calculation process is a logarithmic value of a signal light gain.

52. The method according to claim 51, wherein the step size of the provisional target value at the time of the intermediate calculation process is equal to or less than 0.5 decibel in the signal light gain.

53. The method according to claim 51, wherein the step size of the provisional target value at the time of the intermediate calculation process is equal to or less than 1 decibel in the signal light gain.

54. The method according to claim 51, wherein the step size of the provisional target value at the time of the intermediate calculation process is equal to or less than 2 decibels in the signal light gain.

55. The method according to claim 51, wherein the step size of the provisional target value at the time of the intermediate calculation process is equal to or less than 3 decibels in the signal light gain.

56. The method according to claim 46, wherein a step size of the provisional target value at the time of the intermediate calculation process is different for at least one of each intermediate arithmetic processing and each signal channel.

57. A computer-readable recording medium that stores a program for controlling a multiple-wavelength-pumped Raman amplifier that sets and controls arbitrary signal gain and output characteristics for a wavelength-multiplexed signal light, wherein the program causes a computer to execute controlling, based on a relational expression associating a first fluctuation amount, a second fluctuation amount, a third fluctuation amount, and a fourth fluctuation amount, two fluctuation amounts from among the first to the fourth fluctuation amounts by determining other two fluctuation amounts in advance, to determine pumping light powers satisfying the relational expression, wherein
the first fluctuation amount is an amount of fluctuation in a current signal light power at a signal input end,
the second fluctuation amount is an amount of fluctuation in a current pumping light power at a pumping light input end,
the third fluctuation amount is an amount of fluctuation in the current signal power at a signal output end, and
the fourth fluctuation amount is an amount of fluctuation in the current pumping light power at a pumping light output end.

58. The computer-readable recording medium according to claim 57, wherein the relational expression is a simultaneous linear equation.

59. The computer-readable recording medium according to claim 57, wherein the relational expression is a linear approximation formula obtained by eliminating quadratic terms from a nonlinear propagation equation described with an amount of fluctuation in power.

60. The computer-readable recording medium according to claim 57, wherein the relational expression is an approximation in section obtained by assuming distribution information of a fixed length in an optical fiber under consideration as a constant.

61. The computer-readable recording medium according to claim 58, wherein a coefficient matrix of the simultaneous linear equation includes parameters of an optical fiber that serves as an amplification medium as a matrix element.

62. The computer-readable recording medium according to claim 61, wherein the parameters of the optical fiber are a loss parameter and a Raman gain parameter.

63. The computer-readable recording medium according to claim 58, wherein a coefficient matrix of the simultaneous linear equation includes a longitudinal distribution of at least one of signal power and pumping power currently obtained as a matrix element.

64. The computer-readable recording medium according to claim 63, wherein the longitudinal distribution of the at least one of the signal power and the pumping power is obtained by solving a nonlinear propagation equation.

65. The computer-readable recording medium according to claim 63, wherein the longitudinal distribution of the at least one of the signal power and the pumping power is obtained by performing a measurement of a power distribution in the optical fiber.

66. The computer-readable recording medium according to claim 65, wherein the measurement is performed by optical time domain reflectometry.

67. The computer-readable recording medium according to claim 63, wherein the longitudinal distribution of the at least one of the signal power and the pumping power is stored as data in a predetermined table in advance.

68. The computer-readable recording medium according to claim 63, wherein the matrix element is obtained by performing a measurement in advance.

69. The computer-readable recording medium according to claim 68, wherein
the measurement is performed by sequentially changing pumping powers one by one and measuring an amount of gain fluctuation due to influence of the changing the pumping powers, and
the matrix element is calculated from a result of the measurement.

70. The computer-readable recording medium according to claim 57, wherein the first fluctuation amount and the third fluctuation amount are determined in advance to calculate the second fluctuation amount and the fourth fluctuation amount.

71. The computer-readable recording medium according to claim 57, wherein the first fluctuation amount and the second fluctuation amount are determined in advance to calculate the third fluctuation amount and the fourth fluctuation amount.

72. The computer-readable recording medium according to claim 57, wherein the first fluctuation amount and the third fluctuation amount are determined in advance to calculate the second fluctuation amount and the fourth fluctuation amount.

73. The computer-readable recording medium according to claim 57, wherein
the controlling includes performing an intermediate calculation process in which an intermediate value between a value currently obtained and a final target value is set as a provisional target value and the other two fluctuation amounts satisfying the provisional target value, and
the final target value is obtained by repeatedly performing the intermediate calculation process by replacing the value currently obtained with a value calculated by the intermediate calculation process.

74. The computer-readable recording medium according to claim 73, wherein the controlling includes updating information on a longitudinal distribution of an optical fiber under consideration when performing the intermediate calculation process.

75. The computer-readable recording medium according to claim 74, wherein the updating includes updating the information on the longitudinal distribution of the optical fiber by adding values of longitudinal distributions of the other two fluctuation amounts currently calculated to a current value of the longitudinal distribution of the optical fiber.

76. The computer-readable recording medium according to claim 74, wherein the updating includes updating the information on the longitudinal distribution of the optical fiber by solving a nonlinear propagation equation.

77. The computer-readable recording medium according to claim 74, wherein a longitudinal distribution of at least one of signal power and pumping power is obtained by performing a measurement of a power distribution in the optical fiber.

78. The computer-readable recording medium according to claim 77, wherein the measurement is performed by optical time domain reflectometry.

79. The computer-readable recording medium according to claim 74, wherein a step size of the provisional target value at the time of the intermediate calculation process is a logarithmic value of a signal light gain.

80. The computer-readable recording medium according to claim 79, wherein the step size of the provisional target value at the time of the intermediate calculation process is equal to or less than 0.5 decibel in the signal light gain.

81. The computer-readable recording medium according to claim 79, wherein the step size of the provisional target value at the time of the intermediate calculation process is equal to or less than 1 decibel in the signal light gain.

82. The computer-readable recording medium according to claim 79, wherein the step size of the provisional target value at the time of the intermediate calculation process is equal to or less than 2 decibels in the signal light gain.

83. The computer-readable recording medium according to claim 79, wherein the step size of the provisional target value at the time of the intermediate calculation process is equal to or less than 3 decibels in the signal light gain.

84. The computer-readable recording medium according to claim 74, wherein a step size of the provisional target value at the time of the intermediate calculation process is different for at least one of each intermediate arithmetic processing and each signal channel.

* * * * *